US012652230B2

(12) United States Patent
Nasrallah et al.

(10) Patent No.: US 12,652,230 B2
(45) Date of Patent: Jun. 9, 2026

(54) PREDICTIVE AND ENHANCED DYNAMIC QUALITY OF SERVICE TAGGING ON TRANSPORT LAYER

(71) Applicant: Dell Products L.P., Round Rock, TX (US)

(72) Inventors: Mohamed Nasrallah, Nasr City (EG); Engy Fawaz, New Cairo (EG); Marwan Mansour, Alexandria (EG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/441,732

(22) Filed: Feb. 14, 2024

(65) Prior Publication Data

US 2025/0260636 A1 Aug. 14, 2025

(51) Int. Cl.
| | |
|---|---|
| *H04L 43/55* | (2022.01) |
| *H04L 41/0631* | (2022.01) |
| *H04L 41/147* | (2022.01) |
| *H04L 41/5009* | (2022.01) |
| *H04L 43/0817* | (2022.01) |

(52) U.S. Cl.
CPC .......... *H04L 43/55* (2022.05); *H04L 41/0631* (2013.01); *H04L 43/0817* (2013.01)

(58) Field of Classification Search
CPC . H04L 43/55; H04L 41/0631; H04L 43/0817; H04L 41/147; H04L 41/5009
See application file for complete search history.

(56) References Cited

U.S. PATENT DOCUMENTS

| | | |
|---|---|---|
| 2011/0051731 A1 | 3/2011 | Mang et al. |
| 2012/0236713 A1* | 9/2012 | Kakadia .............. H04L 43/0852 |
| | | 370/236 |

(Continued)

OTHER PUBLICATIONS

"Towards Centralized Performance Monitoring in 5G Networks" Creanord, Jan. 25, 2023, [https://creanord.com/story/towards-centralized-performance-monitoring-in-5g-networks/], retrieved Oct. 10, 2023, 5 pages.

(Continued)

*Primary Examiner* — Kamal M Hossain
(74) *Attorney, Agent, or Firm* — Amin, Turocy & Watson, LLP

(57) ABSTRACT

Enhanced tag management of QoS tags associated with services can be performed. Network monitor component (NMC) can send test signals to network equipment to trigger sending of test messages and test response messages associated with tags between network equipment. NMC can receive performance indicator information from network equipment based on network responses associated with tags to test messages. NMC can analyze performance indicator information, service specifications of services, original QoS tag information, and current QoS tag information, and can perform an iterative prediction process, to predict or determine which services can be satisfied at which tags, isolate a source of service degradation, and determine whether adjustments to assignments of tags are to be performed. Based on analysis results, NMC can promote a portion of data packets of a service from an original tag to a higher tag, or demote a service from a higher tag to its original tag.

20 Claims, 12 Drawing Sheets

800 ⟶

PREDICTING RESPECTIVE PREDICTED PERFORMANCE INDICATORS ASSOCIATED WITH RESPECTIVE QOS TAGS BASED ON A RESULT OF ANALYZING INFORMATION RELATING TO RESPECTIVE PROPOSED GROUPS OF DATA PACKETS ASSOCIATED WITH THE RESPECTIVE QOS TAGS AND RESPECTIVE SERVICES, WHEREIN THE RESPECTIVE QOS TAGS CAN COMPRISE A FIRST QOS TAG AND A SECOND QOS TAG, WHEREIN THE RESPECTIVE SERVICES CAN COMPRISE A FIRST SERVICE AND A SECOND SERVICE, AND WHEREIN THE RESPECTIVE PROPOSED GROUPS OF DATA PACKETS CAN COMPRISE A PROPOSED GROUP OF DATA PACKETS ASSOCIATED WITH THE FIRST SERVICE AND A PROPOSED TRANSITION FROM THE FIRST QOS TO THE SECOND QOS TAG ⟵ 802

BASED ON THE PREDICTING OF THE RESPECTIVE PREDICTED PERFORMANCE INDICATORS ASSOCIATED WITH THE RESPECTIVE QOS TAGS, DETERMINING WHETHER TO ADJUST A QOS TAG ASSIGNMENT FOR THE PROPOSED GROUP OF DATA PACKETS FROM THE FIRST QOS TAG TO THE SECOND QOS TAG ⟵ 804

(56)         References Cited

U.S. PATENT DOCUMENTS

| | | | |
|---|---|---|---|
| 2014/0355427 A1* | 12/2014 | Cheng | H04L 43/0888 |
| | | | 370/230 |
| 2018/0115927 A1 | 4/2018 | Vesterinen et al. | |
| 2018/0167294 A1 | 6/2018 | Gupta et al. | |
| 2019/0281492 A1* | 9/2019 | Hans | H04W 4/50 |
| 2021/0336889 A1* | 10/2021 | Yaswi | H04L 41/0895 |
| 2025/0071065 A1* | 2/2025 | Lal | H04L 12/2861 |

OTHER PUBLICATIONS

Nasrallah et al. "Dynamic Quality of Service Tagging On Transport Layer" U.S. Appl. No. 18/484,141, filed Oct. 10, 2023, 99 pages.
Office Action mailed Oct. 21, 2025 for U.S. Appl. No. 18/484,141, 62 pages.
K. Hedayat et al, "A Two-Way Active Measurement Protocol (TWAMP) (RFC5357)", Network Working Group Request for Comments: 5357. Original Publication Date: Oct. 1, 2008. Electronic Publication Date: Feb. 12, 2019. 27 pages.
T Mizrahi et al, "An Overview of Operations, Administration, and Maintenance (OAM) Tools (RFC7276)", Internet Engineering Task Force (IETF) Request for Comments: 7276. Original Publication Date: Jun. 1, 2014. Electronic Publication Date: Feb. 11, 2019. 54 pages.
Notice of Allowance mailed Mar. 3, 2026 for U.S. Appl. No. 18/484,141, 62 pages.

\* cited by examiner

Figure 8:
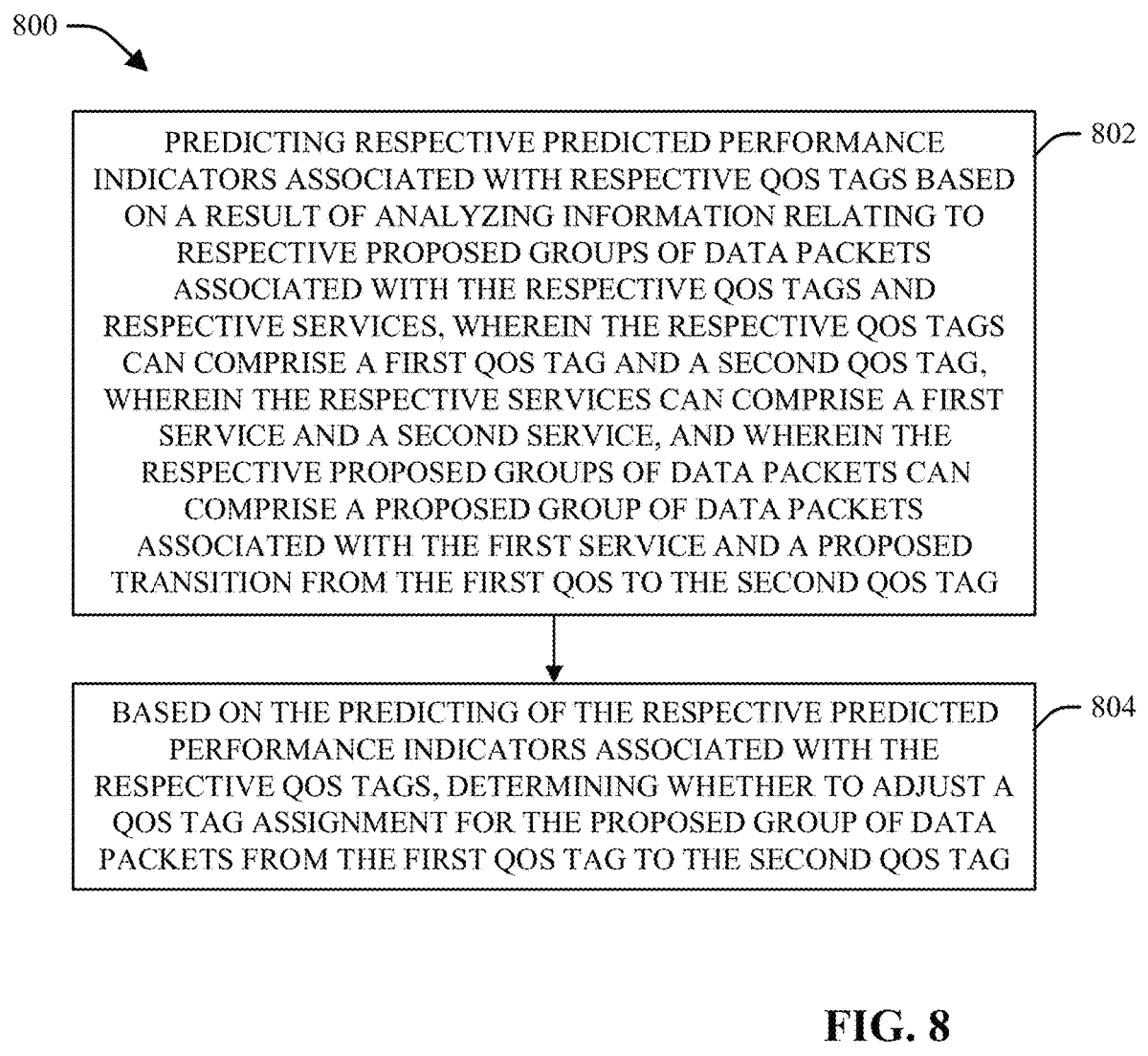

800 —

PREDICTING RESPECTIVE PREDICTED PERFORMANCE INDICATORS ASSOCIATED WITH RESPECTIVE QOS TAGS BASED ON A RESULT OF ANALYZING INFORMATION RELATING TO RESPECTIVE PROPOSED GROUPS OF DATA PACKETS ASSOCIATED WITH THE RESPECTIVE QOS TAGS AND RESPECTIVE SERVICES, WHEREIN THE RESPECTIVE QOS TAGS CAN COMPRISE A FIRST QOS TAG AND A SECOND QOS TAG, WHEREIN THE RESPECTIVE SERVICES CAN COMPRISE A FIRST SERVICE AND A SECOND SERVICE, AND WHEREIN THE RESPECTIVE PROPOSED GROUPS OF DATA PACKETS CAN COMPRISE A PROPOSED GROUP OF DATA PACKETS ASSOCIATED WITH THE FIRST SERVICE AND A PROPOSED TRANSITION FROM THE FIRST QOS TO THE SECOND QOS TAG          — 802

BASED ON THE PREDICTING OF THE RESPECTIVE PREDICTED PERFORMANCE INDICATORS ASSOCIATED WITH THE RESPECTIVE QOS TAGS, DETERMINING WHETHER TO ADJUST A QOS TAG ASSIGNMENT FOR THE PROPOSED GROUP OF DATA PACKETS FROM THE FIRST QOS TAG TO THE SECOND QOS TAG          — 804

Figure 9:
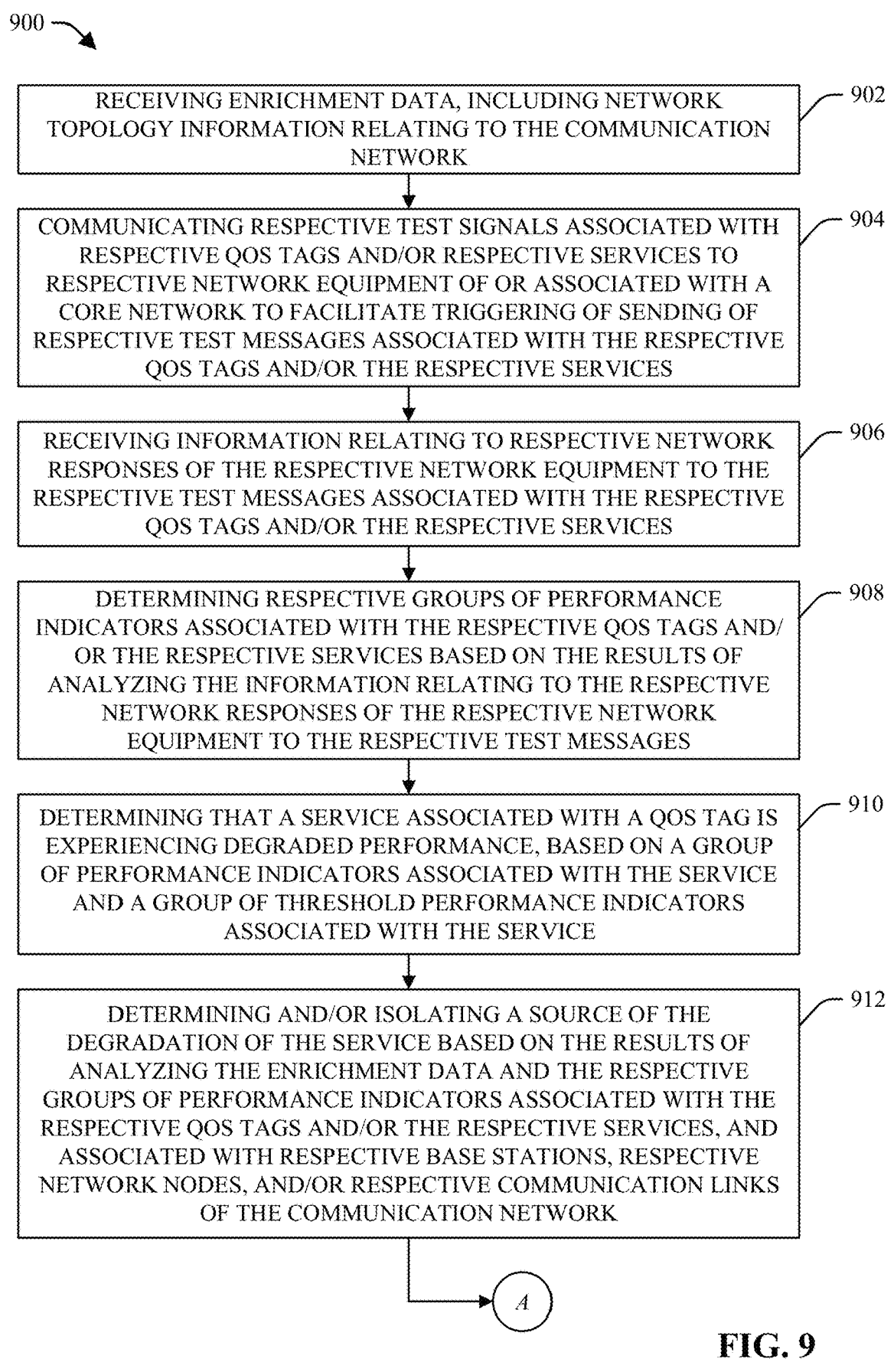

| RECEIVING ENRICHMENT DATA, INCLUDING NETWORK TOPOLOGY INFORMATION RELATING TO THE COMMUNICATION NETWORK | ⟋ 902 |

↓

COMMUNICATING RESPECTIVE TEST SIGNALS ASSOCIATED WITH RESPECTIVE QOS TAGS AND/OR RESPECTIVE SERVICES TO RESPECTIVE NETWORK EQUIPMENT OF OR ASSOCIATED WITH A CORE NETWORK TO FACILITATE TRIGGERING OF SENDING OF RESPECTIVE TEST MESSAGES ASSOCIATED WITH THE RESPECTIVE QOS TAGS AND/OR THE RESPECTIVE SERVICES ⟋ 904

↓

RECEIVING INFORMATION RELATING TO RESPECTIVE NETWORK RESPONSES OF THE RESPECTIVE NETWORK EQUIPMENT TO THE RESPECTIVE TEST MESSAGES ASSOCIATED WITH THE RESPECTIVE QOS TAGS AND/OR THE RESPECTIVE SERVICES ⟋ 906

↓

DETERMINING RESPECTIVE GROUPS OF PERFORMANCE INDICATORS ASSOCIATED WITH THE RESPECTIVE QOS TAGS AND/ OR THE RESPECTIVE SERVICES BASED ON THE RESULTS OF ANALYZING THE INFORMATION RELATING TO THE RESPECTIVE NETWORK RESPONSES OF THE RESPECTIVE NETWORK EQUIPMENT TO THE RESPECTIVE TEST MESSAGES ⟋ 908

↓

DETERMINING THAT A SERVICE ASSOCIATED WITH A QOS TAG IS EXPERIENCING DEGRADED PERFORMANCE, BASED ON A GROUP OF PERFORMANCE INDICATORS ASSOCIATED WITH THE SERVICE AND A GROUP OF THRESHOLD PERFORMANCE INDICATORS ASSOCIATED WITH THE SERVICE ⟋ 910

↓

DETERMINING AND/OR ISOLATING A SOURCE OF THE DEGRADATION OF THE SERVICE BASED ON THE RESULTS OF ANALYZING THE ENRICHMENT DATA AND THE RESPECTIVE GROUPS OF PERFORMANCE INDICATORS ASSOCIATED WITH THE RESPECTIVE QOS TAGS AND/OR THE RESPECTIVE SERVICES, AND ASSOCIATED WITH RESPECTIVE BASE STATIONS, RESPECTIVE NETWORK NODES, AND/OR RESPECTIVE COMMUNICATION LINKS OF THE COMMUNICATION NETWORK ⟋ 912

Figure 10:
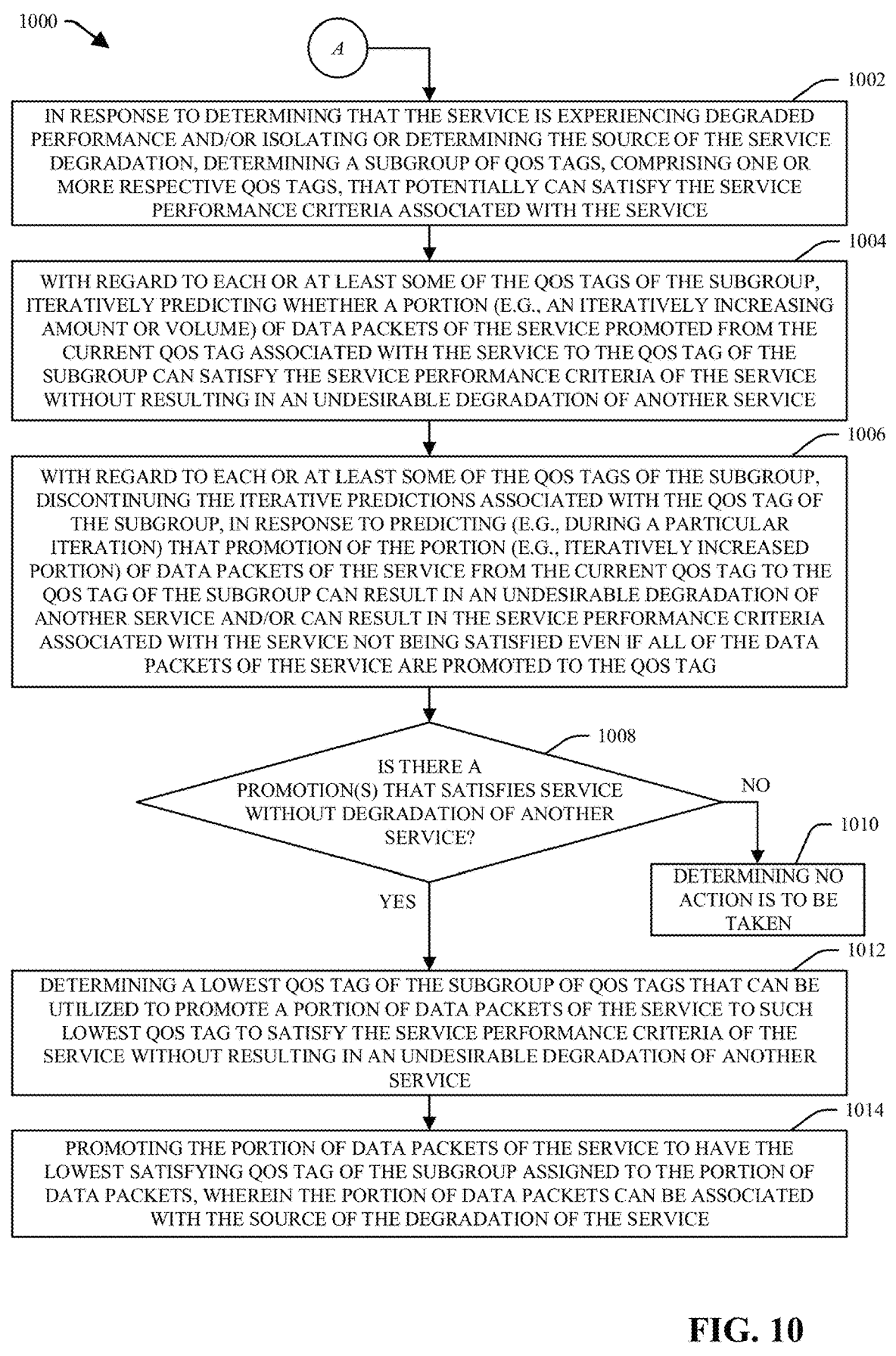

IN RESPONSE TO DETERMINING THAT THE SERVICE IS EXPERIENCING DEGRADED PERFORMANCE AND/OR ISOLATING OR DETERMINING THE SOURCE OF THE SERVICE DEGRADATION, DETERMINING A SUBGROUP OF QOS TAGS, COMPRISING ONE OR MORE RESPECTIVE QOS TAGS, THAT POTENTIALLY CAN SATISFY THE SERVICE PERFORMANCE CRITERIA ASSOCIATED WITH THE SERVICE

1004

WITH REGARD TO EACH OR AT LEAST SOME OF THE QOS TAGS OF THE SUBGROUP, ITERATIVELY PREDICTING WHETHER A PORTION (E.G., AN ITERATIVELY INCREASING AMOUNT OR VOLUME) OF DATA PACKETS OF THE SERVICE PROMOTED FROM THE CURRENT QOS TAG ASSOCIATED WITH THE SERVICE TO THE QOS TAG OF THE SUBGROUP CAN SATISFY THE SERVICE PERFORMANCE CRITERIA OF THE SERVICE WITHOUT RESULTING IN AN UNDESIRABLE DEGRADATION OF ANOTHER SERVICE

1006

WITH REGARD TO EACH OR AT LEAST SOME OF THE QOS TAGS OF THE SUBGROUP, DISCONTINUING THE ITERATIVE PREDICTIONS ASSOCIATED WITH THE QOS TAG OF THE SUBGROUP, IN RESPONSE TO PREDICTING (E.G., DURING A PARTICULAR ITERATION) THAT PROMOTION OF THE PORTION (E.G., ITERATIVELY INCREASED PORTION) OF DATA PACKETS OF THE SERVICE FROM THE CURRENT QOS TAG TO THE QOS TAG OF THE SUBGROUP CAN RESULT IN AN UNDESIRABLE DEGRADATION OF ANOTHER SERVICE AND/OR CAN RESULT IN THE SERVICE PERFORMANCE CRITERIA ASSOCIATED WITH THE SERVICE NOT BEING SATISFIED EVEN IF ALL OF THE DATA PACKETS OF THE SERVICE ARE PROMOTED TO THE QOS TAG

1008

IS THERE A PROMOTION(S) THAT SATISFIES SERVICE WITHOUT DEGRADATION OF ANOTHER SERVICE?

NO

1010

DETERMINING NO ACTION IS TO BE TAKEN

YES

1012

DETERMINING A LOWEST QOS TAG OF THE SUBGROUP OF QOS TAGS THAT CAN BE UTILIZED TO PROMOTE A PORTION OF DATA PACKETS OF THE SERVICE TO SUCH LOWEST QOS TAG TO SATISFY THE SERVICE PERFORMANCE CRITERIA OF THE SERVICE WITHOUT RESULTING IN AN UNDESIRABLE DEGRADATION OF ANOTHER SERVICE

1014

PROMOTING THE PORTION OF DATA PACKETS OF THE SERVICE TO HAVE THE LOWEST SATISFYING QOS TAG OF THE SUBGROUP ASSIGNED TO THE PORTION OF DATA PACKETS, WHEREIN THE PORTION OF DATA PACKETS CAN BE ASSOCIATED WITH THE SOURCE OF THE DEGRADATION OF THE SERVICE

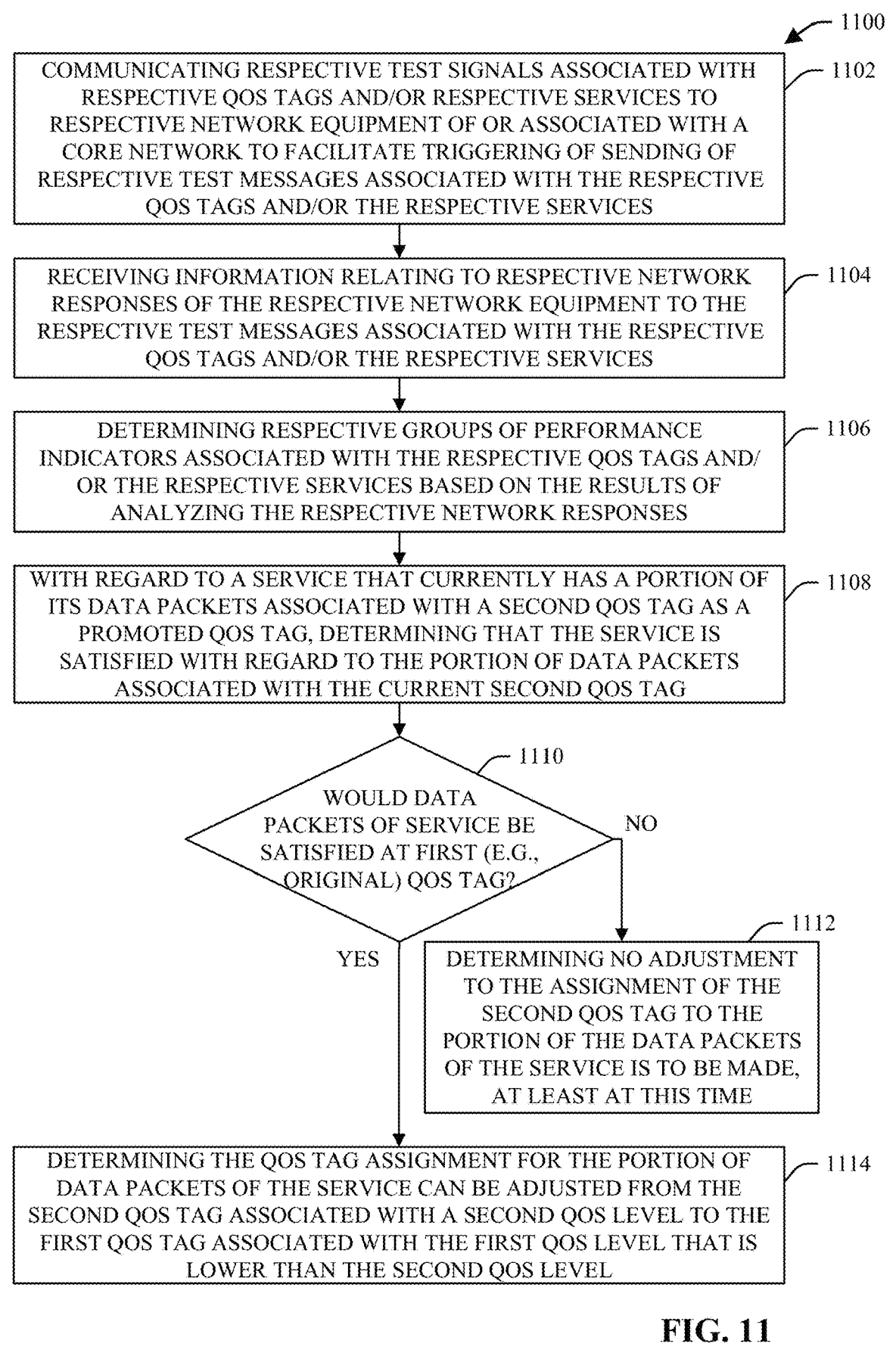

COMMUNICATING RESPECTIVE TEST SIGNALS ASSOCIATED WITH RESPECTIVE QOS TAGS AND/OR RESPECTIVE SERVICES TO RESPECTIVE NETWORK EQUIPMENT OF OR ASSOCIATED WITH A CORE NETWORK TO FACILITATE TRIGGERING OF SENDING OF RESPECTIVE TEST MESSAGES ASSOCIATED WITH THE RESPECTIVE QOS TAGS AND/OR THE RESPECTIVE SERVICES ⟋ 1102

RECEIVING INFORMATION RELATING TO RESPECTIVE NETWORK RESPONSES OF THE RESPECTIVE NETWORK EQUIPMENT TO THE RESPECTIVE TEST MESSAGES ASSOCIATED WITH THE RESPECTIVE QOS TAGS AND/OR THE RESPECTIVE SERVICES ⟋ 1104

DETERMINING RESPECTIVE GROUPS OF PERFORMANCE INDICATORS ASSOCIATED WITH THE RESPECTIVE QOS TAGS AND/ OR THE RESPECTIVE SERVICES BASED ON THE RESULTS OF ANALYZING THE RESPECTIVE NETWORK RESPONSES ⟋ 1106

WITH REGARD TO A SERVICE THAT CURRENTLY HAS A PORTION OF ITS DATA PACKETS ASSOCIATED WITH A SECOND QOS TAG AS A PROMOTED QOS TAG, DETERMINING THAT THE SERVICE IS SATISFIED WITH REGARD TO THE PORTION OF DATA PACKETS ASSOCIATED WITH THE CURRENT SECOND QOS TAG ⟋ 1108

⟋ 1110
WOULD DATA PACKETS OF SERVICE BE SATISFIED AT FIRST (E.G., ORIGINAL) QOS TAG?                    NO

YES

DETERMINING NO ADJUSTMENT TO THE ASSIGNMENT OF THE SECOND QOS TAG TO THE PORTION OF THE DATA PACKETS OF THE SERVICE IS TO BE MADE, AT LEAST AT THIS TIME ⟋ 1112

DETERMINING THE QOS TAG ASSIGNMENT FOR THE PORTION OF DATA PACKETS OF THE SERVICE CAN BE ADJUSTED FROM THE SECOND QOS TAG ASSOCIATED WITH A SECOND QOS LEVEL TO THE FIRST QOS TAG ASSOCIATED WITH THE FIRST QOS LEVEL THAT IS LOWER THAN THE SECOND QOS LEVEL ⟋ 1114

FIG. 11

PREDICTIVE AND ENHANCED DYNAMIC QUALITY OF SERVICE TAGGING ON TRANSPORT LAYER

BACKGROUND

Network providers can utilize different tags, such as quality of service (QoS) tags, which can be associated with different services and associated data, to set different priorities for the services and associated data in connection with communication of such data to or from a core network and base stations. For instance, QoS tags can be utilized by network providers to set different priorities for the services and associated data based on the latency or packet drop sensitivity associated with the services, and handle network congestion on communication links between base stations and the core network.

The above-described description is merely intended to provide a contextual overview regarding communication systems, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise predicting, by a system comprising at least one processor, respective predicted performance indicators associated with respective quality of service tags based on a result of analyzing information relating to respective proposed groups of data packets associated with the respective quality of service tags and respective services, wherein the respective quality of service tags comprise a first quality of service tag and a second quality of service tag, wherein the respective services comprise a first service and a second service, and wherein the respective proposed groups of data packets comprise a proposed group of data packets associated with the first service and a proposed transition from the first quality of service tag to the second quality of service tag. The method also can include: based on the predicting, determining, by the system, whether to adjust a quality of service tag assignment for the proposed group of data packets from the first quality of service tag to the second quality of service tag.

In certain embodiments, the disclosed subject matter can comprise a system that can comprise at least one memory that can store computer executable components, and at least one processor that can execute computer executable components stored in the at least one memory. The computer executable components can comprise a predictor that predicts respective predicted performance indicator values associated with respective quality of service tags based on a result of an analysis of information relating to respective test groups of data packets associated with respective services and the respective quality of service tags, wherein the respective quality of service tags comprise a first quality of service tag and a second quality of service tag, wherein the respective services comprise a first service and a second service, and wherein the respective test groups of data packets comprise a first test group of data packets associated with the first service and the first quality of service tag, a second test group of data packets associated with the second service and the second quality of service tag, and a third test group of data packets associated with the first service and a proposed transition from the first quality of service tag to the second quality of service tag. The computer executable components also can comprise a tag manager that, based on the respective predicted performance indicator values associated with the respective quality of service tags, determines whether to modify a quality of service tag assignment for the third test group of data packets from the first quality of service tag to the second quality of service tag.

In still other embodiments, the disclosed subject matter can comprise a non-transitory machine-readable medium, comprising executable instructions that, when executed by at least one processor, can facilitate performance of operations. The operations can comprise predicting respective predicted performance indicator values associated with respective quality of service tags based on a result of analyzing information relating to respective proposed groups of data packets associated with the respective quality of service tags and respective services, wherein the respective quality of service tags comprise a first quality of service tag and a second quality of service tag, wherein the respective services comprise a first service and a second service, and wherein the respective proposed groups of data packets comprise a first proposed group of data packets associated with the first service and the first quality of service tag, a second proposed group of data packets associated with the second service and the second quality of service tag, and a third proposed group of data packets associated with the first service and a proposed transition from the first quality of service tag to the second quality of service tag. The operations also can comprise: based on the predicting, determining whether to transition the third proposed group of data packets from being associated with the first quality of service tag to being associated with the second quality of service tag.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

BRIEF DESCRIPTION OF THE DRAWINGS

FIG. 8 illustrates a flow chart of an example method that can desirably manage QoS tagging associated with services, in accordance with various aspects and embodiments of the disclosed subject matter.

FIG. 9 depicts a flow chart of an example method that can desirably determine a source of degradation of a service to facilitate desirably managing QoS tagging associated with services, including managing adjustment of a QoS tag assignment associated with a service by determining whether to demote the service to a lower QoS level and original QoS tag from a higher QoS level and/or promoted QoS tag, in accordance with various aspects and embodiments of the disclosed subject matter.

FIG. 10 illustrates a flow chart of an example method that can desirably manage QoS tagging associated with services, including determining whether to adjust a QoS tag assignment associated with a portion of data packets of the service from a lower QoS tag to a higher QoS tag, in accordance with various aspects and embodiments of the disclosed subject matter.

FIG. 11 depicts a flow chart of an example method that can desirably manage QoS tagging associated with services, including managing adjustment of a QoS tag assignment associated with a service by determining whether to demote the service (e.g., a portion of data packets of the service) to a lower QoS level and original QoS tag from a higher QoS level and/or promoted QoS tag, in accordance with various aspects and embodiments of the disclosed subject matter.

DETAILED DESCRIPTION

Figure 1:
FIG. 1 illustrates a block diagram of a non-limiting example system that can desirably manage and perform quality of service (QoS) tagging associated with services, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to managing and performing predictive and dynamic quality of service (QoS) tagging on a transport layer of a communication network. The transport layer can refer, or relate, to connectivity (e.g., fiber, microwave, copper, or other type of connectivity) between a core network and a base station. Network providers can utilize different tags, such as QoS tags, which can be associated with different services and associated data, to set different priorities for the services and associated data in connection with communication of such data to or from a core network and base stations of a communication network. For instance, QoS tags can be utilized by network providers to set different priorities for the services and associated data based on the latency or packet drop sensitivity associated with the services, and handle network congestion on communication links between the base stations and the core network.

With regard to some existing tagging techniques, QoS tagging can be static utilizing, for example, a static QoS tagging table, where the tags applied to services and associated data can be static, as indicated by the entries (e.g., data or tagging entries) of the static QoS tagging table. For example, network providers typically can have personnel who manually set different priorities for different services and can generate a static QoS tagging table that can indicate different tags that can indicate the different priorities of the different services, and the different tags can be applied to the different data of the different services, in accordance with the static QoS tagging table.

For instance, with regard to a downlink data communication, the core network can add a QoS tag to data packets associated with a service where the tag can be determined by the core network based on the tag entries in a pre-defined static QoS tagging table. For uplink data communication, a base station can add a QoS tag to data packets associated with a service where the tag can be determined by the base station based on the tag entries in a pre-defined static QoS tagging table. On sending the data packets via the transport layer, bandwidth on the links between the base station and the core network can be distributed across different services according to their respective priority defined within the pre-defined static QoS tagging table. This can be static regardless of any varying congestion on services and service level agreement (SLA) satisfaction.

This can lead to undesirable (e.g., unwanted, unsuitable, or inefficient) inflexibility to adapt to different traffic patterns (e.g., peak or busy hour(s)) that can occur in the communication network with respect to the base stations and the core network. For instance, such existing tagging techniques can result in inefficient utilization of transport layer resources as the network may be unable to adapt the utilization of the transport layer, within the available resources, in times of varying traffic patterns, where data traffic for different services can vary over time; can result in degradation in QoS and quality of experience (QoE) of user equipment (UE) utilizing the services; can result in failure to satisfy (e.g., failure to meet or exceed) SLAs across different data traffic patterns on the transport layer; and/or can result in an inability to react to unexpected data traffic congestion and spikes in the communication network at the time of occurrence.

Another problem with some of these existing tagging techniques can be that, typically, the same QoS tagging can be configured for multiple base stations and/or the core network, which can be undesirable (e.g., unwanted, unsuitable, inefficient, and/or suboptimal) for multi-vendor deployments. Also, re-adjustment (e.g., manually re-adjustment) of static QoS tagging by network providers due to traffic behavior can be prone to an undesirable amount of operational time passing while waiting for such re-adjusting of QoS tagging to be performed. For instance, typically in the case of detecting traffic congestion or SLA degradation by a network provider(s), the network provider(s) can have personnel re-define the QoS tagging table offline and roll out a re-defined static QoS tagging table(s) to groups of core networks and base stations after some significant (e.g., undesirable and remarkable) amount of lead time.

The disclosed subject matter can address and overcome these and other deficiencies of these existing techniques with regard to QoS tagging. In that regard, it can be desirable (e.g., wanted, advantageous, beneficial, or optimal) to have QoS tagging for services be dynamic, predictive, and automatically adaptable to varying conditions and data traffic patterns of the communication network to enable more efficient utilization of resources (e.g., transport layer resources and/or other resources) of the communication network across varying conditions and data traffic patterns of the communication network, mitigate degradation of services, reduce SLA violations associated with services, and/or apply (e.g., automatically, dynamically, and/or adaptively apply) respective QoS tagging for respective services for respective base stations and respective core networks.

The disclosed subject matter can employ enhanced QoS tagging techniques that can desirably (e.g., advantageously, beneficially, enhancedly, or optimally) have QoS tagging for services be dynamic, predictive, and automatically adaptable to varying conditions and data traffic patterns of the communication network to enable more efficient utilization of resources of the communication network across varying conditions and data traffic patterns of the communication network, mitigate degradation of services, reduce or minimize SLA violations associated with services, and/or apply (e.g., dynamically and/or adaptively apply) respective QoS tagging for respective services for respective base stations and respective core networks, among other benefits.

To that end, techniques that can desirably (e.g., automatically, dynamically, predictively, suitably, reliably, efficiently, enhancedly, and/or optimally) manage and perform enhanced QoS tagging for services are presented. A system can comprise a network monitor component that can be associated with (e.g., communicatively connected to) one or more core networks and one or more base stations, wherein a core network can be associated with one or more base stations.

With regard to a core network associated with a base station, the network monitor component can communicate respective test signals (e.g., two-way active measurement protocol (TWAMP) signals or other type of test signals) associated with respective QoS tags and/or respective services to the core network and/or the base station to initiate or trigger testing of network responses to test messages associated with the respective QoS tags and/or the respective services.

In response to the respective test signals, the core network and/or base station can exchange the respective test messages and respective test response messages associated with the respective QoS tags and/or the respective services. The core network and/or base station can determine or measure respective performance indicators (e.g., key performance indicators (KPIs)) associated with the respective QoS tags and/or the respective services, based at least in part on the respective network responses with respect to the respective test messages and the respective test response messages. The core network and/or base station can communicate respective performance indicator information relating to the respective QoS tags and/or the respective services to the network monitor component.

The network monitor component, employing a tag manager component and/or predictor component, can analyze the respective performance indicator information, respective service specifications (e.g., SLAs) associated with the respective services, original QoS tag information, current QoS tag information, and/or enrichment data (e.g., network topology information) relating to the communication network, and can perform and manage an iterative prediction process, to predict or determine which services are or can be satisfied at which QoS tags, determine or isolate a source (e.g., communication link(s), base station(s), or network node(s)) of degradation of a service, and/or determine whether adjustments to assignments of QoS tags to services are to be performed. The original QoS tag information (e.g., original QoS tag table) can indicate respective original QoS tags that originally or previously (e.g., on a long term basis) have been assigned to the respective services. The current QoS tag information (e.g., current QoS tag table) can indicate respective current QoS tags that currently are assigned to the respective services, wherein some of the current QoS tags may be original QoS tags and/or some of the other current QoS tags may be promoted (e.g., higher) QoS tags that have been temporarily assigned to certain relatively lower priority services. In certain embodiments, the network monitor component can determine and/or generate service performance information (e.g., service performance table) that can indicate which of the respective services are or can be satisfied at the respective QoS tags based at least in part on the results of analyzing the respective performance indicator information and the respective service specifications associated with the respective services with respect to the respective QoS tags, such as described herein.

As part of the analysis, the network monitor component can determine whether a service is experiencing degradation such that the service specification of the service is not being satisfied (e.g., met). That is, based at least in part on the analysis results, the network monitor component can determine whether one or more respective performance indicators associated with the QoS tag assigned to the service are failing to satisfy one or more respective threshold performance indicators indicated or specified by the service specification (e.g., service performance criteria of the service specification). In certain embodiments, if the network monitor component determines that a service is experiencing degradation (e.g., due to one or more respective performance indicators associated with the QoS tag assigned to the service failing to satisfy one or more respective threshold performance indicators), the network monitor component can determine or isolate a source (e.g., communication link(s), base station(s), and/or network node(s) of the communication network) that is or may be causing the degradation of the service, based at least in part on the results of the analysis of the enrichment data, the respective performance indicator information relating to the respective QoS tags and/or the respective services, the respective service specifications associated with the respective services, original QoS tag information, current QoS tag information, and/or other information, such as described herein.

In some embodiments, if a service has been determined to be degraded, as part of the analysis process, the predictor component can employ a trained machine learning model to perform the iterative prediction process to predict or determine whether promotion of a portion (e.g., a certain amount or volume) of data packets of the degraded service from the current (e.g., original) QoS tag of the service to a QoS tag of a subgroup of QoS tags can satisfy the service specification of the service without undesirably (e.g., unsuitably, unwantedly, or unacceptably) degrading another service (e.g., a higher, same, or lower priority service). The tag manager component can determine the subgroup of QoS tags, which can comprise one or more QoS tags, that at least potentially can satisfy the service specification of the service, based at least in part on the service performance information (e.g., service performance table)). With regard to the degraded service, and with regard to each QoS tag, or at least some QoS tags, of the subgroup, the predictor component, employing the trained machine learning model, can iteratively predict whether promotion of respective portions (e.g., iteratively increasing amounts of volumes) of data packets from the current QoS tag of the service to that QoS tag of the subgroup can satisfy the service specification of the service without undesirably degrading performance of another service such that the other service does not satisfy its service specification, based at least in part on iteratively inputting information relating to respective subgroups of data packets associated with respective QoS tags, including the portion of data packets associated with the QoS tag of the subgroup, to the trained machine learning model. During each iteration, based at least in part on the input information, the trained machine learning model can output respective predicted performance indicators associated with the respective QoS tags and/or respective services that can indicate the predicted performance of the communication network if the respective subgroups of data packets associated with respective QoS tags, including the portion of data packets associated with the QoS tag of the subgroup, were to be communicated via the communication network using the respective QoS tags. During each iteration, the predictor component or tag manager component can predict or determine whether the respective predicted performance indicators associated with the respective QoS tags and/or respective services satisfy the respective performance indicators associated with the respective services.

With regard to each QoS tag, or at least some QoS tags, of the subgroup, the predictor component can perform one or more iterative evaluations and predictions regarding promotion of iteratively increasing portions of data packets from the current QoS tag to the QoS tag of the subgroup until the predictor component determines or predicts that a proposed promoted portion of data packets may cause undesirable degradation of another service (or until it is predicted or determined that no promoted amount of data packets to the QoS of the subgroup can satisfy the service specification of the service). If it is predicted that promotion of a particular portion of data packets from the current QoS tag to the QoS tag of the subgroup may cause undesirable degradation of another service, the predictor component or tag manager component can discontinue the iterative prediction process with regard to that QoS tag of the subgroup. If there was a previous iteration (e.g., immediately previous iteration) where the predictor component predicted that promotion of such previous portion of data packets from the current QoS tag to the QoS tag of the subgroup can satisfy the service specification of the service without resulting in undesirable degradation of another service, the tag manager component can determine that promotion of that previous portion of data packets from the current QoS tag to the QoS tag of the subgroup can be a candidate QoS tag assignment adjustment that can be considered. If there is another QoS tag of the subgroup to evaluate, the predictor component can perform the same or similar iterative prediction process to evaluate and predict the effect of promotion of a portion of data packets from the current QoS tag to that other QoS tag of the subgroup.

If, based at least in part on the results of the analysis and predictions relating to promotions of portions of data packets to QoS tags of the subgroup of QoS tags, the tag manager component determines that there is no promotion of a portion of data packets to any of the QoS tags of the subgroup that can satisfy the service specification of the service without resulting in undesirable degradation of another service (or if there is no promotion of a portion of data packets to any of the QoS tags of the subgroup that can even satisfy the service specification of the service), the tag manager component can determine that no action (e.g., remedial or mitigation action) is to be taken, at least at this time. Accordingly, the tag manager component can determine that the QoS tag assignment associated with data packets of the service is not to be adjusted or transitioned from the QoS tag to any of the QoS tags of the subgroup, in accordance with defined tag management criteria.

In some embodiments, if, instead, based at least in part on the results of the analysis and predictions, the tag manager component determines that there is at least one promotion of a portion of data packets to at least one QoS tag of the subgroup that can satisfy the service specification of the service without resulting in undesirable degradation of another service, the tag manager component can determine which of the one or more candidate QoS tags of the subgroup is the lowest (e.g., lowest priority) satisfying QoS tag that can be utilized to promote a portion of data packets to that lowest satisfying QoS tag to satisfy the service specification of the service without resulting in undesirable degradation of another service, relative to any other (e.g., relatively higher priority) satisfying QoS tag (if any) of the subgroup that also can be a candidate with regard to data packets of the service, in accordance with the defined tag management criteria. The tag manager component can adjust the QoS tag assignment for the service for data packets of the service to assign the portion (e.g., desired amount or volume) of data packets to the lowest satisfying QoS tag, with the remaining portion (e.g., remaining amount or volume) of data packets of the service continuing to be assigned to the current (e.g., original) QoS tag. In certain embodiments, the portion of data packets can be those data packets of the service that can be associated with (e.g., that would be communicated or routed via) the identified source (e.g., communication link(s), base station(s), or network node(s)) of the degradation of the service, to facilitate enabling those data packets to be more quickly and reliably communicated, routed, and processed, so that the service specification for the service can be satisfied. The device, the base station(s), and/or the network node(s) of the communication network can facilitate communication, routing, and processing of the portion of data packets, based at least in part on (e.g., in accordance with) such lowest satisfying QoS tag, as well as the communication, routing, and processing of the remaining portion of data packets of the service based at least in part on the current (e.g., original) QoS tag assigned to the remaining portion of data packets of the service.

In accordance with various embodiments, based at least in part on the results of the analysis of the current QoS tag information, the original QoS tag information, and the service performance information, and/or prediction information relating to the predictions made by the predictor component, the network monitor component can perform (e.g., automatically, dynamically, or proactively perform) one or more tag management actions (e.g., mitigation or remedial actions), which can comprise promoting (e.g., temporarily promoting) a service, or a portion of data packets of the service, from a lower (e.g., its original lower) QoS tag to a higher QoS tag, demoting a service, or a portion of data packets of the service, from a higher QoS tag to its original lower QoS tag, and/or another type of tag management action, or can determine that no adjustment to an assignment of a QoS tag to a service is to be performed at a particular time, in accordance with the defined tag management criteria, such as more fully described herein.

These and other aspects and embodiments of the disclosed subject matter will now be described with respect to the drawings.

Referring now to the drawings, FIG. 1 illustrates a block diagram of a non-limiting example system 100 that can desirably (e.g., automatically, dynamically, proactively, efficiently, reliably, suitably, enhancedly, or optimally) manage and perform QoS tagging associated with services, in accordance with various aspects and embodiments of the disclosed subject matter. The system 100 can comprise a communication network 102 that can comprise a core network 104 and one or more base stations, including base station 106, that can be associated with (e.g., communicatively connected to) the core network 104. The core network 104 and the one or more base stations (e.g., base station 106) can facilitate (e.g., enable) wireless communication of data (e.g., voice or other audio data, video data, textual data, or other data) between devices (e.g., communication devices or UEs), such as devices associated with the core network 104, via the one or more base stations, and other devices associated with the core network 104 or, more generally, the communication network 102 (e.g., a device, such as a server or computer, can be connected to the communication network 102 via a wireline connection or via a network other than the core network 104).

The devices can comprise, for example, devices 108, 110, and/or 112. A device (e.g., 108, 110, or 112) can be, for example, a wireless, mobile, or smart phone, a computer, a laptop computer, a server, an electronic pad or tablet, a virtual assistant (VA) device, electronic eyewear, an electronic watch, or other electronic bodywear, an electronic gaming device, an Internet of Things (IoT) device (e.g., a health monitoring device, a toaster, a coffee maker, blinds, a music player, speakers, a telemetry device, a smart meter, a machine-to-machine (M2M) device, or other type of IoT device), a device of a connected vehicle (e.g., car, airplane, train, rocket, and/or other at least partially automated vehicle (e.g., drone)), a personal digital assistant (PDA), a dongle (e.g., a universal serial bus (USB) or other type of dongle), a communication device, or other type of device. In some embodiments, the non-limiting term user equipment (UE) can be used to describe the device. The device 108 can be associated with (e.g., communicatively connected to) the communication network 102 via a communication connection and channel, which can include a wireless or wireline communication connection and channel.

In accordance with various embodiments, the core network 104 can comprise various network components that can facilitate wireless communication of data. In some embodiments, the base station 106 can be a 5G or other NR base station (e.g., gNB or other NR-type or xG base station, wherein x can be a number greater than 5). In certain embodiments, the core network 104 can comprise a UPF node, an access and mobility management function (AMF) node, and/or other network functions. The UPF node can connect to or interface with the one or more base stations (e.g., base station 106), can be an interconnect point between the core network and a data network (DN), can provide or facilitate providing a protocol data unit (PDU) session anchor point for providing mobility associated with radio access technologies (RATs), can provide or facilitate providing data packet routing or forwarding, and/or can perform or manage other functions. The AMF node can be a control plane function that can manage registration and deregistration of devices (e.g., devices 108, 110, and/or 112) with the core network 104, manage connections of devices with the core network 104, manage mobility associated with devices (e.g., maintain knowledge of locations of devices, update locations of devices), and/or manage or perform other functions. In accordance with various other embodiments, the base station 106 can be a 4$^{th}$ generation (4G) long term evolution (LTE) base station, or the base station 106 can comprise 4G LTE technology and functions, and 5G or other NR-type or xG technology and functions.

The communication network 102, more generally, or the core network 104 can comprise various other network equipment (e.g., routers, gateways, transceivers, switches, access points, radio access networks (RANs), network functions, processor components, data stores, or other devices or network nodes) that facilitate (e.g., enable) communication of information between respective items of network equipment of the communication network 102, and/or communication of information between the one or more devices (e.g., devices 108, 110, and/or 112) and the communication network 102. The communication network 102, including the core network 104, can provide or facilitate wireless or wireline communication connections and channels between the one or more devices (e.g., devices 108, 110, and/or 112), and/or respectively associated services or application, and the communication network 102. For reasons of brevity or clarity, some of the various network equipment, components, functions, or devices of the communication network may not be explicitly shown or described herein.

At various times, the respective devices (e.g., devices 108, 110, and/or 112) can utilize respective services, such as, for example, service 114, service 116, and/or service 118). The services can comprise or relate to, for example, voice service (e.g., conversational voice services or other voice services), video streaming service, conversational video service, buffered video service, audio streaming service, other type of streaming service, text or messaging service, data service, control message service (e.g., control message service relating to control of communication network functions and operations), signaling service, real time gaming service, interactive gaming service, transmission control protocol (TCP) service, control message service relating to automated or semi-automated vehicles or motorized devices, law enforcement-related service, medical-related service, emergency-related service, military-related service, background traffic service, or other desired types of service.

As disclosed, network providers can utilize respective (e.g., different) tags, such as QoS tags, which can be associated with the respective services (e.g., 114, 116, and/or 118) and associated data, to set respective priorities for the services and associated data in connection with communication of such data to or from the core network 104 and base stations (e.g., base station 106) of the communication network 102. For example, respective QoS tags can be utilized by network providers to set respective priorities for the respective services and associated data based at least in part on respective performance indicators (e.g., KPIs), comprising the respective latency (e.g., respective delay), respective jitter, respective packet drop sensitivity, respective data throughput, respective bandwidth, respective data packet retransmission rate, or other respective attribute or factor (e.g., other respective performance indicator) associated with the respective services, and handle network congestion on communication links between the base stations and the core network 104. Respective services can have respective priority levels, respective SLAs, respective operational or service specifications, and/or other respective attributes, and the respective QoS tags for the respective services can be determined based at least in part on the respective priority levels, respective SLAs, respective operational or service specifications, and/or other respective attributes. For instance, an operational or service specification or SLA associated with a service (e.g., service 114) can specify or indicate a priority level, a threshold maximum amount of latency, a threshold maximum amount of jitter, a threshold maximum data pack loss rate, and/or another threshold attribute value that can be acceptable for operation of the service, and a desirable QoS tag for that service can be determined based at least in part on the priority level, the threshold maximum amount of latency, the threshold maximum amount of jitter, the threshold maximum data pack loss rate, and/or the other threshold attribute value associated with (e.g., applicable to) the service.

As an example, TABLE 1 presents some non-limiting example attributes, such as delay budget (e.g., latency in milliseconds (ms)) and packet drop rate (e.g., packet loss rate), and associated attribute threshold values for some example types of services, in accordance with their SLAs.

TABLE 1

| Example Attributes and Attribute Threshold Values | | |
|---|---|---|
| | Delay Budget (ms) | Packet Drop Rate |
| Conversational voice | 100 | $10^{-2}$ |
| Conversational video | 150 | $10^{-3}$ |
| Real time gaming | 50 | $10^{-6}$ |
| Streaming | 300 | $10^{-6}$ |
| Control messages | 100 | $10^{-6}$ |
| Buffered video | 300 | $10^{-6}$ |
| Interactive gaming | 100 | $10^{-3}$ |
| TCP services | 300 | $10^{-6}$ |
| Background traffic | 300 | $10^{-6}$ |

If a service has a relatively lower delay budget (e.g., 50 ms or 100 ms), this often can translate to it being desirable (e.g., wanted, suitable, needed, or optimal) for that service to have a relatively higher QoS tag associated with a relatively higher QoS level assigned to such service, whereas, if a service has a relatively higher delay budget (e.g., 300 ms), this often can translate to it being desirable for that service to have a relatively lower QoS tag associated with a relatively lower QoS level assigned to such service, since there is only a finite amount of network resources available. It is noted that delay budget is but one factor of a number of factors that can be considered and balanced when determining a QoS tag to assign to a service. For example, while, as presented in TABLE 1, the example control message service (e.g., control messages relating to control of the functions and operations of the communication network 102) can have a delay budget of 100 ms, which, while a relatively lower value, is higher than the delay budget of 50 ms for the example real time gaming service, control messages can be, or at least sometimes can be, a higher priority than real time gaming, since it can be more desirable (e.g., wanted, needed, important, or optimal) to have the communication network 102 operate properly than to ensure that real time gaming operates properly, and accordingly, it may be desired to have the QoS tag assigned to the control message service be higher than the QoS tag assigned to the real time gaming service. It is to be appreciated and understood that the example attribute values and the example services listed in TABLE 1 are non-limiting examples, and there can be other services in addition to, or instead of, the services listed in TABLE 1 the attribute values can be different that presented in TABLE 1, and the attributes under consideration can include other types of attributes than presented in TABLE 1.

In some embodiments, respective QoS tags can have or be associated with respective values (e.g., numerical values, such as differentiated services code point (DSCP) values, virtual local area network (VLAN) priority values, or other type of values) that can indicate respective QoS levels and/or priority levels associated with the respective QoS tags. In certain embodiments, a set of QoS tags can comprise 64 different QoS tags that can range from QoS tag 0 up through QoS tag 63, wherein the lower the QoS tag number (e.g., QoS tag 0), the lower the QoS level and/or priority level, and the higher the QoS tag number (e.g., QoS tag 63), the higher the QoS level and/or priority level. Accordingly, a higher priority service for which a higher QoS level and/or priority level is desired typically can have a higher QoS tag (e.g., QoS tag 46) than a QoS tag (e.g., QoS tag 24) that can be assigned to a relatively lower priority service for which a lower QoS level and/or priority level can be desired or acceptable. As a non-limiting example, a voice service may be assigned QoS tag 46 (e.g., DSCP 46), which can correspond to a relatively higher priority level (e.g., forwarding priority level of 5), a signaling service also may be assigned QoS tag 46, a streaming service may be assigned QoS tag 36, which can correspond to a medium priority level (e.g., forwarding priority level of 4), a buffered video service may be assigned QoS tag 24, which can correspond to a lower medium priority level (e.g., forwarding priority level of 3), and/or one or more other services may be assigned respective QoS tags with numbers that can be higher or lower than 24, or can be 24, and which can correspond to respective QoS levels and/or priority levels that can be greater or lower than the lower medium priority level of QoS tag 24. In certain embodiments, a tag value of a QoS tag assigned to or otherwise associated with a data packet can be part of the header information of a header (e.g., IP packet header) of the data packet. For example, with regard to DSCP values, there can be a 6-bit field, which can have a value representative of a number ranging from 0 to 63, that can be in the header information of the header of the data packet.

When a data packet arrives at network equipment (e.g., a base station (e.g., base station 106), a router, or other type of network equipment) of the communication network 102, the network equipment can route, queue, communicate, or otherwise process the data packet based at least in part on the QoS tag associated with the data packet. For instance, the network equipment can analyze the QoS tag (e.g., can analyze the header information, comprising the QoS tag), and, based at least in part on the result of such analysis, can identify or determine the value of the QoS tag. The network equipment can route, queue, communicate, and/or otherwise process the data packet based at least in part on (e.g., in accordance with) the value of the QoS tag. Typically, the network equipment can route, queue, communicate, and/or otherwise process a data packet associated with a QoS tag having a higher QoS or priority value faster than another data packet associated with another QoS tag having a relatively lower QoS or priority value than the higher QoS or priority value. For example, the network equipment can insert a data packet associated with a QoS tag having a higher QoS or priority value in a higher priority or faster queue, and can insert the other data packet associated with the other QoS tag having the lower QoS or priority value in a relatively lower priority or relatively slower queue, wherein the data packet in the higher priority or faster queue typically can be routed, communicated, and/or otherwise processed (e.g., routed or communicated to a next network equipment or other destination) by the network equipment faster than the other data packet in the lower priority or slower queue.

It is to be appreciated and understood that, in other example embodiments, the services (e.g., voice service, signaling service, streaming service, or buffered video service) can have different QoS tag numbers and/or different priority levels than the above example. It also is to be appreciated and understood that, in some embodiments, there can be more or less than 64 respective (e.g., different) QoS or priority tag values associated with respective QoS or priority tags, which can be assigned to or associated with respective services, and/or more or less than a 6-bit field in the header information, or other desired location for tag information, that can be utilized to represent or set the QoS or priority value of the QoS tag. It also is to be appreciated and understood that, in certain embodiments, the numbering of higher or lower priority QoS tags and/or priority levels can be different from that above (e.g., a lower QoS tag number can have higher priority than a higher QoS tag number; or respective lower QoS tag numbers can be associated with lower or higher priority levels, and respective higher QoS tag numbers also can be associated with lower or higher priority levels). It further is to be appreciated and understood that, in some embodiments, other types of QoS tagging, such as VLAN priority tags or other desired type of tags can be utilized to tag respective data associated with respective services (e.g., registered services). In accordance with various embodiments, the respective network equipment of the communication network 102 can be configured to employ and utilize virtually any type of QoS or priority tagging of data packets (e.g., QoS or priority tags having DSCP values, VLAN priority values, or other desired type of QoS or priority values), and process the data packets in accordance with any such type of QoS or priority tagging of data packets. The associating, assigning, or setting of respective QoS or priority tags to respective data packets, based at least in part on the respective QoS or priority of the respective tags, can be as desired (e.g., as is suitable, efficient, wanted, required, or optimal) provided that such associating, assigning, or setting of respective QoS tags to respective data packets is in accordance with (e.g., is consistent, compatible, and/or usable with, and/or is suitable for) the communication network 102.

Existing tagging techniques for tagging data with tags, such as QoS tags, can suffer from various problems, inefficiencies, and deficiencies, such as described herein. For instance, existing tagging techniques can be static, or at least substantially static and inflexible, and reactive (e.g., reactive, and undesirably slow to react, to service degradation), regardless of any varying congestion on services and SLA satisfaction or violation, such as described herein. The disclosed subject matter can address and overcome such problems, inefficiencies, and deficiencies of existing techniques with regard to QoS tagging.

To that end, in accordance with various embodiments, the system 100 can comprise a network monitor component 120 that can desirably (e.g., automatically, dynamically, proactively, efficiently, reliably, suitably, enhancedly, or optimally) manage and perform QoS tagging associated with the services (e.g., 114, 116, and/or 118) and data associated therewith, in accordance with various aspects and embodiments of the disclosed subject matter. The network monitor component 120, and associated components of the system 100, can address and overcome the problems, inefficiencies, and deficiencies of existing techniques with regard to QoS tagging. For instance, the network monitor component 120 can employ enhanced QoS tagging techniques that can desirably (e.g., advantageously, beneficially, enhancedly, or optimally) have QoS tagging for the services (e.g., 114, 116, and/or 118) be dynamic, proactive, and automatically adaptable to varying conditions and data traffic patterns of the communication network 102 to enable more efficient utilization of resources of the communication network 102 across varying conditions and data traffic patterns of the communication network 102, mitigate degradation of the services, reduce or minimize SLA violations associated with the services, and/or apply (e.g., automatically, proactively, dynamically, and/or adaptively assign, update, or apply) respective QoS tagging for respective services, or respective portions of data packets of respective services, for respective base stations (e.g., base station 106) and respective core networks (e.g., core network 104), among other benefits, such as described herein.

In some embodiments, the network monitor component 120 can be located outside of the communication network 102 and core network 104, and can be associated with (e.g., communicatively connected to) the core network 104 (and communication network 102) and the base stations (e.g., base station 106). In other embodiments, the network monitor component 120 can be part of the communication network 102 or core network 104, and can be associated with (e.g., communicatively connected to) the base stations (e.g., base station 106). In certain embodiments, the core network 104 can employ an Open RAN (O-RAN) architecture, and can comprise a service management and orchestration (SMO) platform, where the network monitor component 120 can be part of the SMO platform or can be associated with the SMO platform, although, in other embodiments, the core network 104 can employ an RAN architecture other than an O-RAN architecture.

The network monitor component 120 can employ automated dynamic updating of QoS tags assigned to services (e.g., 114, 116, and/or 118) and associated data packets in real time, or at least near real time, to ensure that SLAs of higher priority services are satisfied while also adjusting (e.g., temporarily adjusting) assignments of lower priority services that are determined to be degraded (e.g., in violation of SLA) to enable such lower priority services to satisfy their SLAs. The network monitor component 120 can achieve such desirable automated dynamic updating of QoS tags assigned to services by implementing, managing, and/or performing various functions. For instance, the network monitor component 120 can utilize protocols, such as TWAMP, that can sense transport layer performance of the transport layer of the communication network 102 in a continuous, substantially continuous, automated, and/or dynamic manner. The output data (e.g., responses of the base station 106 and/or core network 104 to the TWAMP signals or other test signals) can provide the network monitor component 120 with clear visibility of the delay, jitter, packet loss, or other attribute on the transport layer path for each type of service. The transport layer can refer, or relate, to connectivity (e.g., fiber, microwave, copper, or other type of connectivity) between the core network 104 and a base station (e.g., base station 106).

The network monitor component 120 can compare this output data against the SLA of each service in terms of delay, jitter, packet loss, or other attribute to facilitate determining whether there is an SLA violation (e.g., service degradation) associated with a service. If, based at least in part on the results of such comparison, the network monitor component 120 determines that a particular service is experiencing an SLA violation, the network monitor component 120 can determine and/or isolate a source (e.g., communication link(s), base station(s), and/or network node(s) of the communication network 102) of the degradation of the service, determine whether to promote the QoS tag assignment for that particular service, or a portion of data packets of that particular service, to assign (e.g., temporarily assign) a higher QoS tag to the particular service, or a portion of data packets of that particular service, to enable the particular service to satisfy its SLA (e.g., without causing an undesirable degradation of another service), initiate closed-loop (e.g., feedback loop) monitoring associated with the services and the QoS tags, and/or perform other operations, functions, or actions, such as described herein. In some embodiments, the network monitor component 120 can employ an iterative prediction process and machine learning models to predict whether a portion of data packets of a service can be promoted from a current (e.g., original) QoS tag to a higher (e.g., a relatively higher priority) QoS tag that can satisfy the service specification (e.g., SLA) of the service without resulting in an undesirable degradation (e.g., a service specification violation) of another service (e.g., a higher, same, or lower priority service), such as described herein. This can enable the network monitor component 120 to desirably determine or predict (e.g., proactively determine or predict) whether performing such a QoS tag assignment promotion for the portion of data packets of the service to a higher QoS tag may cause an undesirable degradation of another service before determining whether to take such tag management action to make such QoS tag assignment promotion, so that the network monitor component 120 can reduce or minimize the risk or occurrence of degradation of another service due to QoS tag assignment promotion for the portion of data packets of the service to the higher QoS tag. For instance, if the network monitor component 120 predicts or determines that such tag management action may result in undesirable degradation of another service, the network monitor component 120 can determine that such tag management action is not to be taken and/or can determine another tag management action that can be taken without undesirable degradation of another service, such as described herein.

With regard to the closed-loop monitoring, the network monitor component 120 can utilize the closed-loop monitoring to monitor the services by applying test signals (e.g., TWAMP signals or other type of test signals) to the base stations (e.g., base station 106) and the core network 104. For instance, the network monitor component 120 can utilize the closed-loop monitoring and the application of test signals to monitor the services, including the higher priority services, for service specification (e.g., SLA) violations, and, for services with promoted QoS tags, to monitor those services to determine whether those services can be demoted back to their original lower QoS tag while still satisfying their service specification, such as described herein.

If, based at least in part on the results of such monitoring and analysis of output data (e.g., test result data) derived from the test signals, the network monitor component 120 determines that another service (e.g., a higher priority service or other service) associated with another QoS tag (e.g., a higher QoS tag) is degraded (e.g., is experiencing a service specification violation), for example, due to one or more lower priority services being promoted to that other QoS tag or to another QoS tag, the network monitor component 120 can demote the QoS tag for the one or more lower priority services to their original lower QoS tags, and, in some embodiments, can ban (e.g., temporarily ban) those services from being promoted back up to that other QoS tag(s) for a defined time period. In certain embodiments, even if there is no service specification violation identified with regard to the other (e.g., higher) QoS tag, if, based at least in part on the results of such monitoring and analysis of output data, the network monitor component 120 determines that a service that had been promoted to the other QoS tag (e.g., due to a previous SLA violation) would be able to satisfy its service specification at its original lower QoS tag, the network monitor component 120 can demote the QoS tag for that service back to the original lower QoS tag assigned to that service.

The network monitor component 120 and the enhanced QoS tagging management techniques employed by the network monitor component 120 and associated components, such as described herein, can utilize test signals (e.g., TWAMP signals) in a continuous, substantially continuous, automated, and/or dynamic manner to detect degrading (e.g., SLA violations) of services caused by transport layer congestion or for other reasons, can dynamically, proactively, and automatically control assignments of respective QoS tags to respective services (e.g., 114, 116, and/or 118) for QoS enhancement (e.g., QoS optimization) for the services, can opportunistically free up higher QoS tags and associated network resources for higher priority services as well as for lower priority promoted services that had been degraded to avoid or mitigate (e.g., reduce or minimize) congestion of the communication network 102 (e.g., avoid or mitigate congestion of the transport layer and network resources of the communication network 102), and can desirably monitor and maintain service specifications (e.g., SLAs) for services, including higher priority services, amid dynamic QoS tag updates.

Figure 2:
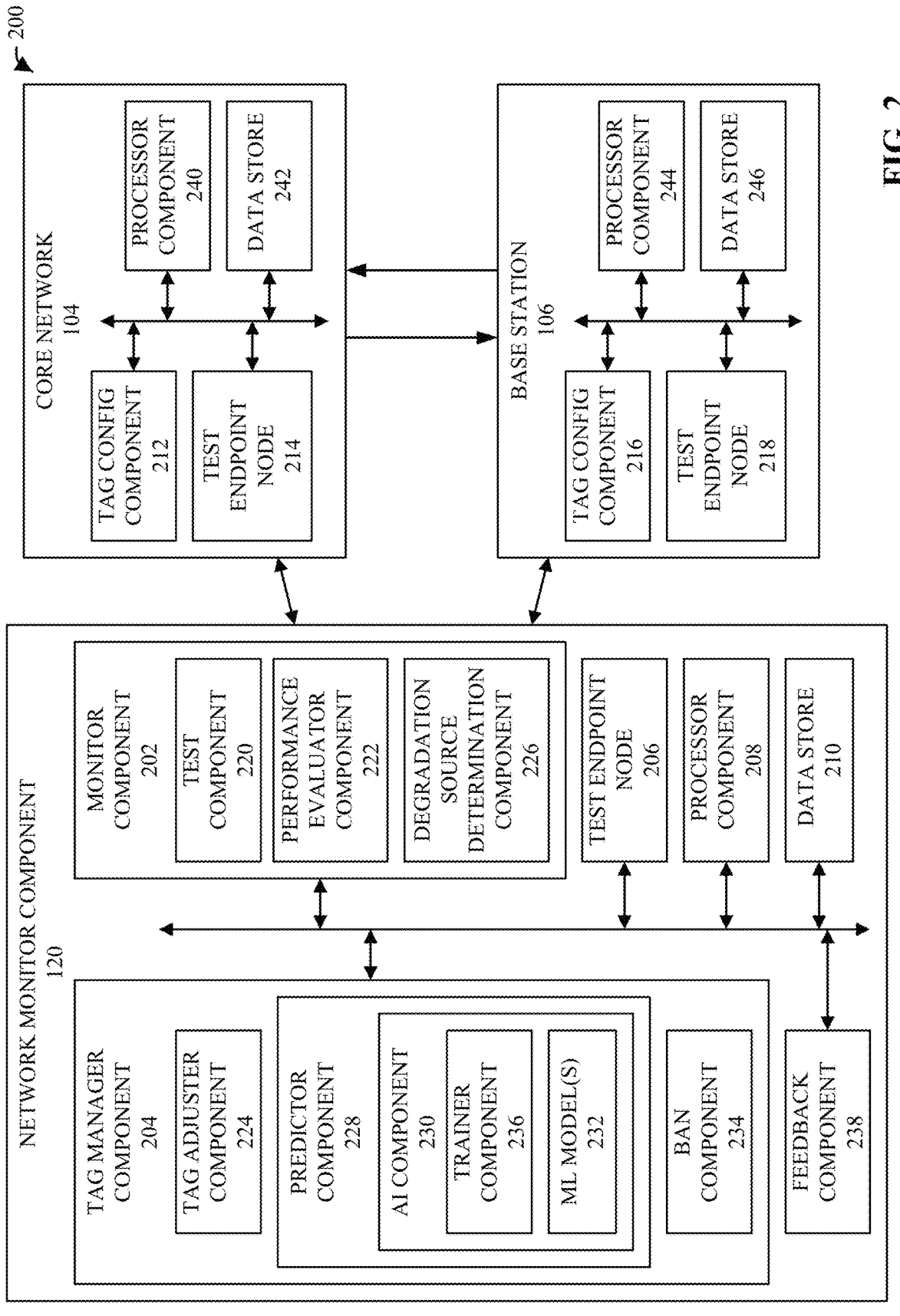
FIG. 2 depicts a block diagram of a non-limiting example system that can desirably manage and perform QoS tagging associated with services, in accordance with various aspects and embodiments of the disclosed subject matter.

Referring to FIG. 2 (along with FIG. 1), FIG. 2 depicts a block diagram of a non-limiting example system 200 (which can be part of the system 100) that can desirably (e.g., automatically, dynamically, proactively, efficiently, reliably, suitably, enhancedly, or optimally) manage and perform QoS tagging associated with services, in accordance with various aspects and embodiments of the disclosed subject matter. The system 200 can comprise the core network 104, the base station 106, and the network monitor component 120.

The core network 104 can be associated with (e.g., communicatively connected to) one or more base stations, including the base station 106, and the network monitor component 120 can be associated with (e.g., communicatively connected to) the core network 104 and the one or more base stations, including the base station 106. The network monitor component 120 can comprise a monitor component 202, a tag manager component 204, a test endpoint node 206, a processor component 208, and a data store 210. The core network 104 can comprise a tag configuration component (TAG CONFIG COMPONENT) 212 and a test endpoint node 214 as well as other network equipment. The test endpoint node 214 can be a server, router, or other network equipment (e.g., other network node) of the core network 104. The base station 106 can comprise a tag configuration component 216 and a test endpoint node 218 as well as other network equipment. The test endpoint node 218 can be a transceiver, router, or other network equipment (e.g., other network node) of the base station 106.

In some embodiments, respective original (e.g., initial), baseline, or non-promoted QoS tags can be assigned to respective services (e.g., 114, 116, and/or 118) and associated data based at least in part on the respective attributes (e.g., KPIs, such as priority level, latency, jitter, packet loss rate, or other attribute) associated with the respective services. In certain embodiments, personnel associated with a network provider can determine the respective original, baseline, or non-promoted QoS tags for the respective services (e.g., 114, 116, and/or 118) and associated data, and can assign such QoS tags to the respective services, based at least in part on the respective attributes associated with the respective services. In other embodiments, the tag manager component 204 can determine the respective original, baseline, or non-promoted QoS tags for the respective services (e.g., 114, 116, and/or 118) and associated data, and can assign such QoS tags to the respective services, based at least in part on the respective attributes associated with the respective services.

The tag manager component 204 can store information (e.g., mapping, linking, and/or table information) relating to or indicating the respective original, baseline, or non-promoted QoS tags assigned to the respective services in the data store 210. In some embodiments, the tag manager component 204 can generate an original QoS tag table, comprising the information (e.g., mapping information) relating to or indicating the respective original, baseline, or non-promoted QoS tags assigned to the respective services, and can store the original QoS tag table in the data store 210 (e.g., in a database in the data store 210). For example, the original QoS tag table can, for each service (e.g., each registered service), indicate or specify an original, baseline, or non-promoted QoS tag (e.g., original QoS tag that can have a QoS tag number, DSCP number, VLAN priority value, or other tag or priority value) associated with (e.g., assigned to) that service and/or other desired information relating to the service and/or the original QoS tag, wherein such other information can comprise information relating to or indicating the QoS tag level, VLAN priority level, or other priority level associated with the service.

A QoS tag assigned to a service (e.g., 114) for uplink data communications can be same as or different from a QoS tag assigned to that service for downlink data communications. The tag manager component 204 can respectively and independently control the assignments of respective QoS tags, including adjustments (e.g., promotions or demotions; modifications or changes) to assignments of respective QoS tags, for uplink data communications and downlink data communications for each service (e.g., 114, 116, or 118), in accordance with the defined tag management criteria, such as described herein.

An original, baseline, or non-promoted QoS tag associated with a service (e.g., 114, 116, or 118) can be the first QoS tag assigned to the service, or, if there has been a change (e.g., permanent or long term change) to the QoS tag assignment to another QoS tag (e.g., another QoS tag that is higher or lower than the previous QoS tag), such other QoS tag can become the original, baseline, or non-promoted QoS tag associated with a service. In some embodiments, the tag manager component 204 can adjust (e.g., temporarily adjust) a tag assignment associated with a service, or at least a portion of data packets of the service, to promote (e.g., temporarily promote) the QoS tag for the service from its original, baseline, or non-promoted QoS tag to a promoted or higher (e.g., higher level) QoS tag with respect to the service or at least the portion of data packets of the service, such as described herein.

The core network 104 can employ the tag configuration component 212 to set, configure, re-set, or re-configure (e.g., automatically, dynamically, and/or adaptively set, configure, re-set, or re-configure) the respective QoS tags associated with the respective services (e.g., 114, 116, and/or 118) for downlink data communications, in accordance with the tag assignments made by and received from the tag manager component 204 and/or the network provider personnel. The tag configuration component 212 can associate (e.g., link) or apply the respective QoS tags to respective data packets associated with the respective services in connection with the downlink communication of the respective data packets, and respective associated QoS tags, from the core network 104 to the base station 106. The respective data packets associated with the respective services can be communicated and routed via respective data communication paths and/or respective queues (e.g., on the transport layer) based at least in part on (e.g., in accordance with) the respective QoS tags and their respective QoS levels. For instance, the core network 104 can communicate and route data packets associated with a higher QoS tag to the base station 106 via faster and/or more reliable data communication paths and/or queues than other data packets associated with a lower QoS tag. For example, data packets associated with a higher QoS tag can be routed via one or more priority queues that can enable faster and/or more reliable communication of the data packets to or towards their destination (e.g., end device, such as device 108), and data packets associated with a lower QoS tag can be routed via one or more other lower priority queues (e.g., weighted round robin queue or other type of queue) that can communicate the data packets to or toward their destination at a relatively lower speed and/or relative lower level of reliability, as compared to the priority queues.

The base station 106 can employ the tag configuration component 216 to set, configure, re-set, or re-configure (e.g., automatically, dynamically, proactively, and/or adaptively set, configure, re-set, or re-configure) the respective QoS tags associated with the respective services (e.g., 114, 116, and/or 118) for uplink data communications, in accordance with the tag assignments made by and received from the tag manager component 204 and/or the network provider personnel. The tag configuration component 216 can associate or apply the respective QoS tags to respective data packets associated with the respective services in connection with the uplink communication of the respective data packets, and respective associated QoS tags, from the base station 106 to the core network 104. The respective data packets associated with the respective services can be communicated and routed via respective data communication paths and/or respective queues (e.g., on the transport layer) based at least in part on (e.g., in accordance with) the respective QoS tags and their respective QoS levels. For instance, the base station 106 can communicate and route data packets associated with a higher QoS tag to the core network 104 via faster and/or more reliable data communication paths and/or queues than other data packets associated with a lower QoS tag.

The monitor component 202 can monitor respective network performance of the communication network 102, including respective network performance associated with the core network 104 and the base station 106, with regard to respective services (e.g., 114, 116, and/or 118) of a group of services 250 and respective QoS tags associated with the respective services, based at least in part on respective test messages (e.g., TWAMP messages or other type of test messages) that can be initiated or triggered by the monitor component 202, wherein the group of services 250 can be or can comprise registered services (S) (e.g., $S_1$, $S_2$, $S_3$, . . . , $S_n$). In some embodiments, the monitor component 202 can comprise a test component 220 that can send (e.g., automatically, periodically, or dynamically communicate) respective test signals associated with the respective services (e.g., registered services of the group of services 250) and/or the respective QoS tags associated therewith, such as the services 114, 116, and/or 118, to the core network 104 and the base station 106 to initiate or trigger, or facilitate triggering, communication of respective test messages associated with the respective services and/or the respective QoS tags from the core network 104 to the base station 106 and respective test response messages to those respective test messages from the base station 106 to the core network 104, and communication of respective test messages associated with the respective services and/or the respective QoS tags from the base station 106 to the core network 104 and respective test response messages to those respective test messages from the core network 104 to the base station 106. The respective test messages and the respective response messages can facilitate (e.g., enable) measurement of the respective network performance of the communication network 102, including the core network 104 and the base station 106, with regard to the respective services and/or respective QoS tags associated therewith, such as described herein. Also, the automatic, periodic, or dynamic sending of test signals by the test component 220 desirably (e.g., efficiently, reliably, suitably, enhancedly, or optimally) can facilitate (e.g., enable or assist) identification of any service degradations of the services (e.g., 114, 116, and/or 118), for example, caused by inefficiency of the transport layer and/or other network components of the communication network 102, and rectification, remediation, or mitigation of any such service degradations of the services, more quickly (e.g., at faster time intervals) than manual testing of services by network personnel (e.g., network administrators).

In response to receiving the respective test signals associated with the respective services (e.g., 114, 116, and/or 118) and/or the respective QoS tags, the core network 104 can communicate respective test messages associated with the respective services and/or the respective QoS tags from the test endpoint node 214 to the test endpoint node 218 of the base station 106 via the transport layer. In response to receiving the respective test messages, the test endpoint node 218 of the base station 106 can communicate respective test response messages associated with the respective services and/or the respective QoS tags to the test endpoint node 214 of the core network 104 via the transport layer.

In response to the base station 106 receiving the respective test signals associated with the respective services (e.g., 114, 116, and/or 118) and/or the respective QoS tags from the test component 220, the base station 106 also can communicate respective test messages associated with the respective services and/or the respective QoS tags from the test endpoint node 218 to the test endpoint node 214 of the core network 104 via the transport layer. In response to receiving the respective test messages, the test endpoint node 214 of the core network 104 can communicate respective test response messages associated with the respective services and/or the respective QoS tags to the test endpoint node 218 of the base station 106 via the transport layer.

In some embodiments, a test message can be a TWAMP message that can comprise one or more test data packets (e.g., TWAMP, Internet control message protocol (ICMP), or other type of test data packet) that can be communicated from a first endpoint node (e.g., the test endpoint node 214; or conversely, the test endpoint node 218) to a second endpoint node (e.g., the test endpoint node 218; or conversely, the test endpoint node 214) via the transport layer, where, in response to receiving the test message, the second endpoint node can communicate a TWAMP response message that can comprise one or more test response data packets that can be communicated from the second endpoint node to the second endpoint node. With regard to each test message, the sender (e.g., the test endpoint node 214; or conversely, the test endpoint node 218) of the test message or another component associated with the sender of the test message can track, measure, and/or determine the network response, including the responses of the receiver of the test message (including the sending of the test response message), the transport layer, and/or other associated network components, to the test message. To facilitate the tracking, measuring, and/or determining of the network response, there can be timestamping of the test data packets in connection with the sending of the test data packets and timestamping of test response data packets in connection with the sending of the test response data packets, wherein such timestamp information can be utilized to measure or determine certain performance indicators, such as delay and jitter, associated with the sending of the test data packets and the sending of the test response data packets. Also, to facilitate the tracking, with regard to each service (e.g., 114, 116, or 118), the test data packets of the test message and the test response data packets of the test response message can include, for example, in the header information of such data packets, the QoS tag value (e.g., DSCP value, VLAN tag value, or other tag value) associated with the service being tested using that test message and test response message.

Accordingly, with regard to each test message associated with each service (e.g., 114, 116, or 118) and/or associated QoS tag, in response to the test endpoint node 214 receiving the test response message associated with that service and/or QoS tag from the test endpoint node 218 of the base station 106, the test endpoint node 214 or another component of the core network 104 can determine or measure a group of performance indicators (e.g., a group of KPIs comprising delay, jitter, data packet loss rate, or other KPI) that can indicate the network performance (e.g., of the core network 104, base station 106, transport layer, and/or other associated component) in response to the sending of the test message to the test endpoint node 218 of the base station 106 and the sending of the test response message from the test endpoint node 218 to the test endpoint node 214 of the core network 104. The core network 104 (e.g., the test endpoint node 214 or other component of the core network 104) can communicate network response information comprising or relating to the respective groups of performance indicators associated with the respective services (e.g., 114, 116, and/or 118) and/or respective QoS tags with respect to that round of testing of network performance from the core network side.

Also, with regard to each test message associated with each service (e.g., 114, 116, or 118) and/or associated QoS tag, in response to the test endpoint node 218 of the base station 106 receiving the test response message associated with that service and/or QoS tag from the test endpoint node 214 of the core network 104, the test endpoint node 218 or another component of the base station 106 can determine or measure a group of performance indicators (e.g., a group of KPIs comprising delay, jitter, data packet loss rate, or other KPI) that can indicate the network performance (e.g., of the core network 104, base station 106, transport layer, and/or other associated component) in response to the sending of the test message to the test endpoint node 214 of the core network 104 and the sending of the test response message from the test endpoint node 214 to the test endpoint node 218 of the base station 106. The base station 106 (e.g., the test endpoint node 218 or other component of the base station 106) can communicate network response information comprising or relating to the respective groups of performance indicators associated with the respective services (e.g., 114, 116, and/or 118) and/or respective QoS tags with respect to that round of testing of network performance from the base station side.

The network monitor component 120 (e.g., the monitor component 202) can receive the network response information comprising or relating to the respective groups of performance indicators associated with the respective services (e.g., 114, 116, and/or 118) and/or respective QoS tags with respect to that round of testing of network performance from the core network side, and can receive the network response information comprising or relating to the respective groups of performance indicators associated with the respective services and/or respective QoS tags with respect to that round of testing of network performance from the base station side. The network monitor component 120 can store that respective network response information in the data store 210.

In some embodiments, with regard to each round of testing, the monitor component 202, employing a performance evaluator component 222, can analyze (e.g., automatically analyze or evaluate) the network response information (e.g., respective groups of performance indicators) with respect to that round of testing of network performance from the core network side, the network response information (e.g., respective groups of performance indicators) with respect to that round of testing of network performance from the base station side, and respective service specification information (e.g., respective SLAs or other respective service specifications) associated with the respective services (e.g., 114, 116, and/or 118) of the group of services 250. In certain embodiments, as part of the analysis, with regard to each service, the performance evaluator component 222 can compare the respective performance indicators (e.g., performance indicator values) of the group of performance indicators associated with that service to respective (e.g., corresponding and/or applicable) threshold performance indicator values associated with (e.g., indicated by, determined from, or obtained from) the service specification information for that service to facilitate determining whether one or more of the respective performance indicators do not satisfy (e.g., do not meet, do not comply with, or otherwise do not satisfy) one or more of the respective threshold performance indicator values.

Based at least in part on the results of analyzing the network response information (e.g., respective groups of performance indicators) from the core network side, the network response information (e.g., respective groups of performance indicators) from the base station side, and the respective service specification information associated with the respective services (e.g., 114, 116, and/or 118), the performance evaluator component 222 can determine whether one or more of the respective services associated with one or more respective QoS tags are experiencing degraded performance (e.g., are experiencing violation of their respective service specifications (e.g., their respective SLAs)). For instance, with regard to each service of the group of services 250, based at least in part on the analysis results, the performance evaluator component 222 can determine whether one or more respective performance indicators (e.g., performance indicator values) of the group of performance indicators associated with that service do not satisfy one or more respective threshold performance indicator values associated with the service specification information for that service. A failure of one or more of the respective performance indicators to satisfy one or more of the respective threshold performance indicator values can mean or indicate that the service is experiencing degraded performance at its currently assigned QoS tag (e.g., due in part to or caused by inefficiency in the transport layer and/or associated network components of the communication network 102). If the respective performance indicators are determined to satisfy the respective threshold performance indicator values, this can mean or indicate that the service is not experiencing degraded performance at its currently assigned QoS tag and is currently in compliance with its service specification (e.g., its SLA). With regard to each service, based at least in part on the results of such determinations with regard to whether the respective performance indicators satisfy the respective threshold performance indicator values, the performance evaluator component 222 can generate service performance information that can indicate or specify whether that service is in compliance with its service specification, or is instead experiencing degraded performance, at its currently assigned QoS tag, whether the service is or would be in compliance with its service specification, or instead is or would be experiencing degraded performance, at its originally assigned QoS tag (e.g., which may or may not be different from its currently assigned QoS tag), and/or the respective QoS tags at which the service can be in compliance with its service specification.

With regard to each round of testing of network performance of the communication network 102 with respect to the services, the performance evaluator component 222 can store, in the data store 210, the respective service performance information relating to the respective services and/or the respective QoS tags associated therewith that can indicate or specify whether the respective services are in compliance with their respective service specifications, or are instead experiencing degraded performance, at their respective currently assigned QoS tags, whether the respective services are or would be in compliance with their respective service specifications, or instead are or would be experiencing degraded performance, at their respective originally assigned QoS tags, and/or the respective QoS tags at which the respective services can be in compliance with their respective service specifications.

In some embodiments, the performance evaluator component 222 can generate (e.g., create) a service performance table (e.g., a pivot table or summary table for the group of services 250) that can comprise the respective service performance information relating to the respective services and/or the respective QoS tags associated therewith, or respective pivot or summary service performance information derived from the respective service performance information, with regard to the round of testing (e.g., the current or most recent round of testing of the communication network 102 using test messages). For instance, the performance evaluator component 222 can generate a service performance table that can indicate or specify which services (e.g., 114, 116, and/or 118) of the group of services 250 can be satisfied at which QoS tags for all QoS tags or all available QoS tags, with regard to the round of testing, in accordance with the defined tag management criteria. The performance evaluator component 222 can store the service performance table in the data store 210.

In certain embodiments, with regard to each QoS tag associated with a QoS level, and each service of the group of services 250, in the field or cell of the service performance table associated with such QoS tag and such service, if the service was, or can be or would be, satisfied at that QoS tag associated with that QoS level, the performance evaluator component 222 can insert a first value (e.g., a "1" value) that can indicate the service was, or can be or would be, satisfied at that QoS tag, and, if the service was not, or cannot be or would not be, satisfied at that QoS tag associated with that QoS level, the performance evaluator component 222 can insert a second value (e.g., a "0" value) that can indicate the service was not, or cannot be or would not be, satisfied at that QoS tag.

A non-limiting example of a service performance table is presented in TABLE 2.

TABLE 2

| Example Service Performance Table | | | |
|---|---|---|---|
| QoS Tag | $S_1$ | $S_2$ | $S_3$ |
| 0 | 0 | 0 | 0 |
| 31 | 0 | 0 | 0 |
| 34 | 1 | 0 | 0 |
| 39 | 1 | 0 | 0 |
| 46 | 1 | 1 | 0 |
| 48 | 1 | 1 | 1 |
| . . . | 1 | 1 | 1 |

As can be observed in example TABLE 2, none of the services listed in the service performance table can satisfy their respective service specifications at QoS tag 0, and none of the services listed in the service performance table can satisfy their respective service specifications at QoS tag 31. As also can be observed in example TABLE 2, at QoS tag 34, service 1 ($S_1$) can satisfy its service specification, however, service 2 ($S_2$) and service 3 ($S_3$) cannot satisfy their respective service specifications at QoS tag 34, and, at QoS tag 39, it still can be the case that service 1 ($S_1$) can satisfy its service specification, but service 2 ($S_2$) and service 3 ($S_3$) cannot satisfy their respective service specifications at QoS tag 39. As further can be observed in example TABLE 2, at QoS tag 46, service 1 ($S_1$) and service 2 ($S_2$) can satisfy their respective service specifications, however, service 3 ($S_3$) cannot satisfy its service specification at QoS tag 46. As also can be observed in example TABLE 2, at QoS tag 48 (and for QoS tags higher than QoS tag 48), service 1 ($S_1$), service 2 ($S_2$), service 3 ($S_3$) can satisfy their respective service specifications.

It is to be appreciated and understood that, for reasons of clarity and brevity, not all QoS tags and not all services of the group of services have been included in example TABLE 2. It also is to be appreciated and understood that, under different circumstances and/or different network conditions of the communication network 102, and/or depending on what the respective services are and what their respective service specifications are, the respective services may satisfy or not satisfy their respective service specifications at different QoS tags than as presented in example TABLE 2. It also is to be appreciated and understood that, there can be respective (e.g., separate or different) service performance tables that can indicate network performance associated with the transport layer with regard to the uplink data communications and that can indicate network performance associated with the transport layer with regard to the downlink data communications, with respect to the services, or there can be a comprehensive service performance table that can indicate network performance associated with the transport layer with regard to the uplink data communications and the downlink data communications.

In some embodiments, the service performance information relating to the respective services (e.g., 114, 116, and/or 118) and/or the respective QoS tags can be feedback information (e.g., from the feedback loop described herein) that the tag manager component 204 desirably can utilize to facilitate determining (e.g., automatically, dynamically, proactively, efficiently, enhancedly, or optimally determine) whether to update (e.g., adjust) assignments of respective QoS tags to respective services, or respective portions of data packets of the respective services, such as described herein. For instance, the tag manager component 204 can utilize the service performance information relating to the respective services (e.g., 114, 116, and/or 118) and/or the respective QoS tags (e.g., the service performance information itself, the pivot or summary service performance information derived therefrom, or the table information (which can include the pivot or summary service performance information) in the service performance table) to facilitate determining whether any services have been degraded, and determining whether any adjustment is to be made to respective assignments of respective QoS tags to respective services, or respective portions of data packets of the respective services, and/or any other action is to be taken with respect to the services and/or QoS tags, in accordance with the defined tag management criteria, such as described herein. Utilizing the service performance information and other information (e.g., current QoS tag assignments, original QoS tag assignments, prediction information, ban-related information, and/or other information) described herein, the tag manager component 204 can desirably control (e.g., automatically, dynamically, proactively, and/or adaptively control, adjust, or update) assignments of respective QoS tags to respective services, or respective portions of data packets of the respective services, with respect to the core network 104 and the base station 106 to ensure or facilitate ensuring that respective service specifications associated with the respective services can be satisfied over the transport layer between the core network 104 and the base station 106, such as described herein.

In some embodiments, the tag manager component 204 can determine (e.g., automatically or dynamically determine) whether any services (e.g., 114, 116, and/or 118) have been degraded, and determine (e.g., automatically or dynamically determine) whether any adjustment is to be made to respective assignments of respective QoS tags to respective services and/or any other action is to be taken with respect to the services and/or QoS tags, based at least in part on the respective network performance information relating to respective network performance levels associated with the respective QoS tags and/or respective services, the respective original QoS tag assignments associated with the respective services, the current QoS tag assignments associated with the respective services, the respective service specification information associated with the respective services, and/or prediction information regarding predictions relating to the effects of adjusting a QoS tag assignment associated with a service, in accordance with the defined tag management criteria. In certain embodiments, the tag manager component 204 can determine whether any services (e.g., 114, 116, and/or 118) have been degraded, and determine whether any adjustment is to be made to respective assignments of respective QoS tags to respective services and/or any other action is to be taken with respect to the services and/or QoS tags, based at least in part on the service performance table (e.g., current or most recent service performance table) relating to the respective services and/or respective QoS tags, the current QoS tag table relating to current assignments of QoS tags to the respective services, the original QoS tag table relating to the original (e.g., original, baseline, or non-promoted) assignments of QoS tags to the respective services, and/or the prediction information regarding the predictions relating to the effects of adjusting a QoS tag assignment associated with a service, in accordance with the defined tag management criteria. The use of the service performance table, the current QoS tag table, and/or the original QoS tag table by the tag manager component 204 can desirably make such determinations relating to tag management more efficient.

As an example, TABLE 3 can present non-limiting example assignments (e.g., original, baseline, or non-promoted assignments) of respective QoS tags to respective services.

TABLE 3

| Original QoS Tag Assignments to Services | |
| --- | --- |
| Service | QoS Tag |
| $S_1$ | 34 |
| $S_2$ | 39 |
| $S_3$ | 46 |

As another example, TABLE 4 can present non-limiting example current assignments of respective QoS tags to respective services.

TABLE 4

| Current QoS Tag Assignments to Services | |
| --- | --- |
| Service | QoS Tag |
| $S_1$ | 34 |
| $S_2$ | 46 |
| $S_3$ | 46 |

It is to be appreciated and understood that, for reasons of clarity and brevity, not all QoS tags and not all services of the group of services have been included in example TABLE 3 and example TABLE 4. It also is to be appreciated and understood that, under different circumstances and/or depending on what the respective services are and what their respective service specifications are, the respective original assignments of QoS tag to respective services may be different than as presented in example TABLE 3. It further is to be appreciated and understood that, under different circumstances and/or different network conditions of the communication network 102, and/or depending on what the respective services are and what their respective service specifications are, the respective current assignments of QoS tag to respective services may be different than as presented in example TABLE 4. It also is to be appreciated and understood that, there can be respective (e.g., separate or different) original QoS tag tables and/or respective current QoS tag tables with regard to the uplink data communications and downlink data communications, or there can be a comprehensive original QoS tag table and/or a comprehensive current QoS tag table that can be utilized with regard to the uplink data communications and downlink data communications.

In accordance with various embodiments, based at least in part on the service performance information, the current assignments of QoS tags to services (e.g., 114, 116, and/or 118), the original assignments of QoS tags to services, the prediction information, and/or other information, the tag manager component 204 can initiate or perform (e.g., automatically or dynamically initiate or perform) one or more of a number of actions (e.g., tag management actions) relating to tag assignments for the services, or can determine that no action has to be initiated or performed at all, at a particular time, in accordance with the defined tag management criteria. For example, if, based at least in part on the results of analyzing the service performance information, the current assignments of QoS tags to services, and/or the original assignments of QoS tags to services, the tag manager component 204 determines that a service (e.g., service 114) is experiencing degraded performance while its original QoS tag is assigned to it, the tag manager component 204 can determine or isolate the source of the service degradation, and can promote (e.g., temporarily promote) a portion of data packets of the degraded service from a current (e.g., original) QoS tag to a higher QoS tag that is determined to satisfy the service specification (e.g., SLA) associated with the service without resulting in degradation of another service, such as more fully described herein. As another example, if, based at least in part on the results of analyzing the service performance information, the current assignments of QoS tags to services, and/or the original assignments of QoS tags to services, the tag manager component 204 determines that a service (e.g., service 116), which had been promoted to a higher QoS tag, is satisfying its service specification while at the higher QoS tag, and also determines that its service specification would still be satisfied at its original QoS tag, the tag manager component 204 can demote the service back to its original QoS tag, such as more fully described herein. As still another example, if, based at least in part on the results of analyzing the service performance information, the current assignments of QoS tags to services, and/or the original assignments of QoS tags to services, the tag manager component 204 determines that, after promoting one or more services (e.g., service 114) to a higher QoS tag from their original QoS tags, another service (e.g., service 118), which can be a higher priority service having the higher QoS tag originally assigned to it, is experiencing degraded performance, the tag manager component 204 can demote the one or more promoted services back to their original QoS tags and temporarily ban (e.g., ban for a defined time period) the one or more services from being promoted to the higher QoS tag, such as more fully described herein.

With further regard to determining whether to promote a service (e.g., a portion of data packets of a service) from a current QoS tag to a higher QoS tag (wherein such analysis and determination can be performed with regard to all services, or at least all non-promoted services at that time), with regard to a service (e.g., service 114), as part of the analysis, the tag manager component 204, employing a tag adjuster component 224, can determine the current QoS tag assigned to the service based at least in part on the information relating to the current assignments of QoS tags to services (e.g., the current QoS tag table). The tag adjuster component 224 also can determine whether the current QoS tag assigned to the service is the original QoS tag assigned to the service based at least in part on analysis of the current QoS tag assigned to the service and the information relating to the original (e.g., original, baseline, or non-promoted) assignments of QoS tags to the respective services (e.g., the original QoS tag table). If the current QoS tag is the same as the original QoS indicated in the information relating to the original assignments of QoS tags to the respective services, the tag adjuster component 224 can determine that the current QoS tag is the original QoS tag assigned to the service (e.g., service 114). If, instead, the current QoS tag is not the same as the original QoS indicated in the information relating to the original assignments of QoS tags to the respective services, the tag adjuster component 224 can determine that the current QoS tag is not the original QoS tag assigned to the service (e.g., service 114), but rather the current QoS tag is a promoted or higher QoS tag than the original QoS tag that was originally or previously assigned to the service.

The tag adjuster component 224 also can determine whether the service (e.g., service 114) is experiencing degraded performance (e.g., is not satisfying its service specification) at its current QoS tag based at least in part on the results of analyzing the service performance information relating to the respective services (e.g., 114, 116, and/or 118) and/or the respective QoS tags (e.g., the service performance information itself, the pivot or summary service performance information derived therefrom, or the table information (which can include the pivot or summary service performance information) in the service performance table) with respect to the service and the current QoS tag assigned to the service. For instance, the tag adjuster component 224 can check (e.g., analyze) the service performance table to determine whether the service specification for the service is satisfied (e.g., a "1" value) or is not satisfied (e.g., a "0" value), and thus, degraded, at its current QoS tag.

If the tag adjuster component 224 determines that the service (e.g., service 114) is not degraded, and the original QoS tag is currently assigned to the service, the tag adjuster component 224 can determine that no adjustment to the assignment of the current QoS tag (here, the original QoS tag) to the service is to be made, at least at this time, in accordance with the defined tag management criteria. If, instead, the tag adjuster component 224 determines that the service (e.g., service 114) is degraded, and the original QoS tag is currently assigned to the service, the tag adjuster component 224 can determine whether to promote (e.g., temporarily promote) at least a portion of data packets of the service from being assigned to the current QoS tag to being assigned to a higher QoS tag (e.g., a QoS tag that is associated with a higher QoS level and/or priority level, and/or has a corresponding higher tag value, than the current QoS tag), in accordance with the defined tag management criteria.

In the latter case (e.g., degraded service performance detected), in some embodiments, in response to determining that the service is experiencing degraded performance at its current QoS tag, the monitor component 202 can employ a degradation source determination component 226 that can determine and/or isolate a source of the degradation of the service (e.g., service 114). In some embodiments, the degradation source determination component 226 can receive enrichment data, which can comprise network topology information, from a desired source (e.g., the core network 104, another device, a user, or other entity). The network topology information can indicate or specify the topology of the communication network 102, including the arrangement of, and respective relationships (e.g., direct or indirect physical or logical connections) between, respective base stations (e.g., base station 106), network nodes, communication links, or other network equipment of or associated with the communication network 102, including the core network 104. The degradation source determination component 226 can analyze the enrichment data, including the network topology information, and, based at least in part on the results of such analysis, the degradation source determination component 226 can determine the topology of the communication network 102, including the arrangement of, and the respective relationships between, the respective base stations (e.g., base station 106), the network nodes, the communication links, or other network equipment of or associated with the communication network 102, including the core network 104.

The degradation source determination component 226 also can analyze the respective groups of performance indicators associated with the respective QoS tags, the respective services (e.g., 114, 116, and/or 118), and/or the communication links, the base stations (e.g., base station 106), and/or the network nodes of or associated with the communication network 102. For instance, the degradation source determination component 226 can analyze the respective groups of performance indicators (or corresponding respective service performance tables) associated with the respective base stations (e.g., base station 106) and/or network nodes of the core network 104. In some embodiments, such analysis by the degradation source determination component 226 can comprise a comparative and/or subtractive analysis of the respective groups of performance indicators (or corresponding respective service performance tables) associated with the respective base stations (e.g., base station 106) and/or network nodes of the core network 104.

Based at least in part on the results of the analysis of the respective groups of performance indicators and the analysis of the network topology of the communication network 102, the degradation source determination component 226 can determine, identify, and/or isolate the source of the degradation of the service (e.g., service 114), which can include a base station(s) (e.g., base station 106), a network node(s), and/or a communication link(s) of the communication network 102, and the communication path associated therewith. For example, the comparative and/or subtractive analysis of the respective groups of performance indicators by the degradation source determination component 226 may indicate that a network node (e.g., a router) between the base station 106 and the core network 104, the base station 106, another network node, and communication links associated therewith are experiencing issues that are causing the respective group of performance indicators associated with that network node, base station 106, and other network node to have undesirable values that result in one or more of the threshold performance indicators associated with the service and associated QoS tag not being satisfied, whereas some other network nodes, base stations, and/or communication links have or are associated with respective groups of performance indicators that do satisfy the threshold performance indicators associated with the service and associated QoS tag. Also, based at least in part on such comparative and/or subtractive analysis and the analysis of the network topology, the degradation source determination component 226 can identify or determine that the network node (e.g., router), the base station 106, and that other node are directly or indirectly connected to each other via communication links, and further can remove the other network nodes, other base stations, and/or other communication links, which satisfy the service and associated QoS tag, from consideration as the source of the service degradation. Further, from that analysis, the degradation source determination component 226 can determine that the node (e.g., router) is the source of the service degradation, and can determine the other affected components (e.g., base station 106, the other network node, and the communication links associated therewith), and the affected (e.g., degraded) communication path between the base station 106 and the core network 104. That is, from the analysis, the degradation source determination component 226 can determine that the service and associated QoS tag were being satisfied at other points (e.g., the other network nodes, other base stations, and/or other communication links) in the communication network 102, until data packets associated with the service and QoS tag reached the node (e.g., router), and at that point, the service began experiencing degradation, and this negatively affected other parts (e.g., base station 106, other network node, and communication links associated therewith) of the communication path associated with the node (e.g., router).

Figure 3:
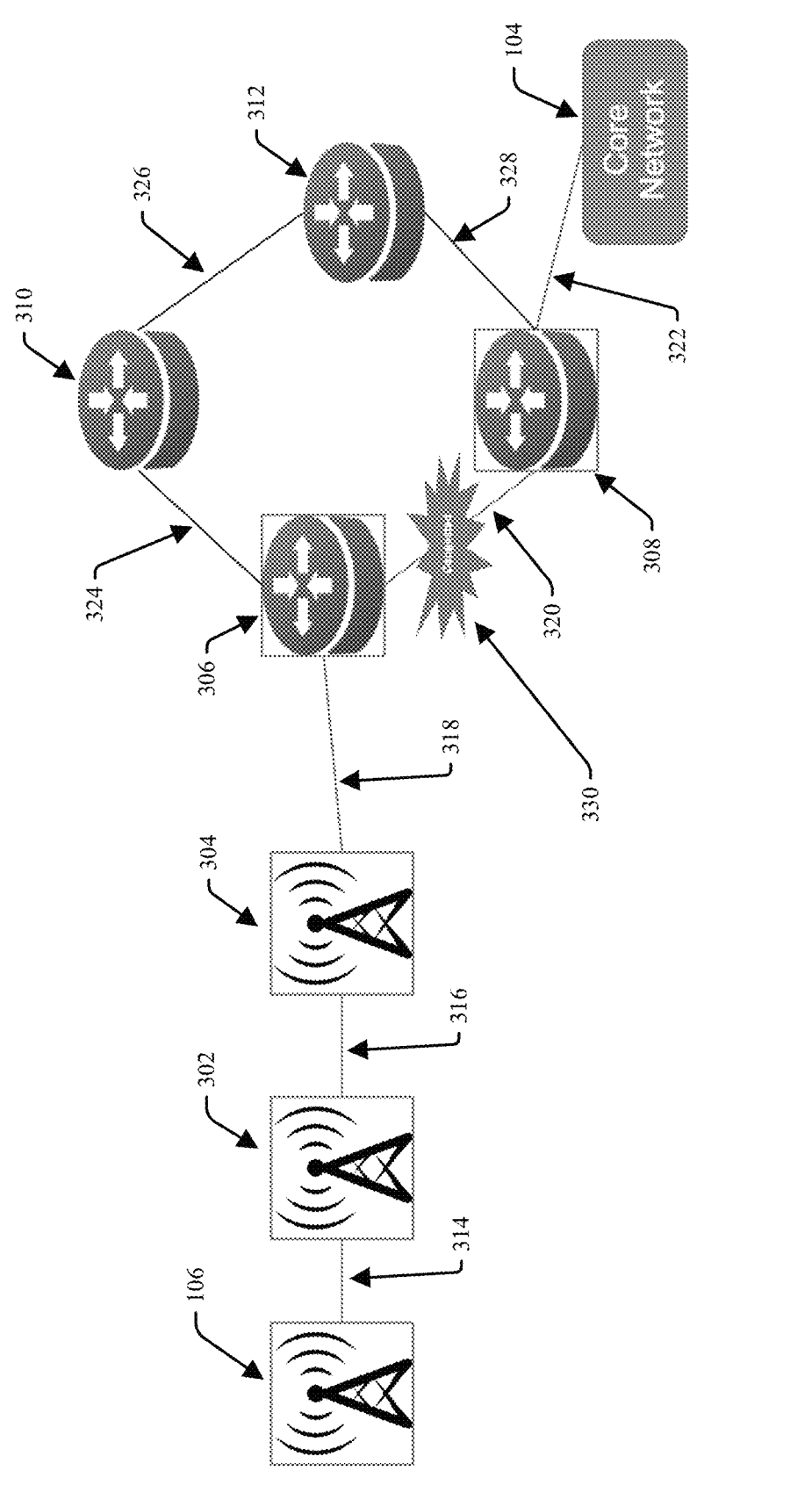
FIG. 3 illustrates a diagram of a portion of a communication network where network congestion can be causing degradation of a service, in accordance with various aspects and embodiments of the disclosed subject matter.

Referring to FIG. 3 (along with FIGS. 1 and 2), FIG. 3 illustrates a diagram of a portion of a communication network 300 where network congestion can be causing degradation of a service, in accordance with various aspects and embodiments of the disclosed subject matter. The portion of the communication network 300 can comprise the core network 104, various base stations, including base station 106, base station 302, and base station 304, various network nodes (e.g., routers or other types of network equipment), including network node 306, network node 308, network node 310, and network node 312, and respective communication links (e.g., 314, 316, 318, 320, 322, 324, 326, and 328) between the core network 104, the various base stations, and the various network nodes, such as shown in the portion of the communication network 300 in FIG. 3. A device, such as device 108, can be connected (e.g., wirelessly connected) to the base station 106, and can be utilizing a service (e.g., 114).

With regard to degradation of a service (e.g., 114) that has been detected, the degradation source determination component 226 can analyze the respective groups of performance indicators (or corresponding respective service performance tables) associated with the respective base stations (e.g., base stations 106, 302, and 304) and/or respective network nodes (e.g., network nodes 306, 308, 310, and 312) of the core network 104, and associated with the respective services and respective QoS tags. The degradation source determination component 226 also can analyze the enrichment data, including the network topology information, relating to the portion of the communication network 300.

Based at least in part on the results of analyzing the enrichment data, the degradation source determination component 226 can determine the arrangement (e.g., physical and/or logical arrangement) of the core network 104, base stations (e.g., base stations 106, 302, and 304), network nodes (e.g., network nodes 306, 308, 310, and 312), and communication links (e.g., 314, 316, 318, 320, 322, 324, 326, and 328) in relation to each other, and their respective relationships (e.g., physical and/or logical connections; and/ or direct or indirect relationships) to each other. Based at least in part on the results of analyzing (e.g., through a comparative or subtractive analysis) the respective groups of performance indicators (or corresponding respective service performance tables) and/or the network topology information, the degradation source determination component 226 can determine that the service (e.g., 114) is experiencing degradation (e.g., having its SLA violated) at base stations 106, 302, and 304, network nodes 306 and 308, and certain communication links (e.g., 314, 316, 318, 320, and 322) associated therewith, while the service is not experiencing degradation at network nodes 310 and 312 (and associated base stations or other network nodes (not shown)), and the communication links (e.g., 324, 326, and 328) associated therewith. As a further result of the analysis (e.g., comparative or subtractive analysis), the degradation source determination component 226 can determine that the network node 308 and/or the communication link 320 between the network node 308 and network node 306 is the source of the degradation, as indicated at reference numeral 330 (e.g., network congestion at or associated with network node 308, network node 306, and/or communication link 320 causing the service degradation). The degradation source determination component 226 also can determine or identify the communication path (e.g., end-to-end communication path) where the service degradation is being experienced, where such communication path can comprise the base station 106 to communication link 314 to base station 302 to communication link 316 to base station 304 to communication link 318 to network node 306 to communication link 320 to network node 308 to communication link 322 to core network 104.

With further regard to FIGS. 1 and 2, the tag manager component 204 can utilize the source of the service degradation to facilitate determining which (if any) data packets associated with the service (e.g., 114) are to be assigned with a higher QoS tag to mitigate the service degradation, such as described herein. In that regard, the tag manager component 204 also can take the source of the service degradation and associated communication path into consideration when making predictions of the effects of promoting a portion of data packets of the service from the current QoS tag to a higher QoS tag.

In some embodiments, the tag manager component 204 can comprise or be associated with a predictor component 228 that can perform an iterative prediction process to make (e.g., determine or generate) predictions relating to the effects of promoting respective portions (e.g., differently sized portions) of data packets of the service from the current QoS tag to respective higher QoS tags under consideration, such as described herein. After detecting the degradation of the service (e.g., 114) and isolating the source of the service degradation, the tag manager component 204 can determine a subgroup of QoS tags (e.g., subgroup of higher QoS tags) that can satisfy, or at least potentially can satisfy, the service specification (e.g., SLA) of the service, based at least in part on the service performance information (or corresponding respective service performance tables), information regarding original QoS tag assignments (e.g., the original QoS tag table), and/or information regarding the current QoS tag assignments (e.g., the current QoS tag table). If there is at least one higher QoS tag that potentially can satisfy the service specification of the service, the tag manager component 204 can include the one or more higher QoS tags, which potentially can satisfy the service specification, in the subgroup of QoS tags for consideration.

When performing the predictions, the predictor component 228 can predict the effects of the promotion of data packets of the degraded service to a higher QoS tag on performance of the degraded service to see is such promotion can enable the service to have its service specification satisfied, on a higher priority service(s) (e.g., service 118) associated with the higher QoS tag to determine whether the higher priority service(s) may be degraded (e.g., may experience degraded performance) due to such promotion, and on other services (e.g., other higher or lower priority services) associated with other higher or lower QoS tags to determine whether such other services may be degraded due to such promotion. Such predictions can be done to account for the reality that promotion of data packets of the degraded service to a higher QoS tag can affect the performance of not only the degraded service and the service(s) associated with the higher QoS tag, but also can affect the performance of other higher or lower priority services associated with other higher or lower QoS tags, as such other services potentially may experience lower performance (e.g., lower QoS) as a result of such promotion. As an illustrative example, routers on the transport layer can prioritize packet queues from different QoS tags according to the different priorities of the different QoS tags. For instance, given a bandwidth of 10 gigabytes (GB) on an arbitrary transport layer link, the router can pass through 40% of the capacity from QoS tag X, while passing only 10% of the capacity from QoS tag Y. In a case where the queue for QoS tag X becomes larger (e.g., due to promoting data packets of a degraded service), the data packets in the queue for QoS tag Y may experience higher delay and/or packet drop rate as a result.

Accordingly, the predictor component 228, employing the iterative prediction process, can make predictions (e.g., iterative predictions) of the effects of the promotion of data packets of the service (e.g., service 114) experiencing degradation to a higher QoS tag to facilitate determining whether there is a portion of data packets of the service that can be promoted to a QoS tag(s) (e.g., a higher QoS tag(s)) of the subgroup of QoS tags to enable the service specification of the service to be satisfied without resulting in undesirable degradation (e.g., degradation that violates the service specification) of another service (e.g., a higher priority service(s) associated with the QoS tag(s), or another service(s) having a higher, same, or lower QoS tag than the current QoS tag of the service), in accordance with the defined tag management criteria. The predictor component 228, by performing this iterative prediction process, desirably (e.g., suitably, enhancedly, or optimally) can reduce or minimize the risk or occurrence of undesired degradations on other services due to promoting data packets of a degraded service from its current QoS tag to a higher QoS tag, by enabling the tag manager component 204 to know such predictions of the effects beforehand (e.g., before making a promotion), so that the tag manager component 204 can determine (e.g., proactively determine) a suitable promotion of data packets of the degraded service that can enable the service to have its service specification satisfied without resulting in undesirable degradation of another service (if any such promotion is predicted or determined to exist).

In accordance with various embodiments, to facilitate making such predictions, the predictor component 228 can comprise or be associated with an artificial intelligence (AI) component 230 that can comprise or generate machine learning (ML) models 232 (e.g., a trained regression machine learning model or other type of machine learning model) that can be trained (e.g., by the AI component 230, a user, and/or another entity or component) to desirably (e.g., suitably, reliably, accurately, enhancedly, or optimally) make (e.g., generate) predictions relating to (e.g., indicating) the effects of promotion of data packets of a degraded service to a higher QoS tag on the performance of the degraded service and performances of other services. The training of the machine learning models 232 can be as more fully described herein. The predictor component 228 can utilize a trained machine learning model 232 to perform the iterative prediction process to iterate over respective portions (e.g., different amounts or volumes) of data packets of the service and respective QoS tags of the subgroup of QoS tags to predict whether there is a portion of data packets of the service that can be promoted to a QoS tag (e.g., a candidate or satisfying QoS tag) of the subgroup without causing undesirable degradation of another service, and, if so, predicting a largest portion of data packets of the service that can be promoted with regard to each of the one or more candidate or satisfying QoS tags of the subgroup without causing undesirable degradation of another service, such as described herein.

To facilitate enabling the trained machine learning model 232 to make desirable predictions relating to promotions to higher QoS tags, the predictor component 228 can utilize the enrichment data regarding the network topology of the communication network 102 and information relating to the source of the degradation of the service (e.g., 114) such that the predictor component 228 can know the source of the degradation of the service, and can query (e.g., can only query) data (e.g., base station-related data, network node-related data, respective service performance information (e.g., KPIs) associated with the respective QoS tags and/or respective services, and/or other desired information) from the base station(s) and/or network node(s) of or associated with the source of the service degradation (e.g., associated with or under the affected link). The predictor component 228 can input the data that it can obtain from such query into the trained machine learning model 232. This can lead to more accurate predictions by the predictor component 228 and machine learning model 232, as compared to predictions that otherwise may be made using data from the whole communication network 102 as input.

As part of the iterative prediction process, the predictor component 228, employing the trained machine learning model 232, can predict the effect on all of the QoS tags (and thus, the services associated therewith) if a subgroup of the data packet volume is promoted from a first or source QoS tag (e.g., the current or original QoS tag assigned to the degraded service) to a second or target QoS tag (e.g., a higher QoS tag of the subgroup of QoS tags under consideration). The predictor component 228 can perform this iterative prediction process such that the amount of data packets in the subgroup of the data packet volume can be iteratively and incrementally increased (e.g., at a fixed rate or incremental amount) to facilitate determining or predicting a desirably higher (e.g., a maximum or substantially close to maximum) amount of data packets that can be promoted from the source QoS tag to the target QoS tag to enable the service to have its service specification satisfied without resulting in an undesirable degradation of another service. For instance, if it is under consideration to have some of the data packets of the degraded service promoted from the source QoS tag (e.g., QoS tag A) to the target QoS tag (e.g., QoS tag B), the predictor component 228 can, for purposes of machine learning-based analysis and prediction, generate information representative of a group of data packets (e.g., a constructed data packet volume) associated with all of the available QoS tags, comprising a subgroup (e.g., a portion) of data packets that can contain an incremental amount (e.g., 10 kilobytes (KB), or other desired incremental amount) of the data packets being promoted from the source QoS tag to the target QoS tag. The predictor component 228 can input the group of data packets associated with all of the available QoS tags, comprising the subgroup of data packets being promoted, into the trained machine learning model 232.

Based at least in part on the input of the group of data packets, and the training of the trained machine learning model 232, the trained machine learning model 232 can predict the effect on all of the QoS tags (e.g., all available QoS tags) if that incremental amount (e.g., 10 KB, or other desired incremental amount) of the data packets of the degraded service are promoted from the source QoS tag to the target QoS tag. As part of predicting the effect, the trained machine learning model 232 can generate, as an output, respective predicted performance indicators associated with the respective QoS tags. For this iteration (and same or similarly for other iterative predictions involving other subgroups of data packets and/or other target QoS tags), the respective predicted performance indicators can be representative of, and/or can desirably (e.g., suitably, accurately or substantially accurately, enhancedly, or optimally) correspond to (e.g., can be same or substantially the same as), respective actual performance indicators associated with the respective QoS tags that would obtained if the group of data packets had been communicated and routed through the communication network 102, particularly with regard to those data packets, including the subgroup of data packets being promoted, that would be communicated and routed through the communication path associated with the source of the degradation of the service (e.g., service 114).

If the predictor component 228 (e.g., predictor component or trained machine learning model 232) determines that the predicted performance indicators output from the trained machine learning model 232 satisfy the respective service specifications of the respective services (e.g., existing services) associated with the respective QoS tags, the predictor component 228 can determine that another iterative prediction can be performed. If, instead, the predictor component 228 determines that one or more of the predicted performance indicators do not satisfy the respective service specifications (e.g., one or more of the respective threshold performance indicators) of the respective services associated with the respective QoS tags, the predictor component 228 can determine that no more iterative predictions are to be performed with respect to the target QoS tag, and can discontinue the iterative predictions with respect to the target QoS tag.

If the iterative prediction process is to continue with respect to that target QoS tag (e.g., because there were no violations of service specifications identified), for that other (e.g., next) iterative prediction, the predictor component 228 can increment the amount of packets that can be in the subgroup of data packets being promoted from the source QoS tag to the target QoS tag by the desired incremental amount (e.g., another 10 KB, for a total of 20 KB being promoted). The predictor component 228 can, for purposes of machine learning-based analysis and prediction, generate information representative of a second group of data packets (e.g., a second constructed data packet volume) associated with all of the available QoS tags, comprising a second subgroup of data packets that can contain the iteratively increased amount (e.g., 20 KB, or other desired incremental amount) of the data packets being promoted from the source QoS tag to the target QoS tag. The predictor component 228 can input this second group of data packets associated with all of the available QoS tags, comprising the second subgroup of data packets being promoted, into the trained machine learning model 232.

Based at least in part on the input of the second group of data packets, and the training of the trained machine learning model 232, the trained machine learning model 232 can predict the effect on all of the QoS tags (e.g., all available QoS tags) if that iteratively increased amount (e.g., 20 KB, or other desired incremental amount) of the data packets of the degraded service are promoted from the source QoS tag to the target QoS tag. As part of predicting the effect, the trained machine learning model 232 can generate, as an output, respective second predicted performance indicators associated with the respective QoS tags. If the predictor component 228 determines that the predicted second performance indicators output from the trained machine learning model 232 satisfy the respective service specifications of the respective services (e.g., existing services) associated with the respective QoS tags, the predictor component 228 can determine that still another iterative prediction can be performed. If, instead, the predictor component 228 determines that one or more of the predicted second performance indicators do not satisfy the respective service specifications (e.g., one or more of the respective threshold performance indicators) of the respective services associated with the respective QoS tags, the predictor component 228 can determine that no more iterative predictions are to be performed with respect to the target QoS tag, and can discontinue the iterative predictions with respect to the target QoS tag.

If the iterative prediction process is to continue with respect to that target QoS tag (e.g., because there were no violations of service specifications identified), the predictor component 228 and trained machine learning model 232 can perform one or more iterative predictions, where for each iteration, the amount of data packets in the next subgroup of data packets can be incrementally increased to a next higher amount (e.g., 30 KB for a third iteration; 40 KB for a fourth iteration; and so on). If, during any iteration, the predictor component 228 determines that one or more of the predicted performance indicators output from the trained machine learning model 232 during that iteration do not satisfy the respective service specifications (e.g., one or more of the respective threshold performance indicators) of the respective services associated with the respective QoS tags, the predictor component 228 can determine that no more iterative predictions are to be performed with respect to the target QoS tag, and can discontinue the iterative predictions with respect to that particular target QoS tag.

Figure 4:
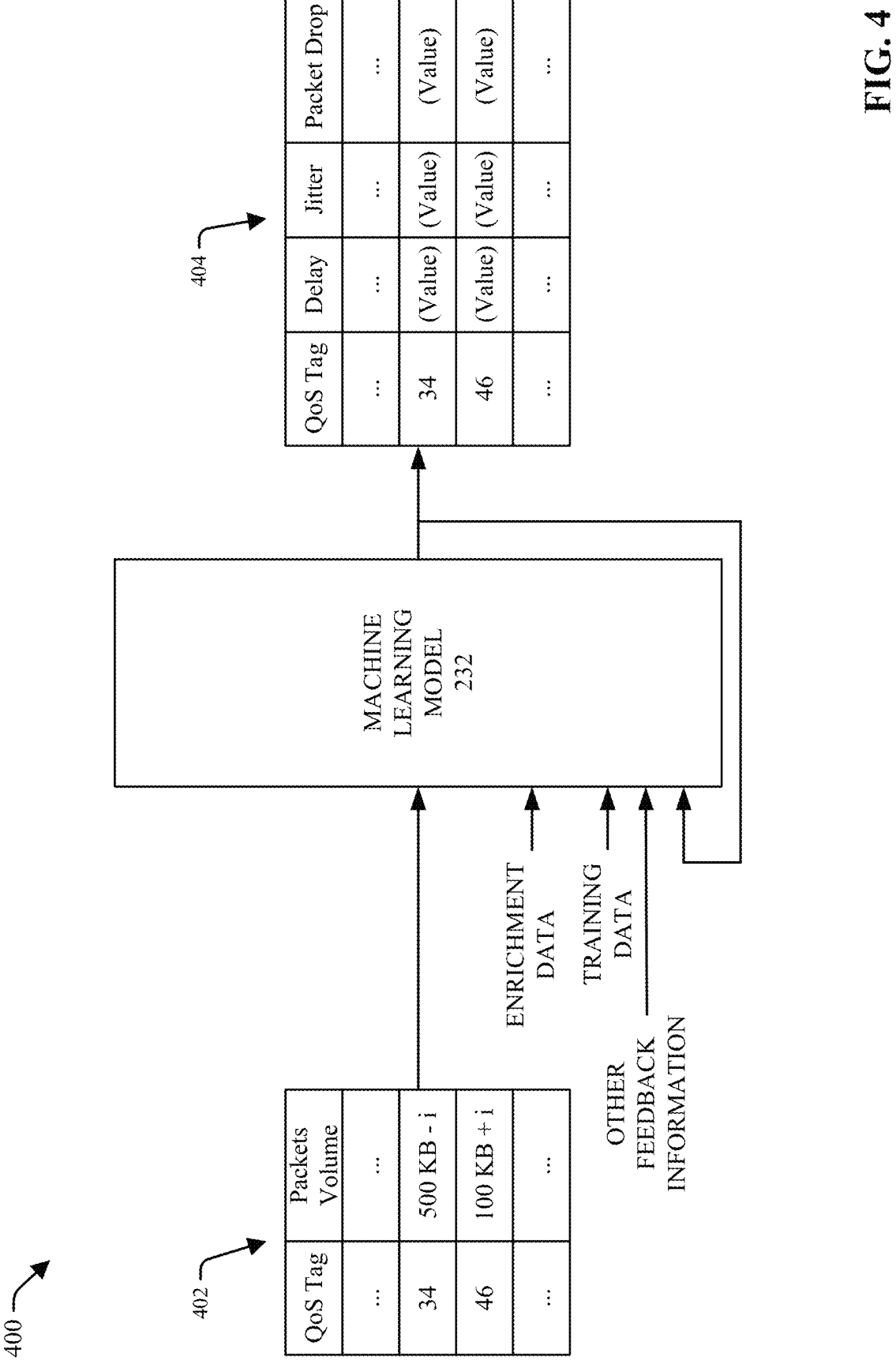
FIG. 4 depicts a diagram of an example machine learning model prediction scenario where the trained machine learning model can receive example input data (e.g., information relating to or representative of a group of data packets associated with all available QoS tags) and, based at least in part on the input data, can produce output data (e.g., predicted performance indicators associated with QoS tags and/or services), in accordance with various aspects and embodiments of the disclosed subject matter.

Referring to FIG. 4 (along with FIGS. 1 and 2), FIG. 4 depicts a diagram of an example machine learning model prediction scenario 400 where the trained machine learning model 332 can receive example input data (e.g., information relating to or representative of a group of data packets associated with all available QoS tags) and, based at least in part on the input data, can produce output data (e.g., predicted performance indicators associated with QoS tags and/or services), in accordance with various aspects and embodiments of the disclosed subject matter. As depicted in the example machine learning model prediction scenario 400, the trained machine learning model 332 can receive, at its input, information relating to or representative of a group of data packets (e.g., a constructed data packet volume) associated with all available QoS tags, where the group of data packets can comprise a subgroup of data packets that are being promoted from a source QoS tag to a target QoS tag. With regard to respective iterations, the respective information relating to or representative of the respective groups of data packets can be different for each iteration based at least in part on the respective amounts of data packets associated with the respective QoS tags, the amount of data packets in the subgroup of data packets being promoted, the source QoS tag, the target QoS tag, the QoS tags that are available, and/or other factors. During an iteration, based at least in part on the information relating to or representative of a group of data packets associated with all available QoS tags, comprising the subgroup of data packets being promoted, that is input into the trained machine learning model 332, the trained machine learning model 332 can generate, as an output, respective predicted performance indicators associated with the respective QoS tags and/or respective services.

As depicted in the first (e.g., input) table 402 of the example machine learning model prediction scenario 400, there can be respective data packet volumes (e.g., respective amounts of data packets) associated with respective QoS tags, such as QoS tag 34 and QoS tag 46, where, in this example scenario 400, QoS tag 34 can be the source QoS tag associated with a service (e.g., service 114) experiencing degraded performance (e.g., due to network congestion or for another reason) and QoS tag 46 can be a target QoS tag under consideration (e.g., as part of a subgroup of QoS tags (e.g., higher QoS tags) under consideration). For instance, in this example scenario 400, without promotion of any data packets from the source QoS tag to the target QoS tag, there can be 500 KB of data associated with the source QoS tag (e.g., QoS tag 34) and 100 KB associated with the target QoS tag (e.g., QoS tag 46). During a first iteration, the group of data packets associated with the QoS tags can be structured such that a subgroup (e.g., portion) of data packets, comprising a first amount of data packets (e.g., i data packets), can be promoted from the source QoS tag to the target QoS tag. With regard to the amount of data packets in the subgroup of data packets during an iteration, i can be an incremental amount that can be iteratively and incrementally increased during one or more subsequent iterations (if any). For example, during the first iteration, i can be equal to 10 KB (or can be another desired amount). Accordingly, in this example scenario 400, during the first iteration, the group of data packets can comprise (500 KB−i) of data associated with the source QoS tag (e.g., QoS tag 34) and (100 KB+i) associated with the target QoS tag (e.g., QoS tag 46). The predictor component 228 can generate first information relating to or representative of a first group of data packets associated with all available QoS tags, comprising a first subgroup of data packets having a first amount of data packets (e.g., i data packets), such that (500 KB−i) of data can be associated with the source QoS tag (e.g., QoS tag 34) and (100 KB+i) can be associated with the target QoS tag (e.g., QoS tag 46).

The predictor component 228 can input the first information relating to or representative of the first group of data packets into the trained machine learning model 332. Based at least in part on a machine learning-based analysis of the first information by the trained machine learning model 332, the trained machine learning model 332 can determine or generate respective predicted performance indicators (e.g., KPIs, such as delay, jitter, packet drop, or other desired KPI(s)) associated with the respective QoS tags and/or respective services. In some embodiments, the trained machine learning model 332 can output the respective performance indicators (e.g., performance indicator values) to respective cells of a second (e.g., output) table 404 that can correspond to the respective QoS tags (e.g., QoS tag 34, QoS tag 46, or other QoS tag) and the respective types of performance indicators (e.g., delay, jitter, packet drop, or other desired KPI). In other embodiments, the predictor component 228 or trained machine learning model 332 (or other component of the tag manager component 204) can insert respective values (e.g., binary values, such as "1" or "0") into respective cells of the second table 404 that can indicate whether respective performance indicators are satisfied at the respective QoS tags (e.g., insert a "1" value into a cell for delay for QoS tag 34 if the predicted delay can satisfy the threshold delay value associated with QoS tag 34; or insert a "0" value into the cell for delay for QoS tag 34 if the predicted delay does not satisfy the threshold delay value associated with QoS tag 34).

If there is a next (e.g., second) iteration with regard to that target QoS tag (assuming that the respective predicted performance indicators satisfied the respective threshold performance indicators of the respective service specifications of the respective services), during the second iteration, the predictor component 228 can structure a second group of data packets associated with the QoS tags such that a second subgroup of data packets, comprising a second amount of data packets (e.g., i data packets, where i can be incrementally increased as compared to the first iteration), can be promoted from the source QoS tag to the target QoS tag. For example, during the second iteration, i can be equal to 20 KB (or can be another desired amount) (e.g., 10 KB from the first iteration plus another 10 KB for the second iteration). In this example scenario 400, during the second iteration, the group of data packets can comprise (500 KB−i) of data associated with the source QoS tag (e.g., QoS tag 34) and (100 KB+i) associated with the target QoS tag (e.g., QoS tag 46), where i can be, for example, 20 KB. The predictor component 228 can generate second information relating to or representative of the second group of data packets associated with all available QoS tags, comprising the second subgroup of data packets having the second amount of data packets (e.g., i data packets), such that (500 KB−i) of data can be associated with the source QoS tag (e.g., QoS tag 34) and (100 KB+i) can be associated with the target QoS tag (e.g., QoS tag 46).

During the second iteration, the predictor component 228 can input the second information relating to or representative of the second group of data packets into the trained machine learning model 332. Based at least in part on a machine learning-based analysis of the second information by the trained machine learning model 332, the trained machine learning model 332 can determine or generate respective second predicted performance indicators associated with the respective QoS tags and/or respective services. In some embodiments, the trained machine learning model 332 can output the respective performance indicators (e.g., performance indicator values), or the predictor component 228 or trained machine learning model 332 (or other component of the tag manager component 204) can insert respective corresponding values (e.g., binary values), to respective cells of the second table 404 (or another instance or version of the second table 404 that can be used for the second iteration) that can correspond to the respective QoS tags and the respective types of performance indicators. These iterations can continue with regard to a particular target QoS tag, until the predictor component 228 determines that one or more of the respective predicted performance indicators do not satisfy one or more of the respective threshold performance indicators associated with the respective QoS tags and/or respective services, such as described herein.

In response to determining that, during a particular iteration (e.g., a second or subsequent iteration) with respect to a particular target QoS tag, that promotion of the particular subgroup of data packets from the source QoS tag to the target QoS tag can result in a degradation of another service, and assuming that there was a previous iteration performed with respect to that target QoS tag, the predictor component 228 can determine that the previous (e.g., immediately previous) subgroup of data packets promoted to the target QoS tag during the previous iteration, which was able to satisfy the service specification of the service (e.g., service 114) without resulting in an undesirable degradation of another service, can be the highest amount of data packets that can be promoted to that target QoS tag. The predictor component 228 can maintain information relating to (e.g., indicating) that highest amount of data packets that can be promoted to that target QoS tag without resulting in an undesirable degradation of another service, as that target QoS tag can remain under consideration as a potential (e.g., candidate) QoS tag to be used for promotion of data packets associated with the service.

The predictor component 228 can determine whether there are any other QoS tags (e.g., higher QoS tags) in the subgroup of QoS tags that have not been evaluated yet. If there are any other QoS tags in the subgroup of QoS tags that have not been evaluated yet, as part of the iterative prediction process, for each of the remaining QoS tags of the subgroup of QoS tags to be considered, the predictor component 228 and trained machine learning model 232 can perform one or more iterations of the iterative prediction process, such as described herein, to determine that a highest amount of data packets (if there is any amount of data packets) that can be promoted to that target QoS tag to satisfy the service specification of the service (e.g., service 114) without resulting in an undesirable degradation of another service. For each of these target QoS tags of the subgroup, the predictor component 228 can maintain respective information relating to (e.g., indicating) the respective highest amount of data packets that can be promoted to that target QoS tag without resulting in an undesirable degradation of another service. If there is a target QoS tag of the subgroup that is not able to have a subgroup of data packets promoted to it without resulting in an undesirable degradation of another service (e.g., there is a service specification violation during the first iteration), or if there is no amount of data packets promoted to the target QoS tag that can satisfy the service specification of the service, the predictor component 228 can remove such target QoS tag from further consideration with regard to the degraded service.

In certain embodiments, the predictor component 228 and trained machine learning model(s) 332 can evaluate more than one target QoS tag with respect to mitigation of a degraded service at the same time. For instance, the predictor component 228 and trained machine learning model(s) 332 can perform, simultaneously, concurrently, and/or in parallel, a first iterative prediction process to perform a first group of iterations to predict and evaluate the effects of promoting respective amounts of data packets from a source QoS tag to a first target QoS tag of the subgroup, a second iterative prediction process to perform a second group of iterations to predict and evaluate the effects of promoting respective amounts of data packets from a source QoS tag to a second target QoS tag of the subgroup, and/or another iterative prediction process to perform another group of iterations to predict and evaluate the effects of promoting respective amounts of data packets from a source QoS tag to another target QoS tag of the subgroup.

After performing the iterative prediction process on the QoS tags of the subgroup of QoS tags, the tag manager component 204 can analyze the results of the performing the iterative prediction process on the QoS tags of the subgroup of QoS tags. For instance, the tag manager component 204 can analyze the respective iterative predictions with regard to the respective promotions of respective subgroups of data packets from the source QoS tag to the respective target QoS tags of the subgroup of QoS tags. Based at least in part on such analysis of those results, the tag manager component 204 can determine whether there is at least one promotion of a portion of data packets of the service (e.g., service 114) to a QoS tag of the subgroup of QoS tags that is predicted to satisfy the service specification (e.g., service performance criteria) of the service without resulting in undesirable degradation of another service (e.g., a violation of the service specification of another service), based at least in part on the results of analyzing the respective iterative predictions with regard to the respective promotions of respective subgroups of data packets from the source QoS tag to the respective target QoS tags of the subgroup of QoS tags. If the tag manager component 204 determines that there is no promotion of a subgroup of data packets of the service to a target QoS tag of the subgroup that is predicted to satisfy the service specification of the service without resulting in an undesirable degradation of another service, the tag manager component 204 can determine that no action (e.g., tag management action) is to be taken, at least at this time, to promote a portion of data packets of the service from the source (e.g., current or original) QoS tag to any of the target QoS tags of the subgroup. Accordingly, the tag manager component 204 can continue to maintain the assignment of the data packets of the service with the current or original QoS tag, at least at this time.

If, instead, based at least in part on the analysis results, the tag manager component 204 determines that there is at least one promotion of a subgroup of data packets of the service (e.g., service 114) to at least one target QoS tag of the subgroup of QoS tags that is predicted to satisfy the service specification of the service without resulting in an undesirable degradation of another service, the tag manager component 204 can determine a lowest target QoS tag of the subgroup of QoS tags that can be utilized to promote a subgroup of data packets of the service to such lowest target QoS tag to satisfy the service specification of the service without resulting in undesirable degradation of another service. That is, in some instances, there may be more than one target QoS tag (e.g., more than one candidate target QoS tags) of the subgroup that is predicted to be able to be utilized for promotion of a subgroup of data packets of the service to satisfy the service specification of the service without resulting in undesirable degradation of another service. In such instances, from the more than one candidate target QoS tags, the tag manager component 204 can determine the lowest (e.g., the lowest priority) candidate target QoS tag, relative to other priority levels of the other candidate target QoS tags. The tag manager component 204 can select that lowest candidate target QoS tag for assignment to the subgroup of data packets of the service, wherein the amount of data packets in that subgroup of data packets can be the highest number of data packets that was predicted to be able to be promoted to that lowest candidate target QoS tag to satisfy the service specification of the service without resulting in undesirable degradation of another service.

In some embodiments, the tag adjuster component 224 accordingly can adjust the QoS tag assignment for the service to assign the lowest candidate target QoS tag to the subgroup of data packets of the service (e.g., service 114) and can continue assignment of the current (e.g., original) QoS tag to the remaining data packets of the service. In that regard, in certain embodiments, the tag adjuster component 224 can adjust the QoS tag assignment for the service to assign the lowest candidate target QoS tag to the subgroup of data packets of the service that are associated with the source of the degradation of the service (e.g., the base station(s) (e.g., 106) or network node(s) that are the source of the service degradation or part of the communication path associated with the source of the service degradation).

It is to be appreciated and understood that, while some of the embodiments described herein can involve promotion of a subgroup of data packets to one candidate target QoS tag (e.g., the lowest candidate target QoS tag), in certain embodiments, if there are multiple candidate target QoS tags available, the tag manager component 204 can determine that respective subgroups of data packets of the degraded service (e.g., service 114) are to be assigned to respective candidate target QoS tags, with any remaining amount of data packets of the service continuing to be assigned to the current QoS tag. For instance, the tag manager component 204 can determine that a first subgroup of data packets, comprising a first amount of data packets, is to be promoted to a first candidate target QoS tag (e.g., the lowest or other lower candidate target QoS tag), and a second subgroup of data packets, comprising a second amount of data packets, is to be promoted to a second candidate target QoS tag (e.g., a lower candidate target QoS tag). This can enable the tag manager component 204 to spread the promotion of data packets of the service to higher QoS tags across multiple higher QoS tags to reduce or minimize the burden on respective queues and other resources associated with the higher QoS tags, which can reduce or minimize the risk of causing an undesirable degradation of a higher priority service associated with a higher QoS tag or any other service associated with another QoS tag. In accordance with various embodiments, the first amount for the first subgroup of data packets can be the highest amount of data packets that was predicted to be able to be promoted to that first candidate target QoS tag to satisfy the service specification of the service without resulting in undesirable degradation of another service, or the first amount can be lower than such highest amount, and the second amount for the second subgroup of data packets can be the highest amount of data packets that was predicted to be able to be promoted to that second candidate target QoS tag to satisfy the service specification of the service without resulting in undesirable degradation of another service, or the second amount can be lower than such highest amount. The tag adjuster component 224 accordingly can adjust the QoS tag assignments for the respective subgroups of data packets of the service to the respective candidate target QoS tags.

While the iterative prediction process can be a proactive process that can reduce or minimize the risk or occurrence of undesirable degradation of another service due to promotion of a subgroup of data packets from a current QoS tag to a higher QoS tag, there may be some instances (e.g., a relatively small number of instances) where promotion of a subgroup of data packets from a current QoS tag to a higher QoS tag still may result in an undesirable degradation of another service. In such instance where promotion of a subgroup of data packets from a current QoS tag to a higher QoS tag still results in an undesirable degradation of another service, in some embodiments, the tag manager component 204 can comprise a ban component 234 that can ban (e.g., temporarily ban) promotion of a service from its original lower QoS tag to a higher QoS tag for a defined period of time, such as more fully described herein.

As there can be instances where a service may be banned from promotion to a higher QoS tag, in certain embodiments, if the tag manager component 204 has determined (e.g., made a preliminary determination) that a subgroup of data packets of a service can be promoted to a higher QoS tag, prior to implementing such a modification of the QoS tag assignment for the service, the tag adjuster component 224 can determine whether the service (e.g., service 114) is banned (e.g., currently and temporarily banned for a defined time period) from being promoted to have such higher QoS tag assigned to the service based at least in part on ban-related information that can indicate QoS tags (e.g., relatively higher priority QoS tags), if any (at that time), that can have bans or restrictions in place to ban, restrict, or prohibit lower priority services associated with lower priority, originally assigned QoS tags from being promoted to those QoS tags that have bans or restrictions in place. For instance, the tag adjuster component 224 can analyze the ban-related information (e.g., generated or maintained by the ban component 234) that can indicate whether the service is banned from being promoted to have such higher QoS tag. If the tag adjuster component 224 determines that the service (e.g., service 114) is subject to a ban (e.g., a current and temporary ban for the defined time period) from being promoted to the higher QoS tag, the tag adjuster component 224 can determine that no adjustment to the assignment of the current QoS tag (here, the original QoS tag) to the service is to be made, at least at this time, or, in some embodiments, the tag adjuster component 224 can determine whether there is another higher QoS tag (e.g., another candidate target QoS tag) to which the service is not currently banned and to which a subgroup of data packets of the service can be assigned, in accordance with the defined tag management criteria. In the latter case, if the tag adjuster component 224 determines that there is not another higher QoS tag to which the service is not currently banned and to which a subgroup of data packets of the service can be assigned, the tag adjuster component 224 can determine that no adjustment to the assignment of the current QoS tag to the service is to be made, at least at this time.

If, instead, based at least in part on the results of analyzing the ban-related information, the tag adjuster component 224 determines that the service (e.g., service 114) is not subject to a ban from being promoted to the higher QoS tag (or, if there is a ban to that higher QoS tag, determines that there is another higher QoS tag to which the service is not currently banned and to which a subgroup of data packets of the service can be assigned), the tag adjuster component 224 can determine that an adjustment to the QoS tag assignment of the service can be made, and can adjust (e.g., modify) or update the QoS tag assignment for the subgroup of data packets of the service from the current (e.g., original) QoS tag to the higher or promoted QoS tag (or the other higher QoS tag) associated with the higher QoS level or higher priority level than the current QoS tag, in accordance with the defined tag management criteria.

With further regard to the ban-related information, the ban-related information can be or can comprise a flag or indicator associated with the service and/or the higher QoS tag, a list of QoS tags that have a ban in place and/or a list of services subject to the ban, and/or other type of ban-related information that can indicate or specify any bans on QoS tag promotion for services (e.g., certain relatively lower priority services) that may be in place. The ban component 234 can track or manage the respective bans on QoS tag promotion for services that may be in place, including modifying the ban-related information to indicate when a new ban on QoS tag promotion for services with respect to a particular QoS tag(s) is initiated or instituted, and indicate when a ban on QoS tag promotion for services with respect to a particular QoS tag(s) has expired. The ban-related information can be stored in the data store 210.

In some embodiments, a defined time period of a particular ban with respect to a particular QoS tag can be determined or set by a user (e.g., network operator or other personnel). In certain embodiments, respective (e.g., different or separate) defined time periods can be determined and set with respect to respective QoS tags (e.g., respective higher priority QoS tags). For example, it may be desirable (e.g., wanted, suitable, beneficial, or optimal) to have ban for a longer defined time period for a certain higher priority QoS tag that can be assigned (e.g., originally assigned) to a certain higher priority service(s) (e.g., a very high priority service) than an amount of time for another defined time period for a ban employed for another higher priority QoS tag that can be assigned (e.g., originally assigned) to another higher priority service(s).

With further regard to determining whether to demote a service that has its service specification satisfied (wherein such analysis and determination can be performed with regard to all services, or at least all promoted services at that time), the tag adjuster component 224 can determine the current QoS tag assigned to the service (e.g., service 116) based at least in part on the information relating to the current assignments of QoS tags to services (e.g., the current QoS tag table). The tag adjuster component 224 also can determine whether the current QoS tag assigned to the service (e.g., service 116), or a subgroup of data packets of the service, is the original QoS tag assigned to the service based at least in part on analysis of the current QoS tag assigned to the service or a subgroup of data packets of the service, and the information relating to the original assignments of QoS tags to the respective services (e.g., the original QoS tag table), such as described herein. In this example case, the tag adjuster component 224 can determine that the current QoS tag assigned to a subgroup of data packets of the service (e.g., service 116) is a promoted (e.g., higher) QoS tag based at least in part on such analysis. For instance, this can be a case where the QoS tag assignment for the subgroup of data packets of the service previously had been adjusted by the tag adjuster component 224 to promote the subgroup of data packets of the service by having the higher QoS tag assigned to the subgroup of data packets of the service.

The tag adjuster component 224 also can determine whether the service (e.g., service 116) is satisfied with regard to performance (e.g., the service specification associated with the service is satisfied) or is instead experiencing degraded performance (e.g., the service specification is not satisfied) based at least in part on the results of analyzing the service performance information relating to the respective services (e.g., 114, 116, and/or 118) and/or the respective QoS tags (e.g., the service performance information itself, the pivot or summary service performance information derived therefrom, or the table information (which can include the pivot or summary service performance information) in the service performance table) with respect to the service and the current promoted or higher QoS tag assigned to the subgroup of data packets of the service, such as described herein. In this example case, from such analysis, the tag adjuster component 224 can determine that the service specification associated with the service (e.g., service 116) is satisfied at the current promoted or higher QoS tag assigned to the subgroup of data packets of the service (e.g., at the current promoted or higher QoS tag, the respective performance indicators satisfy the respective threshold performance indicator values associated with the service specification associated with the service).

In response to determining that the service specification associated with the service (e.g., service 116) is satisfied at the current promoted or higher QoS tag assigned to the subgroup of data packets of the service, the tag adjuster component 224 also can determine whether the service specification associated with the service (e.g., service 116) would be satisfied at the original QoS tag for the service (e.g., with regard to all of the data packets of the service), based at least in part on the results of analyzing the service performance information relating to the respective services (e.g., 114, 116, and/or 118) and/or the respective QoS tags with respect to the service and the original QoS tag assigned to the service. If, based at least in part on the results of such analysis, the tag adjuster component 224 determines that the service specification associated with the service (e.g., service 116) would not be satisfied at the original QoS tag for the service, the tag adjuster component 224 can determine that no adjustment to the assignment of the current QoS tag (here, the promoted or higher QoS tag) to the subgroup of data packets of the service is to be made, at least at this time, in accordance with the defined tag management criteria.

If, instead, based at least in part on the results of such analysis, the tag adjuster component 224 determines that the service specification associated with the service (e.g., service 116) would be satisfied at the original QoS tag for the service, the tag adjuster component 224 can determine that an adjustment to the QoS tag assignment of the subgroup of data packets of the service can be made, and can adjust (e.g., modify) or update the QoS tag assignment for the subgroup of data packets of the service from the promoted or higher QoS tag (e.g., associated with the higher QoS level or higher priority level) to the original QoS tag (e.g., associated with relatively lower QoS level or lower priority level), in accordance with the defined tag management criteria.

By demoting a previously promoted service, or a previously promoted subgroup of data packets of the service, to its original lower QoS tag from a promoted higher QoS tag when the service specification for such service can be satisfied at the original lower QoS tag (e.g., based at least in part on the feedback information, such as the service performance information), the network monitor component 120 (employing the tag manager component 204) can enable or enhance sustainability of the enhanced tag management scheme by utilizing lower QoS tags (e.g., lower original QoS tags) for services (e.g., lower priority services) when feasible (e.g., when the service specification for such service can be satisfied at the original lower QoS tag), and can desirably (e.g., efficiently, reliably, suitably, enhancedly, or optimally) and opportunistically free up (e.g., make available) higher QoS tags for higher priority services, and/or other services that are experiencing degraded performance, and network resources for those higher priority services and/or degraded services.

With further regard to determining whether to demote and ban a service (e.g., a subgroup of data packets of a service) from a higher QoS tag due to a higher priority service experiencing degraded performance at that higher QoS tag (wherein such analysis and determination can be performed with regard to all services, or at least all promoted services at that time), the tag adjuster component 224 can determine the current QoS tag assigned to the service (e.g., service 118) based at least in part on the information relating to the current assignments of QoS tags to services (e.g., the current QoS tag table). The tag adjuster component 224 also can determine whether the current QoS tag assigned to the service (e.g., service 118) is the original QoS tag assigned to the service based at least in part on analysis of the current QoS tag assigned to the service and the information relating to the original assignments of QoS tags to the respective services (e.g., the original QoS tag table), such as described herein. In this example case, the tag adjuster component 224 can determine that the current QoS tag assigned to the service (e.g., service 118) is the original QoS tag assigned to the service based at least in part on such analysis. In this example case, the service (e.g., service 118) can be a higher priority service, and the original QoS tag assigned to the service can be a relatively higher QoS tag associated with a relatively higher QoS level or priority level.

The tag adjuster component 224 also can determine whether the service (e.g., service 118) is experiencing degraded performance (e.g., the service specification associated with the service is not satisfied) at its current original and higher priority QoS tag based at least in part on the results of analyzing the service performance information relating to the respective services (e.g., 114, 116, and/or 118) and/or the respective QoS tags (e.g., the service performance information itself, the pivot or summary service performance information derived therefrom, or the table information (which can include the pivot or summary service performance information) in the service performance table) with respect to the service and the current original and higher priority QoS tag assigned to the service, such as described herein. In this example case, based at least in part on the results of such analysis, the tag adjuster component 224 can determine that the service specification associated with the service (e.g., service 118) is not satisfied, and thus, the service is experiencing degraded performance, at the current original and higher priority QoS tag assigned to the service (e.g., at the current original and higher priority QoS tag, one or more of the respective performance indicators do not satisfy the respective threshold performance indicator values associated with the service specification associated with the service 118).

In response to determining or detecting that the service (e.g., service 118) is experiencing degraded performance while having its current original and higher priority QoS tag assigned to it, the tag adjuster component 224 can determine all services (e.g., service 116 and/or one or more other services) that are currently assigned the same higher priority QoS tag as the service (e.g., service 118), based at least in part on the results of analyzing the information relating to the current assignments of QoS tags to services (e.g., the current QoS tag table). The tag manager component 204, employing the ban component 234, can initiate, execute, institute, or implement a ban (e.g., a prohibition or restriction), for a defined time period (e.g., a defined amount of time), on assignment of this higher priority QoS tag to any service that does not have this higher priority QoS tag as its original QoS tag (e.g., to any lower priority service associated with an original lower priority QoS tag).

With regard to each service (e.g., service 118 and service 116) currently associated with (e.g., assigned with) the higher priority QoS tag, the tag adjuster component 224 can determine whether such service is currently associated with its original QoS tag, or whether there had been a QoS tag promotion to assign the higher QoS tag to such service. If the tag adjuster component 224 determines that such service is currently associated with its original QoS tag, with that tag being the higher priority QoS tag, the tag adjuster component 224 can determine that no adjustment to the assignment of the current QoS tag (here, the original higher priority QoS tag) to the service is to be made, in accordance with the defined tag management criteria. For instance, if, based at least in part on the results of analyzing the information relating to the original assignments of QoS tags to services (e.g., the original QoS tag table), the tag adjuster component 224 determines that a particular service (e.g., service 118) is currently associated with its original QoS tag, which can be the higher priority QoS tag, the tag adjuster component 224 can determine that no adjustment to the assignment of the current QoS tag (here, the original higher priority QoS tag) to the service (e.g., service 118) is to be made and the original higher priority QoS tag is to remain assigned to the service.

If, instead, based at least in part on the results of analyzing the information relating to the original assignments of QoS tags to services, the tag adjuster component 224 determines that a certain service (e.g., service 114) is associated with an original QoS tag that is not the higher priority QoS tag (e.g., a subgroup of data packets of the certain service previously had been promoted to have the subgroup of data packets assigned to the higher priority QoS tag), the tag adjuster component 224 can determine that an adjustment to the QoS tag assignment of the subgroup of data packets of the service (e.g., service 114) can be made, and can adjust or update the QoS tag assignment for the subgroup of data packets of the service from the promoted or higher priority QoS tag (e.g., associated with the higher QoS level or higher priority level) to the original QoS tag (e.g., associated with relatively lower QoS level or lower priority level), in accordance with the defined tag management criteria. In some embodiments, the tag adjuster component 224 can demote all such services that are determined to have an original QoS tag (e.g., original lower priority QoS tag) that is not the higher priority QoS tag with regard to which the ban is being initiated or implemented. The ban component 234 also can ban those lower priority services (e.g., service 116), for the defined time period, from being promoted to have the higher priority QoS tag assigned to them, such as described herein.

The tag manager component 204, by demoting lower priority services from a higher priority QoS tag back to their lower priority QoS tags and temporarily banning lower priority services from being promoted to the higher priority QoS tag, can desirably (e.g., efficiently, reliably, enhancedly, or optimally) protect higher priority services associated with (e.g., originally assigned with) higher priority QoS tags from experiencing degraded performance, or at least can desirably (e.g., quickly, efficiently, reliably, enhancedly, or optimally) detect and mitigate (e.g., reduce, rectify, or minimize) degraded performance of such higher priority services, that can be due in part to congestion on the transport layer of the communication network 102 (e.g., particularly with regard to the network resources utilized for the higher priority QoS tag) and/or other undesirable conditions of the communication network 102.

The network monitor component 120 can communicate (e.g., automatically or dynamically communicate) update information relating to any updates (e.g., adjustments; or promotions or demotions) to respective QoS tag assignments for respective services (e.g., 114, 116, or 118) to the tag configuration component 212 of the core network 104 and/or the tag configuration component 216 of the base station 106. If one or more updates to QoS assignments are to be made at the core network side, the tag configuration component 212 of the core network 104 can update or reconfigure the assignment of one or more respective QoS tags associated with one or more respective services (e.g., associated with one or more respective subgroups of data packets of the one or more respective services) to assign one or more respective updated QoS tags to the one or more respective services (e.g., the one or more respective subgroups of data packets associated with the one or more respective services) based at least in part on the update information received from the network monitor component 120. If one or more updates to QoS assignments are to be made at the base station side, the tag configuration component 216 of the base station 106 can update or reconfigure the assignment of one or more respective QoS tags associated with one or more respective services (e.g., associated with one or more respective subgroups of data packets of the one or more respective services) to assign one or more respective updated QoS tags to the one or more respective services (e.g., the one or more respective subgroups of data packets of the one or more respective services) based at least in part on the update information received from the network monitor component 120.

The network monitor component 120 can continue to perform (e.g., automatically or dynamically perform), and can work in conjunction with other components (e.g., core network 104, base station 106, or other component), to test (e.g., automatically or dynamically test) or facilitate testing network performance of the communication network 102 with respect to services and associated QoS tags, and control (e.g., automatically, dynamically, and/or adaptively control, adjust, or update) assignments of respective QoS tags to respective services, and/or perform other operations, such as described herein.

With further regard to the trained machine learning model 232 (and FIG. 4), the machine learning model 232 can be trained on features indicating congestion on the transport layer for a specific QoS tag(s), with respect to a data packet volume on all available QoS tags. The machine learning model 232 can employ multiple-input, multiple-output prediction. As disclosed, the output of the machine learning model 232 can comprise respective predicted performance indicators (e.g., respective predicted KPIs) for all of the QoS tags. The initial input data to the machine learning model 232 can comprise, for example, a set of training data and the enrichment data relating to the network topology of the communication network 102. The set of training data can comprise or relate to, for example, previous (e.g., historical) volumes of data packets for all of the QoS tags, comprising respective groups (e.g., subvolumes) of data packets associated with respective QoS tags, previous respective performance indicators associated with respective QoS tags and/or services (and associated with respective base stations, respective network nodes, and respective communication links) (e.g., in response to test (e.g., TWAMP) messages) that can be used to sense or determine performance of the communication network 102 (e.g., performance of the transport layer), and/or other desired training data.

In that regard, in some embodiments, the predictor component 228 can comprise or be associated with a trainer component 236 that can input the initial input data (e.g. the set of training data and the enrichment data) to the machine learning model 232 to train the machine learning model 232, and the machine learning model 232 can analyze and operate on the initial input data to learn features indicating congestion on the transport layer for a specific QoS tag(s), with respect to a data packet volume on all available QoS tags, model and learn to predict the respective performance indicators (the respective predicted performance indicators) associated with the respective QoS tags in response to input information relating to a volume of data packets (e.g., constructed group of data packets) associated with all of the tags (including a proposed promotion of a subgroup of data packets from a current QoS tag to a higher QoS tag), including modeling and learning to predict the respective responses of respective base stations, respective network nodes, and respective communication links to the input information relating to the volume of data packets being communicated and routed in the communication network, and, as a result, generate (e.g., create) the trained machine learning model 232. In that regard, the machine learning model 232 can learn the relationship between the expected load (e.g., the volume of data packets) on the QoS tags and the performance indicators to be predicted by the machine learning model 232. All or at least some of the proposed input features for the machine learning model 232 can be available for collection from the core network 104 or another desired source.

Since the resources of a communication network (e.g., a transport layer of a communication network) can differ from one communication network to another communication network, in accordance with various embodiments, training of a machine learning model 232 (e.g., by the trainer component 236) can be customized (e.g., tailored) to the particular communication network before deployment. For instance, a first set of training data and first enrichment data (e.g., comprising first network topology information) relating to a first communication network can be input to a first machine learning model (e.g., by the trainer component 236) to train the first machine learning model for use in connection with managing QoS tag assignments for the first communication network, and a second set of training data and second enrichment data (e.g., comprising second network topology information) relating to a second communication network can be input to a second machine learning model (e.g., by the trainer component 236) to train the second machine learning model for use in connection with managing QoS tag assignments for the second communication network.

The trainer component 236 can continue to train, update, and refine (e.g., fine tune and/or improve) the trained machine learning model 232 over time as additional information becomes available. For instance, as additional testing and monitoring of the performance of the communication network 102 is performed by the network monitor component 120, additional information (e.g., network response information, including respective performance indicators associated with respective QoS tags) can be obtained. Also, the network monitor component 120, employing a feedback component 238, can obtain information regarding respective actual performance indicators associated with respective QoS tags and/or respective services, for example, with regard to a subgroup(s) of data packets of a service(s) being promoted from an original QoS tag to a higher QoS tag, which can be provided to the trainer component 236. The feedback component 238 also can provide (e.g., can feed back or communicate) prediction information relating to the respective predicted performance indicators associated with the respective QoS tags and/or respective services to the trainer component 236. The trainer component 236 or the trained machine learning model 232 can analyze the information regarding the respective actual performance indicators and the prediction information relating to the respective predicted performance indicators, and can determine any respective differences between the respective actual performance indicators and the respective predicted performance indicators, to facilitate improving predictions of performance indicators.

The feedback component 238 also can receive modified enrichment data relating to a modified network topology of the communication network 102, if the communication network 102 is modified, and can provide the modified enrichment data to the trainer component 236. The feedback component 238 also can receive, from a user(s), user feedback information relating to the communication network 102, the transport layer, services, service specifications, QoS tags, the QoS tag assignments, or other user feedback information, and can communicate the user feedback information to the trainer component 236.

The trainer component 236 can input or apply such additional information (e.g., information relating to additional testing and monitoring, the respective actual performance indicators, the respective predicted performance indicators, the modified enrichment data, the user feedback information, and/or other type of feedback information) to the trained machine learning model 232. The trained machine learning model 232 can analyze and operate on such additional information to further learn features indicating congestion on the transport layer for a specific QoS tag(s), with respect to a data packet volume on all available QoS tags, further model and learn (e.g., enhance modeling and learning) to predict the respective performance indicators associated with the respective QoS tags in response to input information relating to a volume of data packets associated with the QoS tags (including a proposed promotion of a subgroup of data packets from a current QoS tag to a higher QoS tag), including enhancing modeling and learning to predict the respective responses of respective base stations, respective network nodes, and respective communication links to the input information relating to the volume of data packets being communicated and routed in the communication network 102, and, as a result, refine and enhance the trained machine learning model 232.

With further regard to operation of the trained machine learning model 232, in some embodiments, the trained machine learning model 232 can operate and provide predictions relating to network responses and performance indicators associated with QoS tags, and can predict or determine a desirable (e.g., suitable, highest, or optimal) amount of data packet volume to promote to a higher QoS tag, in accordance with the following non-limiting example pseudo code:

```
max_QoS_tag = source QoS tag;
max_packets_promoted = 0;
For each applicable higher QoS tag t
    PV_source = Total packet volume for source QoS tag
    PV_target = Total packet volume for target QoS tag
    PV_service = Total packet volume for the degraded service
    Retrieve packet volume for all other tags
    Construct packet volume table
    i=10
    While i<=PV_service:
        new_PV_source = PV_source – i
        New_PV_target = PV_target + i
```

Modify packet volume table with updated source and target packet volumes. Run Machine Learning Model prediction with the modified packet volume table as input, outputting predicted KPIs for each QoS tag. Compare predicted KPIs for all QoS tags against all registered services.

```
IF any service is degraded:
    break
ELSE:
    i+= 10
IF i>max_packets_promoted:
    max_packets_promoted = i;
    max_QoS_tag = t.
```

It is to be appreciated and understood that this is merely non-limiting example pseudo code, and the predictor component 228 and trained machine learning model 232 can employ other code to perform desired operations, including operations relating to the iterative prediction process and determining a desirable (e.g., suitable, highest, or optimal) amount of data packet volume to promote to a higher QoS tag, in accordance with the various aspects and embodiments described herein.

With further regard to the AI component 230, the AI component 230 can perform an AI and/or machine learning-based analysis on data, such as information relating to services, service specifications, QoS tags, communication networks, and/or performance indicators, and/or other desired data, such as more fully described herein. In connection with or as part of such an AI or machine learning-based analysis, the AI component 230 can employ, build (e.g., construct or create), and/or import, AI and/or machine learning techniques and algorithms, AI and/or machine learning models (e.g., trained models), neural networks (e.g., trained neural networks), Markov chains (e.g., trained Markov chains), and/or graph mining to render and/or generate predictions, inferences, calculations, prognostications, estimates, derivations, forecasts, detections, and/or computations that can facilitate determining or learning data patterns in data, determining or learning a correlation, relationship, or causation between an item(s) of data and another item(s) of data (e.g., occurrence of the other item(s) of data or an event relating thereto), determining or learning a correlation, relationship, or causation between an event and another event (e.g., occurrence of another event), determining or learning about relationships between components (e.g., base stations, network nodes, communication links, or other components or functions) of a communication network, determining or learning about network responses and performance indicators in connection with communication of data packets associated with QoS tags and/or services, determining or learning about changes in network responses and performance indicators in connection with communication of data packets associated with QoS tags and/or services when there is a change in assignments of QoS tags to data packets of services, determining or learning other characteristics and features associated with the data, and/or automating one or more functions or features of the disclosed subject matter, as more fully described herein.

Based at least in part on the results of the analysis, the AI component 230 can determine, train, and generate a model that can relate to communication of data packets associated with QoS tags and/or services in a communication network, wherein the model can model or be representative of historical performance of the communication network and/or services in connection with communication of data packets associated with QoS tags and/or services in the communication network, and/or other features relating to the communication networks, communication of data packets associated with QoS tags and/or services in the communication network, and/or QoS tag assignments, such as described herein. The AI component 230 can update (e.g., modify, adjust, or change), and further train and enhance, the model as additional data (e.g., the information relating to additional testing and monitoring of the communication network, the respective actual performance indicators associated with QoS tags and/or services, the respective predicted performance indicators associated with QoS tags and/or services, the modified enrichment data, the user feedback information, and/or other information) is received and analyzed by the AI component 230. In some embodiments, as part of the data analysis, and the determining and training of the model, the AI component 230 can employ (and/or train) Markov chains, a neural network(s), or other AI-based or machine learning-based modeling, techniques, functions, or algorithms.

The AI component 230 can employ various AI-based or machine learning-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 230 can examine the entirety or a subset of the data (e.g., the set of training data, the enrichment data, the information relating to additional testing and monitoring of the communication network, the respective actual performance indicators associated with QoS tags and/or services, the respective predicted performance indicators associated with QoS tags and/or services, the modified enrichment data, the user feedback information, and/or other information) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

With further regard to the processor component 208 and the data store 210, the processor component 208 can be associated with (e.g., communicatively connected to) and can work in conjunction with the other components (e.g., monitor component 202, tag manager component 204, test endpoint node 206, data store 210, and/or other component) to facilitate performing the various functions and operations of the network monitor component 120. The processor component 208 can employ one or more processors (e.g., one or more central processing units (CPUs)), microprocessors, or controllers that can process information relating to data, files, services, applications, tags (e.g., QoS tags or other tags), tag management, the iterative prediction process, tag assignments, tag adjustments or updates, QoS levels or priority levels, QoS tag bans, test signals (e.g., TWAMP signals or other test signals), performance indicators (e.g., KPIs or other performance indicators), threshold performance indicator values, predicted performance indicators, service specifications (e.g., SLAs or other types of service specifications or service performance criteria), service performance information (e.g., service performance information itself, pivot or summary information derived therefrom, or service performance table), original QoS tag tables, current QoS tag tables, feedback information, data processing operations, messages, notifications, alarms, alerts, preferences (e.g., user or client preferences), hash values, metadata, parameters, traffic flows, policies, defined tag management criteria, algorithms (e.g., enhanced tag management algorithms, enhanced prediction algorithms (e.g., relating to the iterative prediction process), hash algorithms, data compression algorithms, data decompression algorithms, and/or other algorithm), interfaces, protocols, tools, and/or other information, to facilitate operation of the network monitor component 120, and control data flow between the network monitor component 120 and/or other components (e.g., network components, the core network 104, base station 106, the communication network 102, a device (e.g., 108, 110, and/or 112), a node, a service (e.g., 114, 116, and/or 118), a user, or other entity) associated with the network monitor component 120.

The data store 210 can store data structures (e.g., user data, metadata), code structure(s) (e.g., modules, objects, hashes, classes, procedures) or instructions, information relating to data, files, services, applications, tags (e.g., QoS tags or other tags), tag management, the iterative prediction process, tag assignments, tag adjustments or updates, QoS levels or priority levels, QoS tag bans, test signals, performance indicators, threshold performance indicator values, predicted performance indicators, service specifications, service performance information, original QoS tag tables, current QoS tag tables, feedback information, data processing operations, messages, notifications, alarms, alerts, preferences (e.g., user or client preferences), hash values, metadata, parameters, traffic flows, policies, defined tag management criteria, algorithms (e.g., enhanced tag management algorithms, enhanced prediction algorithms, hash algorithms, data compression algorithms, data decompression algorithms, and/or other algorithm), interfaces, protocols, tools, and/or other information, to facilitate controlling or performing operations associated with the network monitor component 120. The data store 210 can comprise volatile and/or non-volatile memory, such as described herein. In an aspect, the processor component 208 can be functionally coupled (e.g., through a memory bus) to the data store 210 in order to store and retrieve information desired to operate and/or confer functionality, at least in part, to the monitor component 202, tag manager component 204, test endpoint node 206, data store 210, processor component 208, data store 210, and/or other component of the network monitor component 120, and/or substantially any other operational aspects of the network monitor component 120.

As disclosed, the data store 210 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), flash memory, non-volatile memory express (NVMe), NVMe over fabric (NVMe-oF), persistent memory (PMEM), or PMEM-oF. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

In accordance with various embodiments, in addition to various other network equipment, the core network 104 can comprise a processor component 240 and a data store 242, and the base station 106 can comprise a processor component 244 and a data store 246. The processor component (e.g., 240 or 244) can be associated with (e.g., communicatively connected to) and can work in conjunction with the other components (e.g., tag configuration component, test endpoint node, data store, and/or other component) to facilitate performing the various functions and operations of the core network 104 or base station 106. The processor component (e.g., 240 or 244) can employ one or more processors (e.g., one or more central processing units (CPUs)), microprocessors, or controllers that can process information relating to data, files, services, applications, tags (e.g., QoS tags or other tags), tag assignments, tag adjustments or updates, QoS levels or priority levels, test signals, test messages, test response messages, performance indicators (e.g., KPIs or other performance indicators), threshold performance indicator values, service performance information, data processing operations, messages, notifications, alarms, alerts, preferences (e.g., user or client preferences), hash values, metadata, parameters, traffic flows, policies, defined tag management criteria, algorithms (e.g., enhanced tag management algorithms, hash algorithms, data compression algorithms, data decompression algorithms, and/or other algorithm), interfaces, protocols, tools, and/or other information, to facilitate operation of the core network 104 or base station 106, and control data flow between the core network 104, base station 106, and/or other components (e.g., other network components of the communication network 102, a device (e.g., 108, 110, and/or 112), a node, a service (e.g., 114, 116, and/or 118), a user, or other entity) associated with the core network 104 or base station 106.

The data store (e.g., 242 or 246) can store data structures (e.g., user data, metadata), code structure(s) (e.g., modules, objects, hashes, classes, procedures) or instructions, information relating to data, files, services, applications, tags (e.g., QoS tags or other tags), tag assignments, tag adjustments or updates, QoS levels or priority levels, test signals, test messages, test response messages, performance indicators, threshold performance indicator values, service performance information, data processing operations, messages, notifications, alarms, alerts, preferences (e.g., user or client preferences), hash values, metadata, parameters, traffic flows, policies, defined tag management criteria, algorithms (e.g., enhanced tag management algorithms, hash algorithms, data compression algorithms, data decompression algorithms, and/or other algorithm), interfaces, protocols, tools, and/or other information, to facilitate controlling or performing operations associated with the core network 104 or base station 106. The data store (e.g., 242 or 246) can comprise volatile and/or non-volatile memory, such as described herein. In an aspect, the processor component (e.g., 240 or 244) can be functionally coupled (e.g., through a memory bus) to the data store (e.g., 242 or 246) in order to store and retrieve information desired to operate and/or confer functionality, at least in part, to the tag configuration component, test endpoint node, processor component, data store, and/or other component of the core network 104 or base station 106, and/or substantially any other operational aspects of the core network 104 or base station 106.

Figure 5:
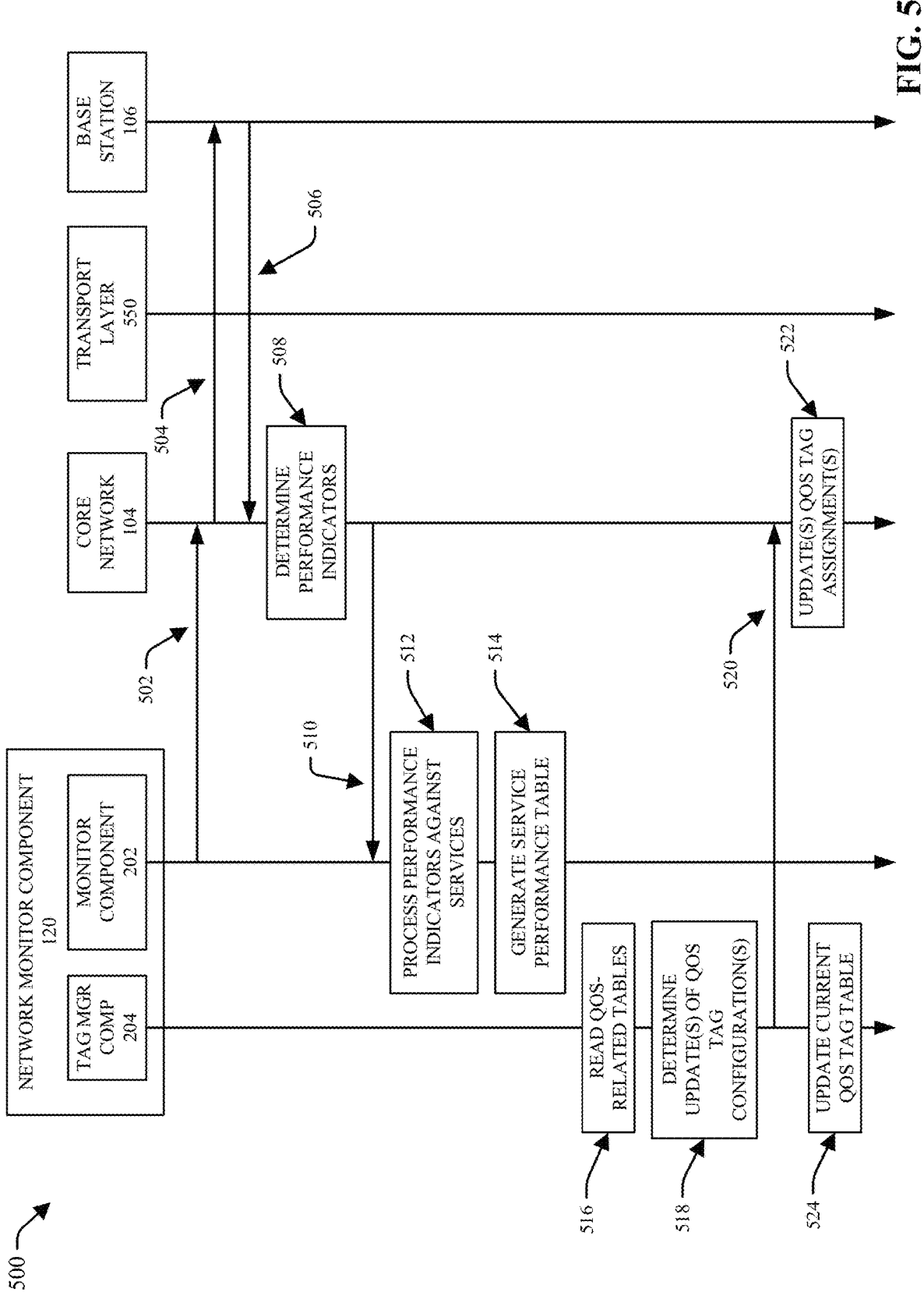
FIG. 5 illustrates a diagram of a non-limiting example process flow that can desirably manage and perform QoS tagging associated with services for downlink data traffic from the core network to the base station, in accordance with various aspects and embodiments of the disclosed subject matter.

Referring to FIG. 5 (along with FIGS. 1 and 2), FIG. 5 illustrates a diagram of a non-limiting example process flow 500 that can desirably (e.g., automatically, dynamically, efficiently, reliably, suitably, enhancedly, or optimally) manage and perform QoS tagging associated with services for downlink data traffic from the core network to the base station, in accordance with various aspects and embodiments of the disclosed subject matter. The example process flow 500 can relate to operations that can be performed by the core network 104, the base station 106, and/or the network monitor component 120. The example process flow 500 can be automatically, dynamically, or periodically be performed, if and as desired.

As indicated at reference numeral 502 of the example process flow 500, with regard to each QoS tag of a group of QoS tags, the monitor component 202 of the network monitor component 120 can initiate or trigger a test session for a QoS tag of the group of QoS tags by communicating a test signal relating to the QoS tag to the core network 104, such as described herein, wherein the QoS tag can be associated with a QoS level or priority level, and/or can be associated with a tag value (e.g., DSCP value or other tag value).

As indicated at reference numeral 504 of the example process flow 500, with regard to each QoS tag of the group of QoS tags, the test endpoint node 214 of the core network 104 can communicate a test message (e.g., a test data packet) associated with the QoS tag (e.g., with the QoS tag in the header information of the test data packet) to the test endpoint node 218 of the base station 106 via the transport layer 550, such as described herein. The routing, queuing, and/or data communication paths via the transport layer 550 for the test message can be determined and/or implemented based at least in part on the QoS tag (e.g., the QoS tag level or priority level, or the corresponding tag value, of the QoS tag).

As indicated at reference numeral 506 of the example process flow 500, with regard to each QoS tag of the group of QoS tags, the test endpoint node 218 of the base station 106 can communicate a test response message (e.g., a test response data packet) associated with the QoS tag (e.g., with the QoS tag in the header information of the test response data packet) to the test endpoint node 214 of the core network 104 via the transport layer 550, such as described herein. The routing, queuing, and/or data communication paths via the transport layer 550 for the test response message can be determined and/or implemented based at least in part on the QoS tag (e.g., the QoS tag level or priority level, or the corresponding tag value, of the QoS tag).

As indicated at reference numeral 508 of the example process flow 500, with regard to each QoS tag of the group of QoS tags, the test endpoint node 214 or other component of the core network 104 can determine, measure, or collect a group of performance indicators relating to performance of the communication network 102 (e.g., the core network 104, the base station 106, the transport layer 550, and/or other component) with respect to the communication of the test message and the test response message utilizing the QoS tag, such as described herein. As indicated at reference numeral 510 of the example process flow 500, the test endpoint node 214 or other component of the core network 104 can communicate information relating to the group of performance indicators relating to the network performance with respect to the QoS tag to the monitor component 202 of the network monitor component 120.

In response to receiving the information relating to the respective groups of performance indicators that relate to the respective network performance of the communication network 102 with respect to the respective QoS tags, as specified at reference numeral 512 of the example process flow 500, the monitor component 202 can process (e.g., analyze or evaluate) the information relating to the respective groups of performance indicators against the respective services (e.g., respective service specification information of the respective service specifications (e.g., SLAs) associated with the respective services), such as described herein. For instance, the monitor component 202 can analyze the respective groups of performance indicators against the respective groups of threshold performance indicator values associated with the respective service specifications associated with the respective services, and, based at least in part on the results of such analysis, can determine whether the respective groups of performance indicators associated with the respective QoS tags satisfy the respective groups of threshold performance indicator values associated with the respective service specifications associated with the respective services.

As specified at reference numeral 514 of the example process flow 500, the monitor component 202 can generate (e.g., write or create) a service performance table, based at least in part on the results of such analysis, and can store the service performance table in the data store 210 of the network monitor component 120. The service performance table can indicate which of the respective services did, can, or would have their respective service specifications satisfied, and/or which of the respective services did not, cannot, or would not have their respective service specifications satisfied, at the respective QoS tags (e.g., if and when utilizing the respective QoS tags).

As indicated at reference numeral 516 of the example process flow 500, the tag manager component 204 (TAG MGR COMP) of the network monitor component 120 can read QoS-related tables (e.g., the original QoS tag table associated with downlink data traffic and/or the core network 104 and the current QoS tag table associated with downlink data traffic and/or the core network 104) from the data store 210. The original QoS tag table can comprise information relating to respective assignments of respective original (e.g., original, baseline, or non-promoted) QoS tags to respective services with respect to downlink data traffic that can be communicated from the core network 104 to the base station 106. The current QoS tag table can comprise information relating to respective assignments of respective current (e.g., most recent) QoS tags to the respective services with respect to downlink data traffic that can be communicated from the core network 104 to the base station 106.

As specified at reference numeral 518 of the example process flow 500, the tag manager component 204 can determine (e.g., compute) one or more respective updates (e.g., adjustments) of one or more respective QoS tag configurations associated with one or more of the respective services, based at least in part on the results of analyzing the respective information contained in the service performance table, the original QoS tag table, and the current QoS tag table. For instance, the tag manager component 204 can determine one or more respective updates (e.g., adjustments) of one or more respective QoS tag assignments of one or more respective QoS tags to the one or more respective services (e.g., one or more respective subgroups of data packets of the one or more respective services), based at least in part on the results of analyzing the respective information contained in the service performance table, the original QoS tag table, and the current QoS tag table, and/or performing the iterative prediction process and analyzing the results of the iterative prediction process, such as described herein. The one or more respective updates can comprise or relate to promoting a service from its original QoS tag to a higher QoS tag (e.g., promoting a subgroup of data packets of the service from its original QoS tag to the higher QoS tag), demoting a service from a higher to its original QoS tag, or temporarily banning one or more services (e.g., lower priority services) from being promoted from their original QoS tags to a higher QoS tag (e.g., associated with a higher priority service determined to be degraded), in accordance with the defined tag management criteria, such as described herein.

As indicated at reference numeral 520 of the example process flow 500, the tag manager component 204 of the network monitor component 120 can communicate update information, which can relate to the one or more respective updates of the respective QoS tag configurations associated with the one or more of the respective services, to the core network 104. As indicated at reference numeral 522 of the example process flow 500, the tag configuration component 212 of the core network 104 can reset, reconfigure, or update the one or more respective QoS tag assignments of the one or more respective QoS tags to the one or more respective services, based at least in part on (e.g., in accordance with) the one or more updates indicated in the update information.

As specified at reference numeral 524 of the example process flow 500, the tag manager component 204 of the network monitor component 120 can update the current QoS tag table associated with downlink data traffic and/or the core network 104 in the data store 210, based at least in part on the one or more respective updates of one or more respective QoS tag assignments of the one or more respective QoS tags to the one or more respective services or to the one or more subgroups of data packets of the one or more respective services. For instance, the tag manager component 204 can update or write information relating to the one or more respective updates of one or more respective QoS tag assignments to the current QoS tag table to update the current QoS tag table, and can store the updated current QoS tag table associated with downlink data traffic and/or the core network 104 in the data store 210 (e.g., in the database in the data store 210).

Figure 6:
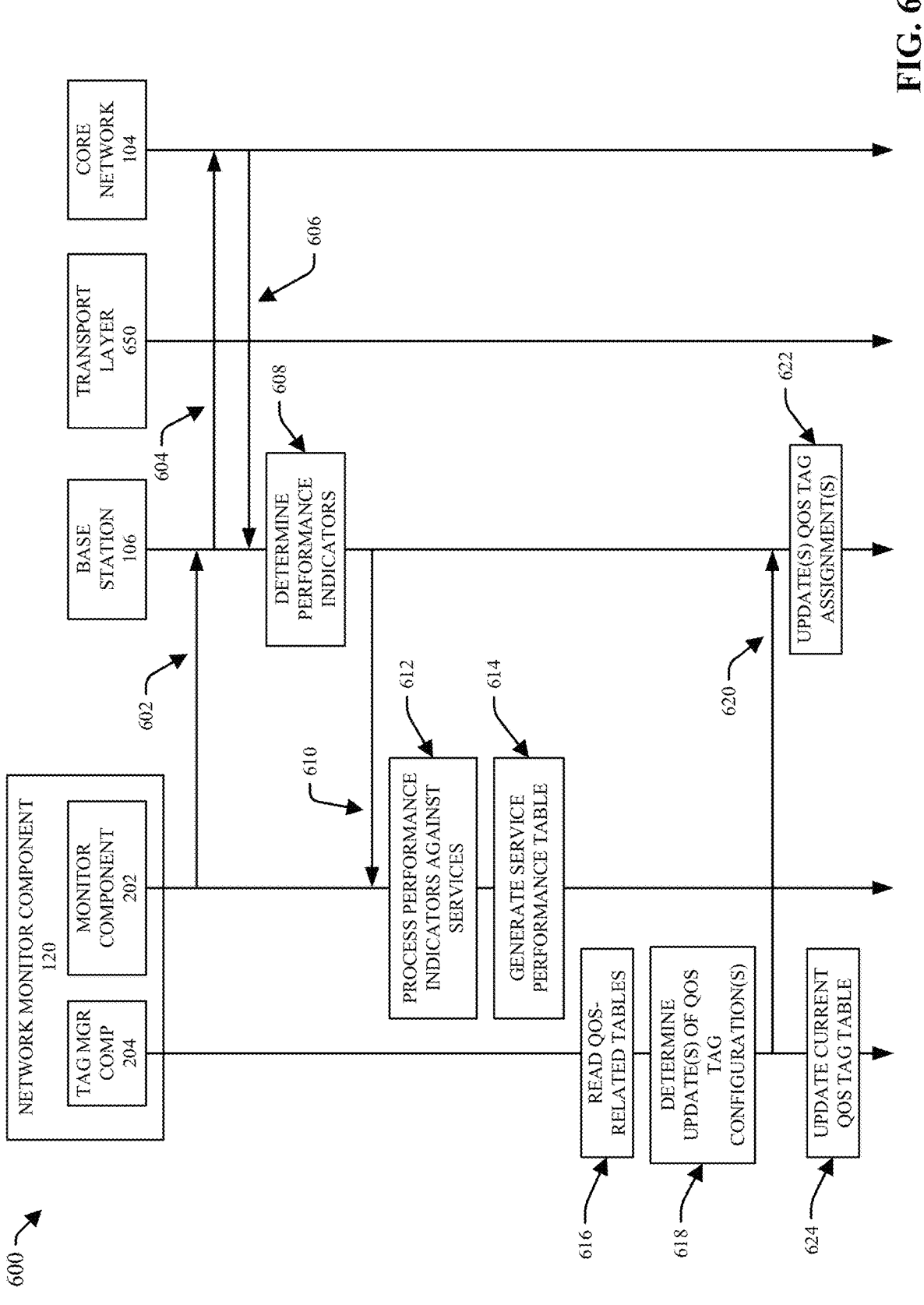
FIG. 6 depicts a diagram of a non-limiting example process flow that can desirably manage and perform QoS tagging associated with services for uplink data traffic from the base station to the core network, in accordance with various aspects and embodiments of the disclosed subject matter.

Turning to FIG. 6 (along with FIGS. 1 and 2), FIG. 6 depicts a diagram of a non-limiting example process flow 600 that can desirably (e.g., automatically, dynamically, efficiently, reliably, suitably, enhancedly, or optimally) manage and perform QoS tagging associated with services for uplink data traffic from the base station to the core network, in accordance with various aspects and embodiments of the disclosed subject matter. The example process flow 600 can relate to operations that can be performed by the core network 104, the base station 106, and/or the network monitor component 120. The example process flow 600 can be automatically, dynamically, or periodically be performed, if and as desired.

As indicated at reference numeral 602 of the example process flow 600, with regard to each QoS tag of a group of QoS tags, the monitor component 202 of the network monitor component 120 can initiate or trigger a test session for a QoS tag of the group of QoS tags by communicating a test signal relating to the QoS tag to the base station 106, such as described herein, wherein the QoS tag can be associated with a QoS level or priority level, and/or can be associated with a tag value (e.g., DSCP value or other tag value).

As indicated at reference numeral 604 of the example process flow 600, with regard to each QoS tag of the group of QoS tags, the test endpoint node 218 of the base station 106 can communicate a test message (e.g., a test data packet) associated with the QoS tag (e.g., with the QoS tag in the header information of the test data packet) to the test endpoint node 214 of the core network 104 via the transport layer 650, such as described herein. The routing, queuing, and/or data communication paths via the transport layer 650 for the test message can be determined and/or implemented based at least in part on the QoS tag (e.g., the QoS tag level or priority level, or the corresponding tag value, of the QoS tag).

As indicated at reference numeral 606 of the example process flow 600, with regard to each QoS tag of the group of QoS tags, the test endpoint node 214 of the core network 104 can communicate a test response message (e.g., a test response data packet) associated with the QoS tag (e.g., with the QoS tag in the header information of the test response data packet) to the test endpoint node 218 of the base station 106 via the transport layer 650, such as described herein. The routing, queuing, and/or data communication paths via the transport layer 650 for the test response message can be determined and/or implemented based at least in part on the QoS tag (e.g., the QoS tag level or priority level, or the corresponding tag value, of the QoS tag).

As indicated at reference numeral 608 of the example process flow 600, with regard to each QoS tag of the group of QoS tags, the test endpoint node 218 or other component of the base station 106 can determine, measure, or collect a group of performance indicators relating to performance of the communication network 102 (e.g., the core network 104, the base station 106, the transport layer 650, and/or other component) with respect to the communication of the test message and the test response message utilizing the QoS tag, such as described herein. As indicated at reference numeral 610 of the example process flow 600, the test endpoint node 218 or other component of the base station 106 can communicate information relating to the group of performance indicators relating to the network performance with respect to the QoS tag to the monitor component 202 of the network monitor component 120.

In response to receiving, from the base station 106, the information relating to the respective groups of performance indicators that relate to the respective network performance of the communication network 102 with respect to the respective QoS tags, as specified at reference numeral 612 of the example process flow 600, the monitor component 202 can process (e.g., analyze or evaluate) the information relating to the respective groups of performance indicators against the respective services (e.g., respective service specification information of the respective service specifications (e.g., SLAs) associated with the respective services), such as described herein. For instance, the monitor component 202 can analyze the respective groups of performance indicators against the respective groups of threshold performance indicator values associated with the respective service specifications associated with the respective services, and, based at least in part on the results of such analysis, can determine whether the respective groups of performance indicators associated with the respective QoS tags satisfy the respective groups of threshold performance indicator values associated with the respective service specifications associated with the respective services.

As specified at reference numeral 614 of the example process flow 600, the monitor component 202 can generate (e.g., write or create) a service performance table, based at least in part on the results of such analysis, and can store the service performance table in the data store 210 of the network monitor component 120. The service performance table can indicate which of the respective services did, can, or would have their respective service specifications satisfied, and/or which of the respective services did not, cannot, or would not have their respective service specifications satisfied, at the respective QoS tags (e.g., if and when utilizing the respective QoS tags).

As indicated at reference numeral 616 of the example process flow 600, the tag manager component 204 of the network monitor component 120 can read the original QoS tag table associated with uplink data traffic and/or the base station 106 and the current QoS tag table associated with uplink data traffic and/or the base station 106 from the data store 210. The original QoS tag table can comprise information relating to respective assignments of respective original (e.g., original, baseline, or non-promoted) QoS tags to respective services with respect to uplink data traffic that can be communicated from the base station 106 to the core network 104. The current QoS tag table can comprise information relating to respective assignments of respective current (e.g., most recent) QoS tags to the respective services with respect to uplink data traffic that can be communicated from the base station 106 to the core network 104.

As specified at reference numeral 618 of the example process flow 600, the tag manager component 204 can determine (e.g., compute) one or more respective updates (e.g., adjustments) of one or more respective QoS tag configurations associated with one or more of the respective services, based at least in part on the results of analyzing the respective information contained in the service performance table, the original QoS tag table, and the current QoS tag table. For instance, the tag manager component 204 can determine one or more respective updates (e.g., adjustments) of one or more respective QoS tag assignments of one or more respective QoS tags to the one or more respective services (e.g., one or more respective subgroups of data packets of the one or more respective services), based at least in part on the results of analyzing the respective information contained in the service performance table, the original QoS tag table, and the current QoS tag table, and/or performing the iterative prediction process and analyzing the results of the iterative prediction process, such as described herein. The one or more respective updates can comprise or relate to promoting a service from its original QoS tag to a higher QoS tag (e.g., promoting a subgroup of data packets of the service from its original QoS tag to the higher QoS tag), demoting a service from a higher to its original QoS tag, or temporarily banning one or more services (e.g., lower priority services) from being promoted from their original QoS tags to a higher QoS tag (e.g., associated with a higher priority service determined to be degraded), in accordance with the defined tag management criteria, such as described herein.

As indicated at reference numeral 620 of the example process flow 600, the tag manager component 204 of the network monitor component 120 can communicate update information, which can relate to the one or more respective updates of the respective QoS tag configurations associated with the one or more of the respective services, to the base station 106. As indicated at reference numeral 622 of the example process flow 600, the tag configuration component 216 of the base station 106 can reset, reconfigure, or update the one or more respective QoS tag assignments of the one or more respective QoS tags to the one or more respective services, based at least in part on (e.g., in accordance with) the one or more updates indicated in the update information.

As specified at reference numeral 624 of the example process flow 600, the tag manager component 204 of the network monitor component 120 can update the current QoS tag table associated with uplink data traffic and/or the base station 106 in the data store 210, based at least in part on the one or more respective updates of one or more respective QoS tag assignments of the one or more respective QoS tags to the one or more respective services. For instance, the tag manager component 204 can update or write information relating to the one or more respective updates of one or more respective QoS tag assignments to the current QoS tag table to update the current QoS tag table associated with uplink data traffic and/or the base station 106, and can store the updated current QoS tag table associated with uplink data traffic and/or the base station 106 in the data store 210 (e.g., in the database in the data store 210).

It is to be appreciated and understood that, in accordance with various embodiments, the example process flow 500 of FIG. 5 and the example process flow of FIG. 6 can be performed or executed independently (e.g., at a same or different time), simultaneously or substantially simultaneously, concurrently, or in parallel of or with each other.

Figure 7:
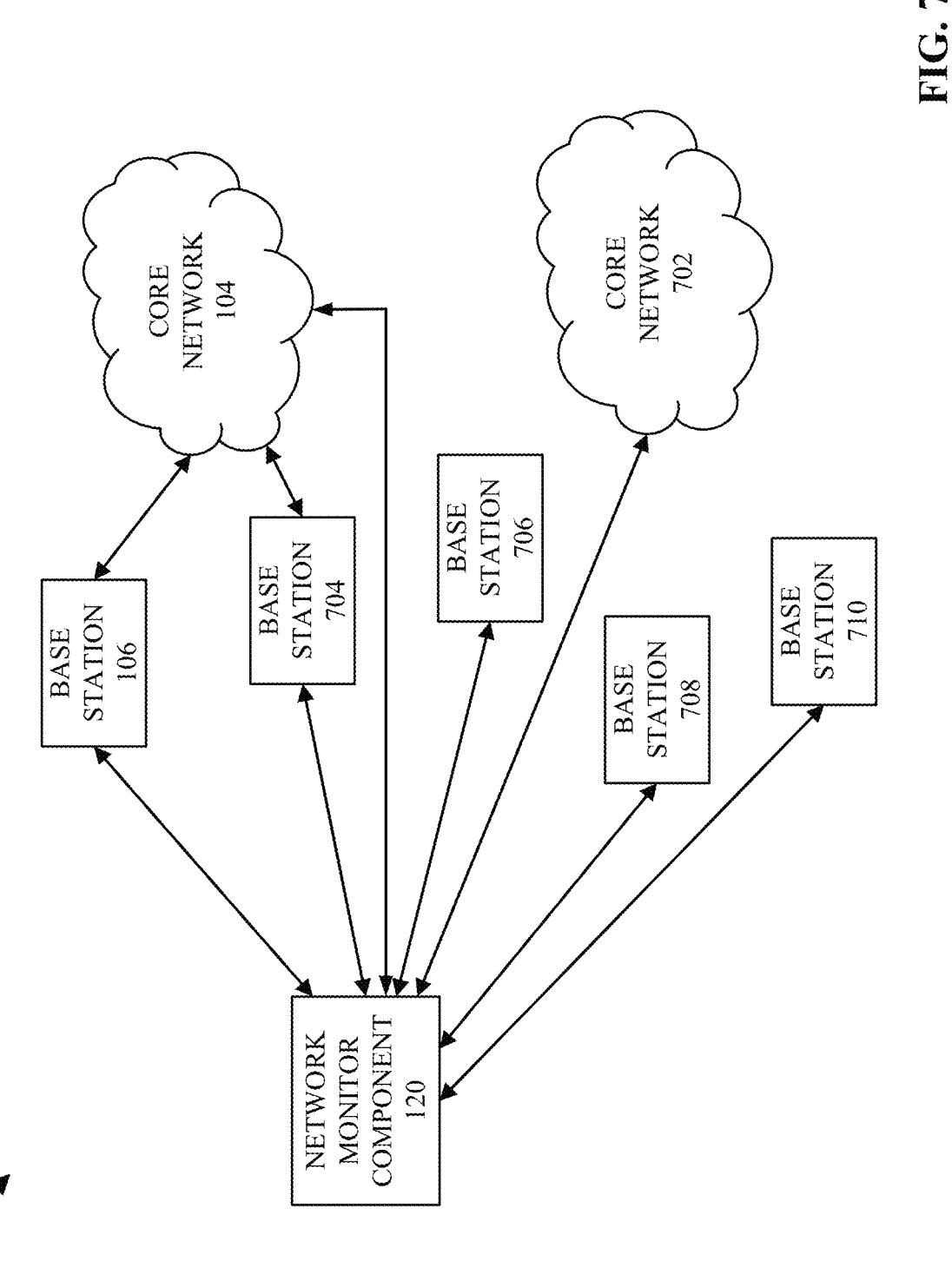
FIG. 7 illustrates a diagram of a non-limiting example system that can desirably manage and perform QoS tagging associated with services with respect to one or more core networks and one or more base stations, in accordance with various aspects and embodiments of the disclosed subject matter.

Referring to FIG. 7, FIG. 7 illustrates a diagram of a non-limiting example system 700 that can desirably (e.g., automatically, dynamically, efficiently, reliably, suitably, enhancedly, or optimally) manage and perform QoS tagging associated with services with respect to one or more core networks and one or more base stations, in accordance with various aspects and embodiments of the disclosed subject matter. The system 700 can comprise the network monitor component 120, the core network 104, a core network 702, the base station 106, and base stations 704, 706, 708, and 710.

The base stations 106 and 704 can be associated with (e.g., communicatively connected to) the core network 104. The base stations 706, 708, and 710 can be associated with (e.g., communicatively connected to) the core network 702. The network monitor component 120 can be associated with (e.g., communicatively connected to) the core networks 104 and 702, and the base stations 106, 704, 706, 708, and 710.

In accordance with various embodiments, the network monitor component 120 can operate in conjunction with the core networks 104 and 702, and the base stations 106, 704, 706, 708, and 710 to perform respective testing (e.g., TWAMP testing or other type of testing) of respective network performance (e.g., respective transport layers, respective core networks, and respective base stations) with regard to respective services associated with respective QoS tags, in accordance with the defined tag management criteria. The network monitor component 120 also can determine, generate, and/or update respective service performance information (e.g., service performance information itself, or respective service performance tables or other type of service performance information derived therefrom), respective original QoS tag information (e.g., respective original QoS tag tables), respective current QoS tag information (e.g., respective current QoS tag tables), and/or other respective information associated with the respective services and/or the respective QoS tags with respect to the core network 104, the core network 702, the base station 106, the base station 704, the base station 706, the base station 708, and the base station 710, and with respect to uplink data communication paths and downlink data communication paths associated with the respective transport layers. For instance, based at least in part on respective performance indicators that can be determined from the results of the respective testing, the network monitor component 120 can determine, generate, and/or update respective service performance information associated with the respective services and/or the respective QoS tags with respect to the core network 104, the core network 702, the base station 106, the base station 704, the base station 706, the base station 708, and the base station 710.

The network monitor component 120 can manage respective QoS tag assignments and determine respective updates (e.g., adjustments) to assignments of respective QoS tags to respective services based at least in part on the respective service performance information (e.g., the respective service performance tables), the respective original QoS tag information (e.g., the respective original QoS tag tables), the respective current QoS tag information (e.g., the respective current QoS tag tables), information relating to performing the iterative prediction process and analyzing the results of the iterative prediction process, and/or the other respective information associated with the core network 104, core network 702, base station 106, base station 704, base station 706, base station 708, and base station 710, in accordance with the defined tag management criteria. The network monitor component 120 can communicate respective update information relating to the respective updates to the assignments of the respective QoS tags to the respective services to the core network 104, core network 702, base station 106, base station 704, base station 706, base station 708, and base station 710.

The core network 104, core network 702, base station 106, base station 704, base station 706, base station 708, and base station 710 (e.g., employing their respective tag configuration components) can respectively update, reset, or reconfigure the assignments of the respective QoS tags to the respective services based at least in part on the respective update information received from the network monitor component 120.

It is to be appreciated and understood that one or more components (e.g., devices, the network monitor component, the base station, the core network, or other component) of the systems (e.g., system 100, system 200, or system 700), process flows (e.g., process flow 500 or process flow 600), or methods described herein can comprise or be associated with various other types of components, such as display screens (e.g., touch screen displays or non-touch screen displays), audio functions (e.g., amplifiers, speakers, or audio interfaces), or other interfaces, to facilitate presentation of information to users, entities, or other components (e.g., other devices or other servers), and/or to perform other desired functions or operations.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 8-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method 800 that can desirably (e.g., automatically, dynamically, proactively, efficiently, suitably, enhancedly, or optimally) manage QoS tagging associated with services, in accordance with various aspects and embodiments of the disclosed subject matter. The method 800 can be employed by, for example, a system (e.g., the network monitoring system) comprising the network monitor component, which can comprise the monitor component, the tag manager component, the processor component, the data store, and/or other components.

At 802, respective predicted performance indicators associated with respective QoS tags can be predicted based at least in part on a result of analyzing information relating to respective proposed groups of data packets associated with the respective QoS tags and respective services, wherein the respective QoS tags can comprise a first QoS tag and a second QoS tag, wherein the respective services can comprise a first service and a second service, and wherein the respective proposed groups of data packets can comprise a proposed group of data packets associated with the first service and a proposed transition from the first QoS to the second QoS tag. In some embodiments, the second service can be a higher priority service than the first service, and, accordingly, the second QoS tag can have a higher priority level than the first QoS tag.

The monitor component can communicate respective test signals (e.g., TWAMP signals, or other test signals) associated with the respective QoS tags and/or the respective services to the base station and/or the core network (e.g., network equipment of the core network) to trigger performance of respective tests associated with the respective QoS tags and/or the respective services. In response to the respective test signals, the base station (e.g., a test endpoint node of the base station) can communicate respective test messages associated with the respective QoS tags and/or the respective services to the core network (e.g., a test endpoint node of the core network), and, in response, the core network can communicate respective test response messages associated with the respective QoS tags and/or the respective services to the base station; and/or the core network can communicate respective test messages associated with the respective QoS tags and/or the respective services to the base station, and, in response, the base station can communicate respective test response messages associated with the respective QoS tags and/or the respective services to the core network.

The tag manager component can receive the respective network responses (e.g., network response information relating to the respective network responses, such as respective performance indicators) to the respective test messages from the base station and/or the core network. The monitor component can determine the respective network performance levels associated with the respective QoS tags based at least in part on the respective network responses of the network equipment and transport layer to the respective test messages. The respective network performance levels can be, can comprise, can relate to, or can correspond to respective groups of performance indicators (e.g., respective groups of KPIs) associated with the respective QoS tags and/or respective services, such as described herein. The network equipment can comprise network equipment of the core network and/or a base station associated with the core network.

In some instances, the first service can be experiencing degraded performance such that one or more performance indicators of a first group of performance indicators associated with the first service can fail to satisfy (e.g., can be below or outside of) one or more respective defined threshold performance indicator values associated with (e.g., applicable to) the first service (e.g., can be degraded). The tag manager component and/or monitor component can detect that the first service is experiencing such degraded performance based at least in part on the results of analyzing (e.g., comparing or otherwise analyzing) the first group of performance indicators and the one or more respective defined threshold performance indicator values, such as described herein.

In response to detecting that the first service is experiencing degraded performance, the tag manager component can determine and/or isolate the base station(s), network node(s), and/or communication link(s) that can be the source of the degraded performance of the first service, based at least in part on the results of analyzing enrichment information (e.g., network topology information) relating to the network topology of the communication network and the respective groups of performance indicators associated with the respective QoS tags and/or respective services, such as described herein. The tag manager component can determine a subset of the QoS tags, comprising the second QoS tag and/or another QoS tag(s), that can satisfy the defined performance criteria (e.g., SLA specifications or requirements) associated with the first service, based at least in part on the results of analyzing the respective groups of performance indicators associated with the respective QoS tags (e.g., service performance information (e.g., service performance information itself, pivot or summary information derived therefrom, or service performance table derived therefrom) that can be representative of the respective groups of performance indicators) and the defined performance criteria (e.g., respective defined threshold performance indicators derived from the defined performance criteria), such as described herein.

The tag manager component, employing the predictor component (e.g., employing the trained machine learning model), can desirably (e.g., accurately, reliably, suitable, enhancedly, or optimally) predict the respective predicted performance indicators associated with the respective QoS tags based at least in part on the result of analyzing the information relating to the respective proposed groups of data packets associated with the respective QoS tags and the respective services. The respective proposed groups of data packets can comprise a first proposed group of data packets associated with the first service and the first QoS tag, a second proposed group of data packets associated with the second service and the second QoS tag, and the proposed (e.g., a third proposed) group of data packets associated with the first service and the proposed transition from the first QoS to the second QoS tag. The predicting of the respective predicted performance indicators associated with the respective QoS tags can be part of an iterative prediction process that can be performed by the predictor component, such as described herein. The third proposed group of data packets can comprise a portion of the data packets (e.g., a portion (e.g., i KB) of the volume of data packets) associated with the first service that are being considered or tested for promotion or transition from the first QoS tag to the second QoS tag. Accordingly, the first proposed group of data packets associated with the first service and the first QoS tag can comprise a remaining portion (e.g., x–i KB) of the data packets associated with the first QoS tag that would remain if the third proposed group of data packets are transitioned from being associated with the first QoS tag to being associated with the second QoS tag. The third proposed group of data packets also can be associated with the source (e.g., communication link(s), base station(s), and/or other network node(s)) of the degradation.

At 804, based at least in part on the predicting of the respective predicted performance indicators associated with the respective QoS tags, a determination can be made regarding whether to adjust a QoS tag assignment for the proposed group of data packets from the first QoS tag to the second QoS tag. The tag manager component can determine whether to adjust the QoS tag assignment for the third proposed group of data packets from the first QoS tag of the first QoS level to the second QoS tag of the second QoS level, based at least in part on the predicting of the respective predicted performance indicators associated with the respective QoS tags.

In certain embodiments, as part of the iterative prediction process, the predictor component perform one or more iterations to predict whether there is any promotion of a portion of data packets (e.g., a portion of the volume of data packets) associated with the first service from the first QoS tag to another QoS tag (e.g., a higher QoS tag associated with a higher QoS level), of the subset of QoS tags, that can improve the performance of the first service to satisfy the defined performance criteria without degrading the performance of another service(s) associated with the other QoS tag and/or any other service associated with any other QoS tag. In some embodiments, as part of the iterative prediction process, the predictor component can predict whether transitioning the third proposed group of data packets from being associated with the first QoS tag to being associated with the second QoS tag can improve the performance of the first service to satisfy the defined performance criteria without resulting in undesirable degradation (e.g., degradation that violates the service specification(s) of another service(s)) of the performance of another service(s) associated with the other QoS tag and/or any other service associated with any other QoS tag. If the predictor component predicts that transitioning the third proposed group of data packets from being associated with the first QoS tag to being associated with the second QoS tag can improve the performance of the first service to satisfy the defined performance criteria without resulting in undesirable degradation of the performance of another service(s) associated with the other QoS tag and/or any other service associated with any other QoS tag, the tag manager component can determine that the QoS tag assignment for the third proposed group of data packets can be adjusted or transitioned from the first QoS tag to the second QoS tag. For instance, as part of the iterative process, the tag manager component can make such determination regarding adjusting the QoS tag assignment, if, during a subsequent iteration of the prediction process, the predictor component predicts that further increasing the amount (e.g., volume) of data packets associated with the first service from the first QoS tag to the second QoS tag, beyond the amount of data packets in the third proposed group of data packets, can result in undesirable degradation of the second service or another service(s). In some embodiments, the tag manager component can select the second QoS tag for the QoS tag assignment adjustment, if it determines that the second QoS tag is the lowest QoS tag (e.g., tag having the lowest priority or QoS level) of the subset of QoS tags that can satisfy the defined performance criteria associated with the first service (e.g., without degrading the performance of another service(s) associated with the other QoS tag and/or any other service associated with any other QoS tag).

In certain embodiments, if the predictor component predicts that there is no promotion of any portion of data packets (e.g., a portion of the volume of data packets) associated with the first service from the first QoS tag to another QoS tag, of the subset of QoS tags, that can improve the performance of the first service to satisfy the defined performance criteria without undesirable degradation of the performance of another service(s) (e.g., without violating the service specification(s) of the other service(s)) associated with the other QoS tag and/or any other service associated with any other QoS tag, the tag manager component can determine that no action (e.g., remedial or mitigation action) is to be taken with regard to the QoS tag assignment associated with the first service, at least at that time, and accordingly, can determine that the QoS tag assignment associated with data packets of the first service is not be adjusted or transitioned from the first QoS tag to the second QoS tag.

FIG. 9 depicts a flow chart of an example method 900 that can desirably (e.g., automatically, dynamically, efficiently, suitably, enhancedly, or optimally) determine a source of degradation of a service to facilitate desirably managing QoS tagging associated with services, including managing adjustment of a QoS tag assignment associated with a service by determining whether to demote the service to a lower QoS level and original QoS tag from a higher QoS level and/or promoted QoS tag, in accordance with various aspects and embodiments of the disclosed subject matter. The method 900 can be employed by, for example, a system (e.g., the network monitoring system) comprising the network monitor component, which can comprise the monitor component, the tag manager component, the processor component, the data store, and/or other components.

At 902, enrichment data, including network topology information relating to the communication network, can be received. The monitor component (e.g., a degradation source determination component of the monitor component) can receive enrichment data, including the network topology information, from a desired source (e.g., the core network, another device, a user, or other entity). The network topology information can indicate or specify the topology of the communication network, including the arrangement of, and respective relationships (e.g., direct or indirect physical or logical connections) between, respective base stations, network nodes, communication links, or other network equipment of or associated with the communication network, including the core network.

At 904, respective test signals associated with respective QoS tags and/or respective services can be communicated to respective network equipment of or associated with a core network to facilitate triggering of sending of respective test messages associated with the respective QoS tags and/or the respective services. The monitor component can communicate the respective test signals associated with the respective QoS tags and/or the respective services to the respective network equipment of or associated with the core network, wherein the respective network equipment can comprise, for example, one or more base stations associated with the core network or other network equipment (e.g., network nodes, such as routers, network functions, or other network nodes) of the core network. In response to the respective test signals, the base station (e.g., a test endpoint node of the base station) can communicate respective test messages associated with the respective QoS tags and/or the respective services to the core network (e.g., a test endpoint node of the core network), and, in response, the core network can communicate respective test response messages associated with the respective QoS tags and/or the respective services to the base station; and/or the core network can communicate respective test messages associated with the respective QoS tags and/or the respective services to the base station, and, in response, the base station can communicate respective test response messages associated with the respective QoS tags and/or the respective services to the core network.

At 906, information relating to respective network responses of the respective network equipment to the respective test messages associated with the respective QoS tags and/or the respective services can be received. For instance, the monitor component can receive, from the respective network equipment, the information (e.g., respective performance indicators or information relating thereto or indicative thereof) relating to the respective network responses of the respective network equipment (e.g., the base station and/or the core network) to the respective test messages associated with the respective QoS tags and/or the respective services.

At 908, respective groups of performance indicators associated with the respective QoS tags and/or the respective services can be determined based at least in part on the results of analyzing the information relating to the respective network responses of the respective network equipment to the respective test messages. The monitor component can determine respective network performance levels associated with the respective QoS tags based at least in part on the respective network responses of the respective network equipment and transport layer to the respective test messages. The respective network performance levels can be, can comprise, can relate to, or can correspond to respective groups of performance indicators (e.g., respective groups of KPIs) associated with the respective QoS tags and/or respective services, such as described herein. For instance, the monitor component can determine the respective groups of performance indicators associated with the respective QoS tags and/or the respective services based at least in part on the results of analyzing the information relating to the respective network responses of the respective network equipment to the respective test messages.

At 910, a determination can be made that a service associated with a QoS tag is experiencing degraded performance, based at least in part on a group of performance indicators associated with the service and a group of threshold performance indicators associated with (e.g., applicable with respect to) the service. In some embodiments, the monitor component can determine that the service associated with the QoS tag (e.g., its original QoS tag or another QoS tag) is experiencing degraded performance based at least in part on the respective performance indicator values of the respective performance indicators associated with the service and/or the QoS tag, and the respective threshold performance indicator values associated with the respective performance indicators, the service, and/or the QoS tag. For instance, the monitor component can determine whether the respective performance indicator values satisfy the corresponding (e.g., applicable or associated) respective threshold performance indicator values, based at least in part on the results of comparing the respective threshold performance indicator values to the corresponding respective threshold performance indicator values. In response to determining that one or more of the respective performance indicator values does not satisfy (e.g., do not meet) one or more of the corresponding respective threshold performance indicator values, the monitor component can determine that the service is experiencing degraded performance. In certain embodiments, the monitor component can analyze or query the service performance table relating to the QoS tags and services, which can be generated based at least in part on the respective performance indicator values and the corresponding (e.g., applicable or associated) respective threshold performance indicator values, and, from the analysis or querying of the service performance table, can determine whether the service is satisfied at the current QoS tag, such as described herein. The respective threshold performance indicator values can be indicated or specified by an SLA or other specifications associated with (e.g., applicable to) the service.

At 912, a source of the degradation of the service can be determined and/or isolated based at least in part on the results of analyzing the enrichment data, comprising the network topology information, and the respective groups of performance indicators associated with the respective QoS tags and/or the respective services, and associated with respective base stations, respective network nodes, and/or respective communication links of the communication network. The network monitor component (e.g., the monitor component, the tag manager component, or other component of the network monitor component) can analyze (e.g., can perform a comparative or subtractive analysis of) the enrichment data, comprising the network topology information, and the respective groups of performance indicators associated with the respective QoS tags and/or the respective services, and associated with the respective base stations, the respective network nodes, and/or the respective communication links of the communication network, such as described herein. Based at least in part on the results of such analysis, the network monitor component can determine and/or isolate the source (e.g., a base station(s), a network node(s), and/or a communication link(s)) of the degradation of the service, such as described herein.

In some embodiments, at this point, the method 900 can proceed to reference point A, wherein method 1000 of FIG. 10 can proceed from reference point A, such as described herein and as shown in FIG. 10.

FIG. 10 illustrates a flow chart of an example method 1000 that can desirably (e.g., automatically, dynamically, proactively, efficiently, suitably, enhancedly, or optimally) manage QoS tagging associated with services, including determining whether to adjust a QoS tag assignment associated with a portion of data packets of the service from a lower (e.g., current and/or original) QoS tag to a higher QoS tag, in accordance with various aspects and embodiments of the disclosed subject matter. The method 1000 can be employed by, for example, a system (e.g., the network monitoring system) comprising the network monitor component, which can comprise the monitor component, the tag manager component, the processor component, the data store, and/or other components. In some embodiments, the method 1000 can proceed from reference point A of the method 900 of FIG. 9, such as described herein and shown in FIG. 9.

At 1002, in response to determining that the service is experiencing degraded performance and/or isolating or determining the source of the service degradation, a subgroup of QoS tags, comprising one or more respective QoS tags, that potentially can satisfy the service performance criteria associated with the service can be determined, based at least in part on the respective groups of performance indicators associated with the respective QoS tags. The monitor component can determine respective network performance levels associated with the respective QoS tags based at least in part on the respective network responses of the respective network equipment and transport layer to the respective test messages. The respective network performance levels can be, can comprise, can relate to, or can correspond to respective groups of performance indicators (e.g., respective groups of KPIs) associated with the respective QoS tags and/or respective services, such as described herein. For instance, the monitor component can determine the respective groups of performance indicators associated with the respective QoS tags and/or the respective services based at least in part on the results of analyzing the information relating to the respective network responses of the respective network equipment to the respective test messages. In certain embodiments, the tag manager component can analyze or query the service performance table relating to the QoS tags and services, which can be generated based at least in part on the respective performance indicator values and the corresponding (e.g., applicable or associated) respective threshold performance indicator values (e.g., as indicated by or derived from the respective service performance criteria associated with the respective services), and, from the analysis or querying of the service performance table, can determine whether the subgroup of QoS tags that potentially can satisfy the service performance criteria associated with the service, such as described herein.

At 1004, with regard to each or at least some of the QoS tags of the subgroup of QoS tags, predictions can be iteratively made regarding whether a portion (e.g., an iteratively increasing amount or volume) of data packets of the service promoted from the current QoS tag associated with the service to the QoS tag of the subgroup can satisfy the service performance criteria of the service without resulting in an undesirable degradation of another service, based at least in part on respective subgroups (e.g., respective amounts or volumes) of data packets associated with the respective QoS tags and the respective services at respective iterations and the training of the machine learning model. At 1006, with regard to each or at least some of the QoS tags of the subgroup of QoS tags, the iterative predictions associated with the QoS tag of the subgroup can be discontinued, in response to predicting (e.g., during a particular iteration with regard to a particular portion of data packets associated with the QoS tag) that promotion of the portion (e.g., iteratively increased portion) of data packets of the service from the current QoS tag to the QoS tag of the subgroup can result in an undesirable degradation of another service and/or can result in the service performance criteria associated with the service not being satisfied even if all of the data packets of the service are promoted to the QoS tag, based at least in part on respective subgroups of data packets associated with the respective QoS tags and the respective services.

In some embodiments, with regard to each or at least some of the QoS tags of the subgroup, the predictor component (e.g., employing the trained machine learning model) can iteratively predict whether a portion (e.g., an iteratively increasing amount or volume) of data packets of the service promoted from the current (e.g., original) QoS tag associated with the service to the QoS tag of the subgroup can satisfy the service performance criteria of the service without resulting in an undesirable degradation (e.g., a violation of (e.g., a failure to satisfy) a service specification) of another service (e.g., a higher priority service associated with the QoS tag of the subgroup, or a same or lower priority service associated with another QoS tag), based at least in part on respective subgroups (e.g., respective amounts or volumes) of data packets associated with the respective QoS tags and the respective services at respective iterations. As an example, during an iteration regarding a portion of data packets of the service promoted from the current QoS tag associated with the service to the QoS tag of the subgroup, the predictor component (e.g., employing the trained machine learning model) can predict respective performance indicators associated with the respective QoS tags and the respective services in connection with communication of respective subgroups of data packets, including the portion of data packets, associated with the respective QoS tags. The tag manager component can determine or predict whether the respective predicted performance indicators associated with the respective QoS tags and the respective services can satisfy the respective service performance criteria associated with the respective services, based at least in part on an analysis (e.g., comparison) of the respective predicted performance indicators and the respective threshold performance indicators associated with (e.g., indicated or specified by) the respective service performance criteria. If, based at least in part on the analysis results, the tag manager component determines or predicts that the respective predicted performance indicators associated with the respective QoS tags and the respective services can satisfy (e.g., meet or otherwise satisfy) the respective threshold performance indicators associated with the respective service performance criteria, the tag manager component can determine or predict that promotion of that portion of data packets of the service from the current QoS tag associated with the service to that QoS tag of the subgroup can satisfy the service performance criteria of the service without resulting in an undesirable degradation of another service. If, instead, based at least in part on the analysis results, the tag manager component determines or predicts that one or more of the respective predicted performance indicators associated with one or more of the respective QoS tags and the respective services does not satisfy (e.g., does not meet or otherwise satisfy) one or more of the respective threshold performance indicators associated with the respective service performance criteria, the tag manager component can determine or predict that promotion of that portion of data packets of the service from the current QoS tag associated with the service to that QoS tag of the subgroup is not able to satisfy the service performance criteria of the service without resulting in an undesirable degradation of another service (or does not satisfy the service performance criteria of the service).

As disclosed, the tag manager component can control the iterative prediction process to perform one or more iterations of the iterative prediction process to evaluate promotion of different amounts or volumes of data packets associated with the service from the current QoS tag to another (e.g., higher priority) QoS tag(s). For instance, the predictor component (e.g., employing the trained machine learning model) can predict whether a first portion (e.g., a first amount or volume) of data packets of the service promoted from the current QoS tag to the QoS tag of the subgroup can satisfy the service performance criteria of the service without resulting in an undesirable degradation of another service, based at least in part on respective first subgroups (e.g., respective first amounts or volumes) of data packets associated with the respective QoS tags and the respective first predicted performance indicators associated with the respective QoS tags; and/or the predictor component can predict whether a second portion (e.g., a second amount or volume, higher than the first amount or volume) of data packets of the service promoted from the current QoS tag to the QoS tag of the subgroup can satisfy the service performance criteria of the service without resulting in an undesirable degradation of another service, based at least in part on respective second subgroups (e.g., respective second amounts or volumes) of data packets associated with the respective QoS tags and the respective second predicted performance indicators associated with the respective QoS tags; and/or the predictor component can predict whether another portion (e.g., another amount or volume, higher than the second amount or volume) of data packets of the service promoted from the current QoS tag to the QoS tag of the subgroup can satisfy the service performance criteria of the service without resulting in an undesirable degradation of another service, based at least in part on respective other subgroups (e.g., respective other amounts or volumes) of data packets associated with the respective QoS tags and the respective other predicted performance indicators associated with the respective QoS tags. In certain embodiments, this iterative prediction process can continue if and until the predictor component predicts that a certain portion (e.g., a certain amount or volume) of data packets of the service promoted from the current QoS tag to the QoS tag of the subgroup, while satisfying the service performance criteria of the service, results in an undesirable degradation of another service, or if and until predictor component predicts that there is no portion of data packets of the service promoted from the current QoS tag to the QoS tag of the subgroup that can satisfy the service performance criteria of the service, such as described herein.

If the tag manager component determines that a prediction(s) that promotion of the portion (e.g., iteratively increased portion) of data packets of the service from the current QoS tag to the QoS tag of the subgroup can result in an undesirable degradation of another service and/or can result in the service performance criteria associated with the service not being satisfied even if all of the data packets of the service are promoted to the QoS tag, the tag manager component can discontinue the iterative predictions with respect to that QoS tag of the subgroup. If there is another QoS tag of the subgroup that is yet to be evaluated, the tag manager component, employing the predictor component, can perform and manage iterative predictions regarding whether a portion (e.g., an iteratively increasing amount or volume) of data packets of the service promoted from the current QoS tag associated with the service to that other QoS tag of the subgroup can satisfy the service performance criteria of the service without resulting in an undesirable degradation of another service, based at least in part on respective subgroups (e.g., respective amounts or volumes) of data packets associated with the respective QoS tags and the respective predicted performance indicators associated with the respective QoS tags at each iteration.

At 1008, a determination can be made regarding whether there is at least one promotion of a portion of data packets of the service to a QoS tag of the subgroup that is predicted to satisfy the service performance criteria of the service without resulting in an undesirable degradation of another service. The tag manager component can determine whether there is at least one promotion of a portion of data packets of the service to a QoS tag of the subgroup that is predicted to satisfy the service performance criteria of the service without resulting in an undesirable degradation of another service, based at least in part on the results of analyzing the respective iterative predictions associated with the respective QoS tags of the subgroup of QoS tags.

If it is determined that there is no promotion of a portion of data packets of the service to a QoS tag of the subgroup that is predicted to satisfy the service performance criteria of the service without resulting in an undesirable degradation of another service, at 1010, a determination can be made that no action is to be taken, at least at this time, to promote a portion of data packets of the service from the current QoS tag to any of the QoS tags of the subgroup. For instance, if the tag manager component determines that there is no promotion of a portion of data packets of the service to a QoS tag of the subgroup that is predicted to satisfy the service performance criteria of the service without resulting in an undesirable degradation of another service, the tag manager component can determine that no action is to be taken, at least at this time, to promote a portion of data packets of the service from the current QoS tag to any of the QoS tags of the subgroup.

If, instead, at 1008, it is determined that there is at least one promotion of a portion of data packets of the service to a QoS tag of the subgroup that is predicted to satisfy the service performance criteria of the service without resulting in an undesirable degradation of another service, at 1012, a lowest QoS tag of the subgroup of QoS tags that can be utilized to promote a portion of data packets of the service to such lowest QoS tag to satisfy the service performance criteria of the service without resulting in an undesirable degradation of another service can be determined, based at least in part on the results of analysis of the predictions associated with the QoS tags of the subgroup. For instance, the tag manager component can analyze the respective predictions associated with the QoS tags of the subgroup with regard to the respective (e.g., different) promotions of respective amounts or volumes of data packets to the respective QoS tags of the subgroup. In some instances, there may be more than one QoS tag of the subgroup that is predicted to be able to be utilized for promotion of a portion of data packets of the service to satisfy the service performance criteria of the service without resulting in an undesirable degradation of another service. Based at least in part on the results of such analysis, the tag manager component can determine the lowest (e.g., lowest priority) QoS tag, relative to the other QoS tags, of the subgroup that is able to utilized to promote a portion of data packets of the service to such lowest QoS tag to satisfy the service performance criteria of the service without resulting in an undesirable degradation of another service, in accordance with the defined tag management criteria. In some embodiments, the portion of data packets of the service that can be promoted to such lowest QoS tag can be the highest amount or volume of data packets that is predicted or determined to satisfy the service performance criteria of the service without resulting in an undesirable degradation of another service, in accordance with the defined tag management criteria, as determined from the iterative prediction process.

At 1014, the portion of data packets of the service can be promoted to have the lowest satisfying QoS tag of the subgroup assigned to the portion of data packets, wherein the portion of data packets can be associated with the source of the degradation of the service. In some embodiments, the tag manager component can adjust (e.g., modify) the assignment of QoS tags for data packets of the service to assign the portion of data packets to the lowest satisfying QoS tag, with the remaining portion (e.g., remaining amount or volume) of data packets of the service continuing to be assigned to the current (e.g., original) QoS tag. The portion of data packets can be those data packets of the service that can be associated with (e.g., that would be communicated or routed via) the source (e.g., communication link(s), base station(s), or network node(s)) of an undesirable degradation of the service, to facilitate enabling those data packets to be more quickly and reliably communicated, routed, and processed, so that the service performance criteria for the service can be satisfied. The device, the base station, and/or the network nodes can facilitate communication, routing, and processing of the portion of data packets, based at least in part on (e.g., in accordance with) such lowest satisfying QoS tag.

FIG. 11 depicts a flow chart of an example method 1100 that can desirably (e.g., automatically, dynamically, efficiently, suitably, enhancedly, or optimally) manage QoS tagging associated with services, including managing adjustment of a QoS tag assignment associated with a service by determining whether to demote the service (e.g., a portion of data packets of the service) to a lower QoS level and original QoS tag from a higher QoS level and/or promoted QoS tag, in accordance with various aspects and embodiments of the disclosed subject matter. The method 1100 can be employed by, for example, a system (e.g., the network monitoring system) comprising the network monitor component, which can comprise the monitor component, the tag manager component, the processor component, the data store, and/or other components.

The method 1100 can relate to a service that has had a portion (e.g., a certain amount) of its data packets promoted from the original QoS tag to being associated with a higher or promoted QoS tag. In some embodiments, another portion of data packets of the service can be associated with the original QoS tag.

At 1102, respective test signals associated with respective QoS tags and/or respective services can be communicated to respective network equipment of or associated with a core network to facilitate triggering of sending of respective test messages associated with the respective QoS tags and/or the respective services. The monitor component can communicate the respective test signals associated with the respective QoS tags and/or the respective services to the respective network equipment of or associated with the core network, wherein the respective network equipment can comprise, for example, one or more base stations associated with the core network or other network equipment (e.g., network nodes, such as routers, network functions, or other network nodes) of the core network. In response to the respective test signals, the base station (e.g., a test endpoint node of the base station) can communicate respective test messages associated with the respective QoS tags and/or the respective services to the core network (e.g., a test endpoint node of the core network), and, in response, the core network can communicate respective test response messages associated with the respective QoS tags and/or the respective services to the base station; and/or the core network can communicate respective test messages associated with the respective QoS tags and/or the respective services to the base station, and, in response, the base station can communicate respective test response messages associated with the respective QoS tags and/or the respective services to the core network.

At 1104, information relating to respective network responses of the respective network equipment to the respective test messages associated with the respective QoS tags and/or the respective services can be received. For instance, the monitor component can receive, from the respective network equipment, the information (e.g., respective performance indicators or information relating thereto or indicative thereof) relating to the respective network responses of the respective network equipment (e.g., the base station and/or the core network) to the respective test messages associated with the respective QoS tags and/or the respective services.

At 1106, respective groups of performance indicators associated with the respective QoS tags and/or the respective services can be determined based at least in part on the results of analyzing the information relating to the respective network responses of the respective network equipment to the respective test messages. The monitor component can determine respective network performance levels associated with the respective QoS tags based at least in part on the respective network responses of the respective network equipment and transport layer to the respective test messages. The respective network performance levels can be, can comprise, can relate to, or can correspond to respective groups of performance indicators (e.g., respective groups of KPIs) associated with the respective QoS tags and/or respective services, such as described herein. For instance, the monitor component can determine the respective groups of performance indicators associated with the respective QoS tags and/or the respective services based at least in part on the results of analyzing the information relating to the respective network responses of the respective network equipment to the respective test messages.

At 1108, with regard to a service (e.g., with regard to each service) of the respective services that currently has a portion of its data packets associated with a second QoS tag as a promoted QoS tag (e.g., a QoS tag at a higher QoS level than the original QoS tag originally assigned for that service), a determination can be made that the service is satisfied (e.g., not degraded) with regard to the portion of data packets associated with the current second QoS tag based at least in part on the information relating to respective performance indicator values of respective performance indicators of the group of performance indicators associated with the service and/or the second QoS tag associated with the portion of data packets of the service, and the respective threshold performance indicator values associated with the respective performance indicators, the service, and/or the second QoS tag, wherein the second QoS tag can be a promoted and/or higher QoS level QoS tag associated with the portion of the data packets of the service. In some embodiments, with regard to the service (e.g., with regard to each service) that currently has the portion of its data packets associated with the second QoS tag as a promoted QoS tag, the tag manager component can determine whether the service is satisfied with regard to the portion of data packets associated with the current second QoS tag based at least in part on the information relating to the respective performance indicator values of the respective performance indicators associated with the service and/or the second QoS tag, and the respective threshold performance indicator values associated with the respective performance indicators, the service, and/or the second QoS tag. For instance, with regard to each such service, the tag manager component can determine whether the respective performance indicator values satisfy the corresponding (e.g., applicable or associated) respective threshold performance indicator values, based at least in part on the results of comparing the respective threshold performance indicator values to the corresponding respective threshold performance indicator values. In certain embodiments, the tag manager component can analyze or query the service performance table relating to the QoS tags and services, which can be generated based at least in part on the respective performance indicator values and the corresponding (e.g., applicable or associated) respective threshold performance indicator values, and, from the analysis or querying of the service performance table, can determine whether the service is satisfied with regard to the portion of data packets associated with current second QoS tag, such as described herein.

At 1110, with regard to the service (e.g., with regard to each service that has the second QoS tag as a promoted QoS tag), and with the portion of the data packets of the service being determined to be satisfied at the second QoS tag (e.g., with the second QoS tag assigned to the portion of data packets of the service), a determination can be made regarding whether the service would be satisfied (e.g., whether all of the data packets of the service would be satisfied) at the first QoS tag (e.g., the original QoS tag initially assigned to the service) based at least in part on the respective performance indicator values associated with the first QoS tag and the respective threshold performance indicator values associated with (e.g., applicable to) the first QoS tag. For instance, the tag manager component can compare the respective performance indicator values associated with the first QoS tag with the respective threshold performance indicator values associated with the first QoS tag, and, based at least in part on the results of such comparison, can determine whether one or more of the respective performance indicator values fail to satisfy one or more of the corresponding respective threshold performance indicator values. If there is such a failure to satisfy, that can indicate that the service would not be satisfied at the first QoS tag, and, alternatively, if there is no such a failure to satisfy, that can indicate that the service would be satisfied at the first QoS tag. In certain embodiments, the tag manager component can analyze or query the service performance table relating to the QoS tags and services, which can be generated based at least in part on the respective performance indicator values and the corresponding (e.g., applicable or associated) respective threshold performance indicator values associated with the first QoS tag, and, from the analysis or querying of the service performance table, can determine whether the service would be satisfied (e.g., can determine whether all of the data packets of the service would be satisfied) at the first QoS tag, such as described herein.

With regard to the service (e.g., with regard to each service that has the second QoS tag as a promoted QoS tag), if it is determined that the service would not be satisfied at the first QoS tag, at 1112, a determination can be made that no adjustment to the assignment of the second QoS tag to the portion of the data packets of the service is to be made, at least at this time. For instance, with regard to the service under consideration, if (e.g., based at least in part on the comparison results or analysis of the service performance table) the tag manager component determines that the service would not be satisfied if the first QoS tag (e.g., original QoS tag) was assigned to the service (e.g., assigned to all of the data packets of the service, including the portion of data packets of the service), the tag manager component can determine that no adjustment is to be made to the assignment of the second (e.g., promoted) QoS tag to the portion of data packets of the service, at least at this time. Thereafter, the monitor component and the tag manager component can continue to monitor and evaluate network performance with respect to the services, such as described herein.

If, instead, at reference numeral 1110, it is determined that the service would be satisfied at the first QoS tag (e.g., all of the data packets, including the portion of data packets, of the service), at 1114, a determination can be made that the QoS tag assignment for the portion of data packets of the service can be adjusted from the second QoS tag associated with a second QoS level to the first QoS tag associated with the first QoS level that is lower than the second QoS level. For instance, if the tag manager component determines that the service would be satisfied if the first QoS tag was assigned to the service (e.g., assigned to all of the data packets, including the portion of data packets, of the service), the tag manager component can determine that the assignment for the portion of data packets of the service can be adjusted from the second QoS tag associated with the second QoS level to the first (e.g., original and/or lower) QoS tag associated with the first QoS level, and accordingly, can adjust the assignment for the portion of data packets of the service from the second QoS tag to the first QoS tag. At this point, the monitor component and the tag manager component can continue to monitor and evaluate network performance with respect to the services, such as described herein.

Figure 12:
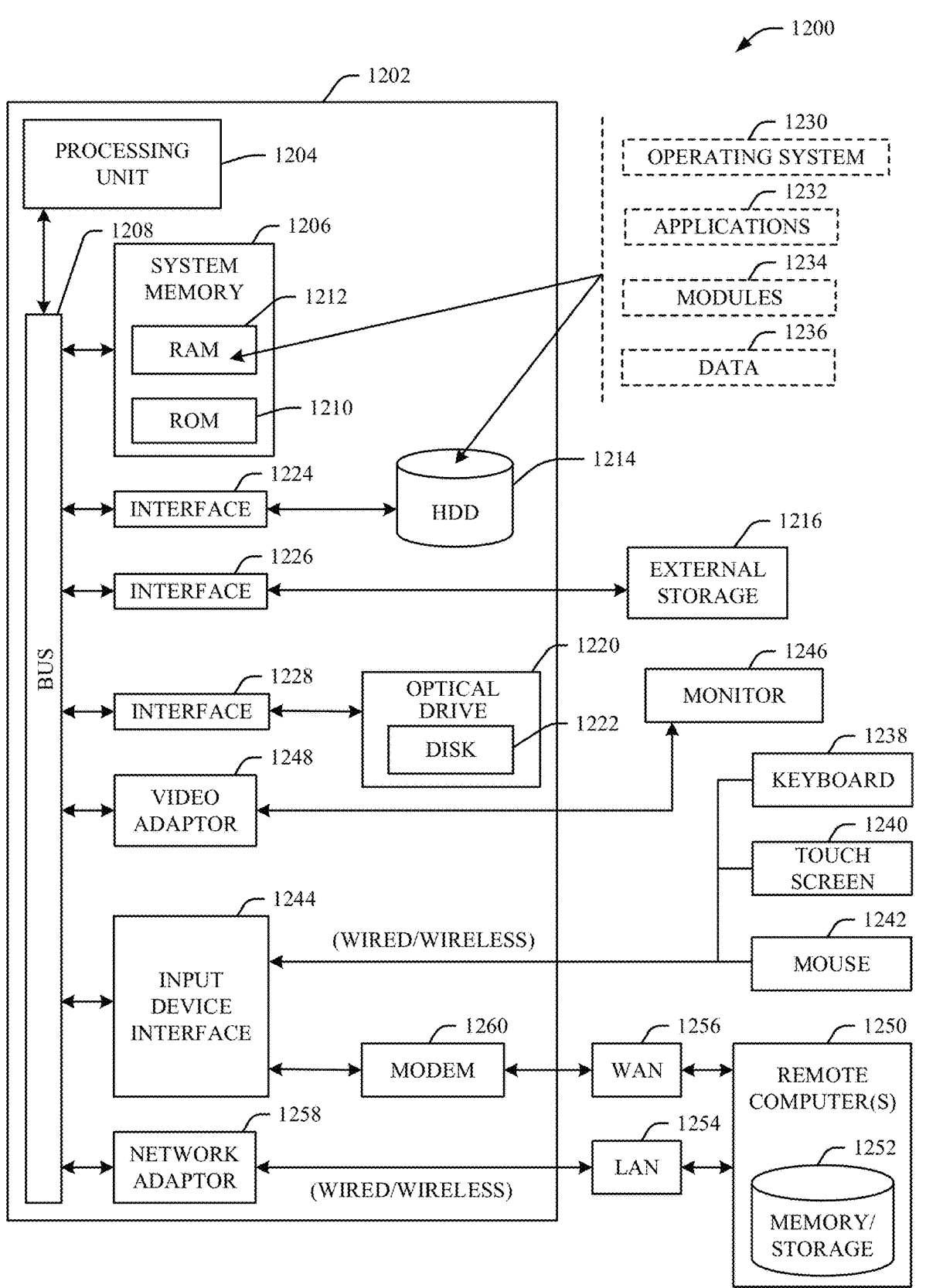
FIG. 12 illustrates an example block diagram of an example computing environment in which the various embodiments of the embodiments described herein can be implemented.

In order to provide additional context for various embodiments described herein, FIG. 12 and the following discussion are intended to provide a brief, general description of a suitable computing environment 1200 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256, e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), Internet of things (IoT) device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, user equipment (UE), communication network, core network, base station, service, network monitor component, monitor component, tag manager component, test endpoint node, tag configuration component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
  predicting, by a system comprising at least one processor, respective predicted performance indicators associated with respective quality of service tags based on a result of analyzing information relating to respective proposed groups of data packets associated with the respective quality of service tags and respective services, wherein the respective quality of service tags comprise a first quality of service tag, a second quality of service tag, and a third quality of service tag, wherein the respective services comprise a first service, a second service, and a third service, wherein the respective proposed groups of data packets comprise a proposed group of data packets associated with the first service and a proposed transition from the first quality of service tag to the second quality of service tag, wherein the third service is associated with the second quality of service tag due to a temporary quality of service tag adjustment and was originally associated with the third quality of service tag that has a lower quality of service level than the second quality of service tag, and wherein the third service is associated with a second defined performance criterion;
  based on the predicting of the respective predicted performance indicators, determining, by the system, whether to adjust a quality of service tag assignment for the proposed group of data packets from the first quality of service tag to the second quality of service tag;
  in response to determining, based on a first defined performance criterion associated with the first service, that the first service associated with the first quality of service tag is degraded, and in response to predicting that adjusting the quality of service tag assignment for the proposed group of data packets from the first quality of service tag to the second quality of service tag is going to enable the first service to satisfy the first defined performance criterion without degrading performance of other services of the respective services, controlling, by the system, the quality of service tag assignment for the proposed group of data packets to adjust the quality of service tag assignment from the first quality of service tag to the second quality of service tag;
  based on respective network responses of network equipment to respective test signals associated with the respective quality of service tags, determining, by the system, that the third quality of service tag is able to satisfy the second defined performance criterion associated with the third service; and
  in response to determining that the third quality of service tag is able to satisfy the second defined performance criterion, transitioning, by the system, data packets associated with the third service from being associated with the second quality of service tag to being associated with the third quality of service tag.

2. The method of claim 1, wherein the proposed group of data packets is a third proposed group of data packets, wherein the respective proposed groups of data packets comprise a first proposed group of data packets associated with the first service and the first quality of service tag, a second proposed group of data packets associated with the second service and the second quality of service tag, and the third proposed group of data packets associated with the first service and the proposed transition from the first quality of service tag to the second quality of service tag, and wherein the first quality of service tag is associated with a first quality of service level and the second quality of service tag is associated with a second quality of service level that is higher than the first quality of service level.

3. The method of claim 2, wherein a group of quality of service tags comprises a first subgroup of quality of service tags and a second subgroup of quality of service tags, wherein the first subgroup of quality of service tags comprises the respective quality of service tags, and wherein the method further comprises:

determining, by the system, that the first service associated with the first quality of service tag is degraded based on the first defined performance criterion associated with the first service and the respective network responses of the network equipment to the respective test signals associated with the group of quality of service tags, wherein the respective network responses of the network equipment indicate that the first defined performance criterion is not satisfied with respect to the first service or the first quality of service tag, indicating that the first service associated with the first quality of service tag is degraded; and based on the respective network responses, determining, by the system, that the first subgroup of quality of service tags, comprising the second quality of service tag, is able to satisfy the first defined performance criterion, and the second subgroup of quality of service tags is not able to satisfy the first defined performance criterion, wherein the predicting of the respective predicted performance indicators comprises: in response to determining that the first service associated with the first quality of service tag is degraded, predicting the respective predicted network performance indicators associated with the respective quality of service tags of the first subgroup of quality of service tags based on the result of the analyzing of the information.

4. The method of claim 3, wherein the first defined performance criterion associated with the first service is, relates to, corresponds to, or is determined as a function of service level agreement information representative of a service level agreement associated with the first service, and wherein the respective network responses indicate that one or more performance indicators associated with the first service or the first quality of service tag do not satisfy the first defined performance criterion.

5. The method of claim 3, wherein the result is a first result, and wherein the method further comprises:

determining, by the system, a network-related source of the degradation of the first service based on a second result of analyzing network topology information relating to the network equipment and the respective network responses of the network equipment to the respective test messages, wherein the network equipment comprises one or more respective base stations associated with a core network, one or more respective network nodes of the core network, and one or more communication links associated with or between the one or more respective base stations or the one or more respective network nodes, and wherein the network-related source comprises some of the one or more respective base stations, the one or more respective network nodes, or the one or more communication links.

6. The method of claim 5, wherein the predicting of the respective predicted performance indicators comprises: in response to determining that the first service associated with the first quality of service tag is degraded, predicting the respective predicted network performance indicators associated with the respective quality of service tags based on the result of the analyzing of the information and based on the network-related source of the degradation of the first service.

7. The method of claim 3, further comprising:

based on the respective predicted performance indicators, predicting, by the system, that adjusting the quality of service tag assignment for the third proposed group of data packets from the first quality of service tag to the second quality of service tag is going to enable the first service to satisfy the first defined performance criterion without degrading the performance of the other services, comprising the second service, of the respective services; and in response to predicting that adjusting the quality of service tag assignment for the third proposed group of data packets from the first quality of service tag to the second quality of service tag is going to enable the first service to satisfy the first defined performance criterion without degrading the performance of the other services, determining, by the system, that the quality of service tag assignment for the third proposed group of data packets is to be adjusted from the first quality of service tag to the second quality of service tag.

8. The method of claim 7, further comprising:

as part of a previous prediction iteration, prior to the predicting of the respective predicted performance indicators associated with the respective quality of service tags, predicting, by the system, respective previously predicted performance indicators associated with the respective quality of service tags based on a previous result of analyzing previous information relating to respective previously proposed groups of data packets associated with the respective quality of service tags and the respective services, wherein the respective previously proposed groups of data packets comprise a first previously proposed group of data packets associated with the first service and the first quality of service tag, a second previously proposed group of data packets associated with the second service and the second quality of service tag, and a third previously proposed group of data packets associated with the first service and a previously proposed transition from the first quality of service tag to the second quality of service tag, and wherein the third previously proposed group of data packets comprises a different amount of data packets than the third proposed group of data packets;

based on the respective previously predicted performance indicators, predicting, by the system, that the transitioning of the third previously proposed group of data packets from the first quality of service tag to the second quality of service tag is going to degrade performance of at least one service of the other services; and in response to predicting that the transitioning of the third previously proposed group of data packets from the first quality of service tag to the second quality of service tag is going to degrade the performance of the at least one service, determining, by the system, that the third previously proposed group of data packets is not to be transitioned from the first quality of service tag to the second quality of service tag.

9. The method of claim 3, wherein the group of quality of service tags comprises a fourth quality of service tag, wherein the respective services comprise a fourth service associated with the first quality of service tag, wherein the quality of service tag assignment is a first quality of service tag assignment associated with the first service, and wherein the method further comprises:

based on the predicting of the respective predicted performance indicators associated with the respective quality of service tags, determining, by the system, that there is no adjustment to a second quality of service tag assignment associated with the fourth service that is able to satisfy the first defined performance criterion without degrading performance of at least one other service of the respective services, wherein the respective proposed groups of data packets comprise a fourth proposed group of data packets, and wherein the second quality of service tag assignment comprises the second quality of service tag assignment for the fourth proposed group of data packets associated with the fourth service from the first quality of service tag to the second quality of service tag; and in response to determining that there is no adjustment to the second quality of service tag assignment associated with the fourth service that is able to satisfy the first defined performance criterion without degrading the performance of the at least one other service, determining, by the system, that no adjustment to the second quality of service tag assignment associated with the third service is to be performed.

10. The method of claim 3, wherein the data packets associated with the third service comprise all or a portion of a subsequent group of data packets associated with the third service that is to be communicated utilizing some of the network equipment.

11. The method of claim 3, further comprising:

communicating, by the system, the respective test signals associated with the respective quality of service tags and the respective services to the network equipment, comprising a base station associated with a core network and core network equipment of the core network, wherein, in response to the respective test signals, the network equipment sends respective test messages associated with the respective quality of service tags and the respective services to facilitate generating the respective network responses associated with the respective quality of service tags and the respective services;

receiving, by the system, the respective test messages; and determining, by the system, the respective network responses based on the respective test messages and the respective test signals.

12. The method of claim 11, wherein the respective test signals comprise two-way active measurement protocol messages.

13. The method of claim 11, wherein the respective predicted performance indicators comprise or relate to a delay, a jitter, a data throughput, a bandwidth, a data packet loss rate, or a data packet retransmission rate associated with a test message of the respective test messages.

14. The method of claim 3, further comprising:

analyzing, by the system, the respective network responses of the network equipment to the respective test signals associated with the group of quality of service tags; and based on the analyzing of the respective network responses, determining, by the system, respective performance indicators associated with the respective quality of service tags, the respective services, or the network equipment.

15. A system, comprising:

at least one memory that stores computer executable components; and at least one processor that executes computer executable components stored in the at least one memory, wherein the computer executable components comprise:

a predictor that predicts respective predicted performance indicator values associated with respective quality of service tags based on a result of an analysis of information relating to respective test groups of data packets associated with respective services and the respective quality of service tags, wherein the respective quality of service tags comprise a first quality of service tag, a second quality of service tag, and a third quality of service tag, wherein the respective services comprise a first service, a second service, and a third service, and wherein the respective test groups of data packets comprise a first test group of data packets associated with the first service and the first quality of service tag, a second test group of data packets associated with the second service and the second quality of service tag, and a third test group of data packets associated with the first service and a proposed transition from the first quality of service tag to the second quality of service tag; and a tag manager that, based on the respective predicted performance indicator values associated with the respective quality of service tags, determines whether to modify a quality of service tag assignment for the third test group of data packets from the first quality of service tag to the second quality of service tag, wherein, in response to the tag manager determining, based on a first defined performance criterion associated with the first service, that the first service associated with the first quality of service tag is degraded, and in response to the predictor predicting, based on the respective predicted performance indicator values, that modification of the quality of service tag assignment for the third test group of data packets from the first quality of service tag to the second quality of service tag is going to enable the first service to satisfy the first defined performance criterion without degrading performance of other services of the respective services to cause at least one of the other services to not satisfy the first defined performance criterion, the tag manager modifies the quality of service tag assignment for the third test group of data packets from the first quality of service tag to the second quality of service tag, wherein the third service is associated with the second quality of service tag due to a temporary quality of service tag modification and was previously associated with the third quality of service tag that has a lower quality of service level than the second quality of service tag, wherein the third service is associated with a second defined performance criterion, wherein, based on respective network responses of network equipment to respective test signals associated with the respective quality of service tags, the tag manager determines that the third quality of service tag is able to satisfy the second defined performance criterion associated with the third service, and wherein, in response to determining that the third quality of service tag is able to satisfy the second defined performance criterion, the tag manager transitions data packets associated with the third service from being associated with the second quality of service tag to being associated with the third quality of service tag.

16. The system of claim 15, wherein the tag manager determines that the first service associated with the first quality of service tag is degraded based on the first defined performance criterion associated with the first service and the respective network responses of the network equipment to the respective test signals associated with a group of quality of service tags comprising the respective quality of service tags, wherein the respective network responses of the network equipment indicate that the first defined performance criterion is not satisfied with respect to the first service or the first quality of service tag, indicating that the first service associated with the first quality of service tag is degraded, wherein, based on the respective network responses, the tag manager determines that the respective quality of service tags, comprising the second quality of service tag, are able to satisfy the first defined performance criterion, and at least one other quality of service tag is not able to satisfy the first defined performance criterion, and wherein, in response to the tag manager determining that the first service associated with the first quality of service tag is degraded, the predictor predicts the respective predicted network performance indicator values associated with the respective quality of service tags of the first subgroup of quality of service tags based on the result of the analyzing of the information.

17. The system of claim 15, wherein, based on the respective predicted performance indicator values, the predictor predicts that the modification of the quality of service tag assignment for the third test group of data packets from the first quality of service tag to the second quality of service tag is going to enable the first service to satisfy the first defined performance criterion associated with the first service without degrading the performance of the other services, comprising the second service, of the respective services, and wherein, in response to the prediction that the modification is going to enable the first service to satisfy the first defined performance criterion without degrading the performance of the other services, the tag manager determines that the quality of service tag assignment for the third test group of data packets is to be modified from the first quality of service tag to the second quality of service tag, and manages the quality of service tag assignment for the third test group of data packets to modify the quality of service tag assignment from the first quality of service tag to the second quality of service tag.

18. The system of claim 15, wherein the predictor comprises a trained machine learning model that predicts the respective predicted performance indicator values associated with the respective quality of service tags based on the result of the analysis of the information, or, based on the respective predicted performance indicator values, predicts whether the modification of the quality of service tag assignment for the third test group of data packets from the first quality of service tag to the second quality of service tag is going to enable the first service to satisfy the first defined performance criterion associated with the first service without degrading performance of other services, comprising the second service, of the respective services.

19. A non-transitory machine-readable medium, comprising executable instructions that, when executed by at least one processor, facilitate performance of operations, comprising:

predicting respective predicted performance indicator values associated with respective quality of service tags based on a result of analyzing information relating to respective proposed groups of data packets associated with the respective quality of service tags and respective services, wherein the respective quality of service tags comprise a first quality of service tag, a second quality of service tag, and a third quality of service tag, wherein the respective services comprise a first service, a second service, and a third service, wherein the respective proposed groups of data packets comprise a first proposed group of data packets associated with the first service and the first quality of service tag, a second proposed group of data packets associated with the second service and the second quality of service tag, and a third proposed group of data packets associated with the first service and a proposed transition from the first quality of service tag to the second quality of service tag, wherein the third service is associated with the second quality of service tag due to a temporary quality of service tag adjustment and was originally associated with the third quality of service tag that has a lower quality of service level than the second quality of service tag, and wherein the third service is associated with a second defined performance criterion;

based on the predicting, determining whether to transition the third proposed group of data packets from being associated with the first quality of service tag to being associated with the second quality of service tag;

in response to determining, based on a first defined performance criterion associated with the first service, that the first service associated with the first quality of service tag is degraded, and in response to predicting, based on the respective predicted performance indicator values, that transitioning the third proposed group of data packets from being associated with the first quality of service tag to being associated with the second quality of service tag is going to enable the first service to satisfy the first defined performance criterion without degrading performance of other services of the respective services to cause at least one of the other services to not satisfy the first defined performance criterion, transitioning the third proposed group of data packets from being associated with the first quality of service tag to being associated with the second quality of service tag;

based on respective network responses of network equipment to respective test signals associated with the respective quality of service tags, determining that the third quality of service tag is able to satisfy the second defined performance criterion associated with the third service; and in response to determining that the third quality of service tag is able to satisfy the second defined performance criterion, transitioning data packets associated with the third service from being associated with the second quality of service tag to being associated with the third quality of service tag.

20. The non-transitory machine-readable medium of claim 19, wherein the operations further comprise:

in response to determining that the first service associated with the first quality of service tag is degraded based on the first defined performance criterion associated with the first service, and based on the respective predicted performance indicator values, predicting that the transitioning of the third proposed group of data packets from being associated with the first quality of service tag to being associated with the second quality of service tag is going to enable the first service to satisfy the first defined performance criterion associated with the first service without degrading performance of the other services, comprising the second service, of the respective services; and in response to predicting that the transitioning of the third proposed group of data packets from being associated with the first quality of service tag to being associated with the second quality of service tag is going to enable the first service to satisfy the first defined performance 5 criterion without degrading the performance of the other services, determining that the transitioning of the third proposed group of data packets from being associated with the first quality of service tag to being associated with the second quality of service tag is to be 10 performed.

\* \* \* \* \*